(12) United States Patent
Kaku et al.

(10) Patent No.: US 11,504,626 B2
(45) Date of Patent: Nov. 22, 2022

(54) SEAT SYSTEM AND SEAT EXPERIENCE DEVICE

(71) Applicant: TS TECH CO., LTD., Asaka (JP)

(72) Inventors: Hiroyuki Kaku, Tochigi (JP); Hiroyuki Numajiri, Tochigi (JP); Takako Miyoshi, Tochigi (JP); Munetaka Kowa, Tochigi (JP); Atsushi Kusano, Tochigi (JP); Ryuichiro Hirose, Tochigi (JP); Yoshikazu Ito, Tochigi (JP); Yosuke Higashi, Tochigi (JP); Satoshi Suzuki, Tochigi (JP); Ryosuke Sato, Tochigi (JP); Satoru Kaneda, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/298,344

(22) PCT Filed: Nov. 27, 2019

(86) PCT No.: PCT/JP2019/046360
§ 371 (c)(1),
(2) Date: May 28, 2021

(87) PCT Pub. No.: WO2020/111118
PCT Pub. Date: Jun. 4, 2020

(65) Prior Publication Data
US 2022/0111296 A1 Apr. 14, 2022

(30) Foreign Application Priority Data

Nov. 29, 2018 (JP) .............................. JP2018-224038
Nov. 29, 2018 (JP) .............................. JP2018-224057
(Continued)

(51) Int. Cl.
*A63F 13/67* (2014.01)
*B60N 2/90* (2018.01)
*A63F 13/218* (2014.01)

(52) U.S. Cl.
CPC ................ *A63F 13/67* (2014.09); *B60N 2/90* (2018.02); *A63F 13/218* (2014.09); *A63F 2300/6027* (2013.01)

(58) Field of Classification Search
CPC .................... A63F 13/67; A63F 13/218; A63F 2300/6027; A63F 13/62; A63F 13/803;
(Continued)

(56) References Cited

U.S. PATENT DOCUMENTS 2,689,016 A * 9/1954 Lang ........................ H04R 1/22
181/145
3,765,681 A * 10/1973 Glassman ........... A63F 3/00119
273/287
(Continued)

FOREIGN PATENT DOCUMENTS

JP H11-064131 3/1999
JP 2003104116 4/2003
(Continued)

OTHER PUBLICATIONS

International Search Report and Written Opinion issued for International Patent Application No. PCT/JP2019/046360, dated Jan. 21, 2020, 15 pages including English translation.
(Continued)

*Primary Examiner* — David L Lewis
*Assistant Examiner* — Matthew D Hoel
(74) *Attorney, Agent, or Firm* — Hamre, Schumann, Mueller & Larson, P.C.

(57) ABSTRACT

A seat system includes a seat including a sensor configured to acquire information for detection of a motion of an
(Continued)

occupant seated on a seat body, a terminal device configured to acquire the information from the sensor, and a server capable of communicating with the terminal device. The terminal device executes a game using the sensor based on the information, and acquires an execution result corresponding to the occupant for a game played by the occupant. The server generates integrated data by integrating execution results of the game acquired from another terminal device, and computes a reference value for execution results of the game based on the integrated data. The terminal device or the server assigns a difficulty level of the game for the terminal device based on the execution result corresponding to the occupant and the reference value. The terminal device reflects the difficulty level on the game.

7 Claims, 43 Drawing Sheets

(30) Foreign Application Priority Data

Nov. 29, 2018 (JP) .............................. JP2018-224060
Nov. 29, 2018 (JP) .............................. JP2018-224078

(58) Field of Classification Search
CPC . B60N 2/90; B60N 2/002; A47C 7/62; G16Y 10/65; G16Y 40/20; G16Y 10/40
See application file for complete search history.

(56) References Cited

U.S. PATENT DOCUMENTS

| | | | | |
|---|---|---|---|---|
| 4,015,778 A * | 4/1977 | Chen | A47C 4/24 | 273/287 |
| 4,413,198 A * | 11/1983 | Bost | G10K 11/08 | 381/349 |
| 4,549,631 A * | 10/1985 | Bose | H04R 1/2842 | 181/160 |
| 4,630,821 A * | 12/1986 | Greenwald | A47C 7/723 | D14/126 |
| 4,660,833 A * | 4/1987 | Dickinson | G07C 3/00 | 463/20 |
| 4,664,456 A * | 5/1987 | Blair | H01R 13/193 | 439/378 |
| 4,705,274 A * | 11/1987 | Lubeck | A47C 15/004 | 248/240.4 |
| 4,805,952 A * | 2/1989 | Coleman | B60N 2/38 | 296/65.03 |
| 4,840,343 A * | 6/1989 | Gasser | A47C 7/002 | 248/500 |
| 4,866,515 A * | 9/1989 | Tagawa | H04N 7/10 | 348/E7.086 |
| 4,875,546 A * | 10/1989 | Krnan | H04R 5/02 | 381/345 |
| 4,887,298 A * | 12/1989 | Haigler | H03G 3/341 | 381/59 |
| 4,943,064 A * | 7/1990 | Smith, Jr. | A63F 9/02 | 273/384 |
| 4,960,117 A * | 10/1990 | Moncrief | A63F 13/90 | 463/46 |
| 5,052,685 A * | 10/1991 | Lowe | H04S 7/30 | 381/17 |
| 5,083,738 A * | 1/1992 | Infanti | A47C 9/00 | 248/500 |
| 5,102,192 A * | 4/1992 | Barile, Sr. | A47C 9/00 | 248/501 |
| 5,114,112 A * | 5/1992 | Infanti | A47C 9/00 | 248/500 |
| 5,116,051 A * | 5/1992 | Moncrief | A63F 13/218 | 434/69 |
| 5,232,191 A * | 8/1993 | Infanti | A47C 15/004 | 248/500 |
| 5,269,687 A * | 12/1993 | Mott | A63F 13/10 | 434/69 |
| 5,290,034 A * | 3/1994 | Hineman | G09B 9/02 | 463/47 |
| 5,311,302 A * | 5/1994 | Berry | B64D 11/0015 | 348/E7.086 |
| 5,344,331 A * | 9/1994 | Hoffman | H01R 13/641 | 439/138 |
| 5,398,992 A * | 3/1995 | Daniels | A47C 11/00 | 297/217.4 |
| 5,409,296 A * | 4/1995 | Barile | A47C 9/022 | 248/172 |
| 5,419,613 A * | 5/1995 | Wedeking | A47C 7/72 | 248/205.2 |
| 5,437,453 A * | 8/1995 | Hineman | G09B 9/02 | 463/47 |
| 5,522,641 A * | 6/1996 | Infanti | G07F 17/3216 | 297/344.13 |
| 5,542,748 A * | 8/1996 | Barile | A47C 15/004 | 248/500 |
| 5,573,320 A * | 11/1996 | Shearer | A63F 13/08 | 312/223.1 |
| 5,596,647 A * | 1/1997 | Wakai | H04R 27/00 | 704/200 |
| 5,617,331 A * | 4/1997 | Wakai | H04J 3/1605 | 725/75 |
| 5,618,178 A * | 4/1997 | Copperman | G06T 15/50 | 434/69 |
| 5,622,511 A * | 4/1997 | Jarrett | H01R 13/6315 | 439/378 |
| 5,669,818 A * | 9/1997 | Thorner | G09B 9/05 | 463/47 |
| 5,678,886 A * | 10/1997 | Infanti | A47C 9/00 | 248/500 |
| 5,762,617 A * | 6/1998 | Infanti | G07F 17/3216 | 297/344.13 |
| 5,768,724 A * | 6/1998 | Buell | A47C 7/42 | 297/440.16 |
| 5,791,731 A * | 8/1998 | Infanti | A47C 15/004 | 297/217.3 |
| 5,807,177 A * | 9/1998 | Takemoto | A63F 13/08 | 463/47 |
| 5,908,354 A * | 6/1999 | Okuniewicz | G07F 17/3267 | 463/20 |
| 5,910,991 A * | 6/1999 | Farrar | G06F 3/165 | 381/59 |
| 5,915,786 A * | 6/1999 | Kotani | A63F 13/245 | 297/217.7 |
| 5,953,429 A * | 9/1999 | Wakai | H04N 7/18 | 725/75 |
| 5,980,255 A * | 11/1999 | Mathieu | G09B 9/14 | 434/30 |
| 6,012,755 A * | 1/2000 | Hecht | B60N 2/0292 | 296/65.09 |
| 6,075,868 A * | 6/2000 | Goldfarb | H04S 1/00 | 381/301 |
| 6,089,663 A * | 7/2000 | Hill | A47C 7/72 | 297/217.3 |
| 6,102,802 A * | 8/2000 | Armstrong | H01H 13/70 | 463/37 |
| 6,135,562 A * | 10/2000 | Infanti | A47C 13/005 | 297/440.22 |
| 6,152,740 A * | 11/2000 | Corrado | A63F 3/0423 | 434/167 |
| 6,161,892 A * | 12/2000 | Chabanne | B60N 2/01508 | 296/65.01 |
| 6,191,892 B1 * | 2/2001 | Isaka | G02B 27/017 | 359/630 |
| 6,195,626 B1 * | 2/2001 | Stone | G09B 9/085 | 463/52 |
| 6,199,030 B1 * | 3/2001 | Stone | A63F 13/60 | 463/31 |
| 6,206,335 B1 * | 3/2001 | Huber | A47C 21/006 | 297/313 |
| 6,227,614 B1 * | 5/2001 | Rubin | A47C 9/022 | 297/344.1 |

(56) References Cited

U.S. PATENT DOCUMENTS

| | | | | |
|---|---|---|---|---|
| 6,290,536 B1* | 9/2001 | Hwang | H01R 13/631 | 439/378 |
| 6,314,330 B1* | 11/2001 | Matthews | H04H 60/04 | 381/119 |
| 6,354,660 B1* | 3/2002 | Friedrich | A63F 13/08 | 248/500 |
| 6,368,216 B1* | 4/2002 | Hedrick | G07F 17/3244 | 463/20 |
| 6,422,670 B1* | 7/2002 | Hedrick | G07F 17/32 | 312/223.1 |
| 6,422,941 B1* | 7/2002 | Thorner | A63F 13/02 | 463/36 |
| 6,430,297 B1* | 8/2002 | Nakamura | H04R 1/2811 | 181/149 |
| 6,443,839 B2* | 9/2002 | Stockdale | G07F 17/32 | 463/16 |
| 6,503,147 B1* | 1/2003 | Stockdale | G07F 17/3202 | 463/36 |
| 6,530,842 B1* | 3/2003 | Wells | G07F 17/32 | 463/16 |
| 6,544,200 B1* | 4/2003 | Smith | A61B 5/6892 | 600/595 |
| 6,563,487 B2* | 5/2003 | Martin | A63F 13/24 | 345/156 |
| 6,572,187 B2* | 6/2003 | Laufer | A47C 9/06 | 297/331 |
| 6,656,041 B1* | 12/2003 | Kaminkow | G07F 17/34 | 463/16 |
| 6,694,034 B2* | 2/2004 | Julstrom | H04R 25/43 | 381/315 |
| 6,752,445 B1* | 6/2004 | Koehler | H01R 13/629 | 296/65.01 |
| 6,824,419 B1* | 11/2004 | Wu | H01R 13/6315 | 439/378 |
| 6,885,899 B1* | 4/2005 | Yoon | G06F 3/165 | 381/74 |
| 6,899,627 B2* | 5/2005 | Lam | G07F 17/32 | 463/16 |
| 6,928,329 B1* | 8/2005 | Giaimo | A63F 13/424 | 463/40 |
| 6,935,959 B2* | 8/2005 | Danieli | A63F 13/355 | 463/35 |
| 7,090,576 B2* | 8/2006 | Herbrich | A63F 13/12 | 463/6 |
| 7,090,582 B2* | 8/2006 | Danieli | A63F 13/215 | 463/35 |
| 7,112,139 B2* | 9/2006 | Paz Barahona | G07F 17/32 | 381/94.1 |
| 7,114,171 B2* | 9/2006 | Brady, Jr. | H04N 7/181 | 348/E7.086 |
| 7,136,498 B1* | 11/2006 | Schott | H04R 1/2842 | 381/351 |
| 7,206,426 B1* | 4/2007 | Julstrom | H04R 25/558 | 381/322 |
| 7,240,093 B1* | 7/2007 | Danieli | A63F 13/12 | 463/40 |
| 7,246,103 B2* | 7/2007 | Herbrich | A63F 13/58 | 706/62 |
| 7,290,072 B2* | 10/2007 | Quraishi | G07F 17/32 | 463/22 |
| 7,341,521 B1* | 3/2008 | Patterson | A63F 13/803 | 434/45 |
| 7,358,973 B2* | 4/2008 | Herbrich | A63F 13/803 | 463/6 |
| 7,364,508 B2* | 4/2008 | Loose | G07F 17/3227 | 463/30 |
| 7,367,886 B2* | 5/2008 | Loose | A63F 13/00 | 463/20 |
| 7,389,153 B2* | 6/2008 | Giaimo, III | A63F 13/87 | 704/E15.045 |
| 7,479,063 B1* | 1/2009 | Pryzby | G07F 17/3267 | 463/35 |
| 7,522,740 B2* | 4/2009 | Julstrom | H04R 25/554 | 381/322 |
| 7,525,546 B2* | 4/2009 | Herbrich | A63F 13/573 | 463/6 |
| 7,658,445 B2* | 2/2010 | Mittler | A47C 15/004 | 297/217.3 |
| 7,688,992 B2* | 3/2010 | Aylward | H04R 5/02 | 381/388 |
| 7,695,406 B2* | 4/2010 | Waters | A63F 13/22 | 482/8 |
| 7,704,147 B2* | 4/2010 | Quraishi | G07F 17/323 | 463/25 |
| 7,766,747 B2* | 8/2010 | Bonney | G07F 17/32 | 463/43 |
| 7,819,750 B2* | 10/2010 | Lam | G07F 17/32 | 463/43 |
| 7,826,627 B2* | 11/2010 | Radek | G07F 17/3262 | 381/104 |
| 7,832,799 B2* | 11/2010 | Davis, Jr. | A47C 15/004 | 248/500 |
| 7,867,085 B2* | 1/2011 | Pryzby | G07F 17/3227 | 463/31 |
| 7,965,295 B2* | 6/2011 | Herbrich | A63F 13/10 | 345/475 |
| 8,000,484 B2* | 8/2011 | Rasmussen | A47C 7/72 | 381/301 |
| 8,016,664 B2* | 9/2011 | Thomas | A63F 13/67 | 463/23 |
| 8,029,369 B2* | 10/2011 | Hahn | A47C 9/022 | 463/47 |
| 8,113,517 B2* | 2/2012 | Canterbury | G07F 17/32 | 463/16 |
| 8,251,452 B2* | 8/2012 | Hill | A63F 13/214 | 297/380 |
| 8,262,478 B2* | 9/2012 | Pryzby | A63F 13/08 | 463/47 |
| 8,444,487 B2* | 5/2013 | Otani | A63F 13/422 | 463/7 |
| 8,449,361 B2* | 5/2013 | Laycock | A63F 13/65 | 463/16 |
| 8,454,087 B2* | 6/2013 | Canterbury | A47C 9/022 | 381/119 |
| 8,456,475 B2* | 6/2013 | Tipping | A63F 13/573 | 345/473 |
| 8,482,519 B2* | 7/2013 | Konishi | A63F 13/42 | 345/156 |
| 8,631,355 B2* | 1/2014 | Murillo | G06F 16/436 | 715/863 |
| 8,636,570 B2* | 1/2014 | Tastad | A47C 7/727 | 463/47 |
| 8,636,598 B2* | 1/2014 | Radek | G07F 17/3216 | 463/43 |
| 8,641,526 B1* | 2/2014 | Sitnikov | A63F 13/67 | 463/37 |
| 8,663,019 B2* | 3/2014 | Lesley | G07F 17/3216 | 463/16 |
| 8,668,589 B2* | 3/2014 | Hafezi | G07F 17/3276 | 463/16 |
| 8,672,757 B2* | 3/2014 | Pryzby | A63F 13/28 | 463/47 |
| 8,672,761 B2* | 3/2014 | Kidakarn | A63F 13/245 | 463/37 |
| 8,678,923 B2* | 3/2014 | Radek | G07F 17/3216 | 463/47 |
| 8,678,936 B2* | 3/2014 | Lesley | G07F 17/32 | 381/301 |
| 8,684,819 B2* | 4/2014 | Thomas | A63F 13/10 | 463/23 |
| 8,747,225 B2* | 6/2014 | Canterbury | G07F 17/3202 | 463/16 |
| 8,777,313 B2* | 7/2014 | Butt | A63F 13/98 | 297/85 M |
| 8,794,698 B2* | 8/2014 | Halsey | A47C 7/50 | 297/16.2 |
| 8,804,093 B2* | 8/2014 | Haight | A63F 13/28 | 381/151 |

(56) References Cited

U.S. PATENT DOCUMENTS

| | | | |
|---|---|---|---|
| 8,882,582 B2 * | 11/2014 | Avent | A63F 13/803 463/31 |
| 8,894,487 B2 * | 11/2014 | Granger | G07F 17/3216 463/31 |
| 8,977,585 B2 * | 3/2015 | Cavallaro | A63F 13/65 706/46 |
| 9,044,670 B2 | 6/2015 | Sitnikov | A63F 13/533 |
| 9,058,714 B2 * | 6/2015 | Hamlin | G07F 17/3202 |
| 9,058,719 B2 * | 6/2015 | Miner | G07F 17/3204 |
| 9,142,083 B2 * | 9/2015 | Granger | G07F 17/3216 |
| 9,259,652 B2 * | 2/2016 | Woodman | A63F 13/67 |
| 9,375,640 B2 * | 6/2016 | Matsunaga | A63F 13/428 |
| 9,449,456 B2 * | 9/2016 | Granger | G07F 17/3216 |
| 9,468,848 B2 * | 10/2016 | Murillo | G06F 16/9537 |
| 9,532,655 B2 * | 1/2017 | Lulita | A47C 9/022 |
| 9,685,029 B2 * | 6/2017 | Erickson | G07F 17/32 |
| 9,776,088 B2 * | 10/2017 | Bowron | A63F 13/825 |
| 9,865,121 B2 * | 1/2018 | Glenn, II | G07F 17/3246 |
| 9,937,421 B2 * | 4/2018 | Danieau | G08B 6/00 |
| 10,046,241 B1 * | 8/2018 | Krosky | A63F 13/69 |
| 10,150,039 B2 * | 12/2018 | Thomas | A63F 13/79 |
| 10,220,310 B1 * | 3/2019 | Froy | A63F 13/24 |
| 10,286,321 B2 * | 5/2019 | Woodman | A63F 9/143 |
| 10,314,403 B2 * | 6/2019 | Schmidt | A47C 1/14 |
| 10,380,827 B2 * | 8/2019 | Czubak | G07F 17/3227 |
| 10,398,972 B2 * | 9/2019 | Murillo | A63F 13/67 |
| 10,406,438 B2 * | 9/2019 | Catlin | A63F 13/56 |
| 10,413,815 B2 * | 9/2019 | Ergen | A47C 7/72 |
| 10,575,076 B2 * | 2/2020 | Hudson, III | H04R 5/023 |
| 10,632,380 B2 * | 4/2020 | Shafto | A63F 13/211 |
| 10,653,242 B2 * | 5/2020 | Ortiz | A47C 7/72 |
| 10,724,731 B2 * | 7/2020 | McNae | A63F 13/26 |
| 10,765,949 B1 * | 9/2020 | Li | A63F 13/847 |
| 10,820,103 B1 * | 10/2020 | Hudson, III | H04R 1/2826 |
| 10,828,572 B1 * | 11/2020 | Kalama | A63F 13/67 |
| 10,888,791 B2 * | 1/2021 | Krosky | A63F 13/69 |
| 10,957,148 B2 * | 3/2021 | Barbour | G07F 17/3211 |
| 10,977,956 B1 * | 4/2021 | Madison | G09B 9/052 |
| 11,027,189 B2 * | 6/2021 | Lee | A63F 13/90 |
| 11,051,620 B2 * | 7/2021 | Fukunaga | A47C 7/72 |
| 11,058,958 B2 * | 7/2021 | Lee | B60N 2/797 |
| 11,135,513 B2 * | 10/2021 | Li | A63F 13/67 |
| 11,144,111 B1 * | 10/2021 | Hoke | G09B 9/30 |
| 11,160,704 B2 * | 11/2021 | Stajic | A63F 13/24 |
| 11,219,827 B2 * | 1/2022 | Chiu | G06F 3/0238 |
| 11,228,825 B1 * | 1/2022 | Hudson, III | H04R 1/025 |
| 11,235,709 B2 * | 2/2022 | Lee | B60R 11/0235 |
| 11,241,626 B2 * | 2/2022 | Lall | A63F 13/67 |
| 11,253,783 B2 * | 2/2022 | Lin | A63F 13/803 |
| 2001/0008841 A1 * | 7/2001 | Komata | A63F 13/803 463/43 |
| 2002/0041069 A1 * | 4/2002 | Steelman | G07F 17/32 273/148 R |
| 2002/0155887 A1 * | 10/2002 | Criss-Puszkiewicz | H04L 67/12 463/29 |
| 2003/0030619 A1 * | 2/2003 | Martin | A63F 13/218 345/156 |
| 2003/0044033 A1 * | 3/2003 | Julstrom | H04R 25/554 381/313 |
| 2003/0054880 A1 * | 3/2003 | Lam | G07F 17/32 463/29 |
| 2003/0100359 A1 * | 5/2003 | Loose | G07F 17/32 463/20 |
| 2003/0122973 A1 * | 7/2003 | Huang | G06F 1/1616 348/836 |
| 2003/0152243 A1 * | 8/2003 | Julstrom | H04R 25/554 381/315 |
| 2003/0185400 A1 * | 10/2003 | Yoshizawa | H04N 21/43615 381/74 |
| 2003/0217363 A1 * | 11/2003 | Brady | H04L 67/025 348/E7.086 |
| 2004/0007907 A1 * | 1/2004 | DiRe | A61G 15/12 297/217.3 |
| 2004/0014514 A1 * | 1/2004 | Yacenda | A63F 3/081 463/17 |
| 2004/0018867 A1 * | 1/2004 | Manz | G07F 17/3244 463/20 |
| 2004/0098795 A1 * | 5/2004 | Benkhardt | A47K 13/24 4/234 |
| 2004/0142747 A1 * | 7/2004 | Pryzby | G07F 17/323 463/35 |
| 2004/0147317 A1 * | 7/2004 | Ito | A63F 13/803 463/36 |
| 2004/0161115 A1 * | 8/2004 | Loose | G07F 17/32 381/20 |
| 2004/0162144 A1 * | 8/2004 | Loose | G07F 17/3276 463/42 |
| 2004/0254006 A1 * | 12/2004 | Lam | G07F 17/32 463/16 |
| 2004/0254020 A1 * | 12/2004 | Dragusin | A63F 13/08 463/46 |
| 2004/0258270 A1 * | 12/2004 | Shima | H04R 5/023 381/396 |
| 2004/0263693 A1 * | 12/2004 | Herbrich | A63F 13/803 348/415.1 |
| 2004/0266506 A1 * | 12/2004 | Herbrich | A63F 13/12 463/6 |
| 2004/0267683 A1 * | 12/2004 | Herbrich | A63F 13/67 706/56 |
| 2005/0053252 A1 * | 3/2005 | Cohen | H04R 5/023 381/301 |
| 2005/0054442 A1 * | 3/2005 | Anderson | G07F 17/32 463/35 |
| 2005/0159219 A1 * | 7/2005 | Oswald | A63F 13/245 463/36 |
| 2005/0164788 A1 * | 7/2005 | Grabiec | G07F 17/3202 463/20 |
| 2005/0233807 A1 * | 10/2005 | Tai | A63F 13/235 463/36 |
| 2005/0239434 A1 * | 10/2005 | Marlowe | H04N 21/41265 455/344 |
| 2005/0266922 A1 * | 12/2005 | Lee | A63F 13/02 463/37 |
| 2006/0064187 A1 * | 3/2006 | Nishikori | H04H 60/04 381/119 |
| 2006/0068908 A1 * | 3/2006 | Pryzby | G07F 17/32 463/35 |
| 2006/0068909 A1 * | 3/2006 | Pryzby | G07F 17/3227 463/35 |
| 2006/0072765 A1 * | 4/2006 | Shibutani | H04R 5/02 381/59 |
| 2006/0073881 A1 * | 4/2006 | Pryzby | G07F 17/32 463/20 |
| 2006/0100015 A1 * | 5/2006 | Loose | G07F 17/3244 463/35 |
| 2006/0116073 A1 * | 6/2006 | Richenstein | H04H 20/62 455/3.06 |
| 2006/0229163 A1 * | 10/2006 | Waters | A63F 13/22 482/8 |
| 2006/0246972 A1 * | 11/2006 | Thomas | A63F 13/10 463/4 |
| 2006/0269088 A1 * | 11/2006 | Julstrom | H04R 25/554 381/315 |
| 2007/0015570 A1 * | 1/2007 | Pryzby | G07F 17/32 463/25 |
| 2007/0066403 A1 * | 3/2007 | Conkwright | A63F 13/803 463/43 |
| 2007/0173331 A1 * | 7/2007 | Crawford, III | G07F 17/322 463/42 |
| 2007/0232395 A1 * | 10/2007 | Fujii | A63F 13/803 463/36 |
| 2007/0257530 A1 * | 11/2007 | Florez | A47C 15/004 297/217.3 |
| 2007/0262628 A1 * | 11/2007 | Perigny | A63F 13/08 297/284.4 |
| 2007/0270216 A1 * | 11/2007 | Pryzby | G07F 17/3216 463/35 |

(56) References Cited

U.S. PATENT DOCUMENTS

| | | | |
|---|---|---|---|
| 2007/0293304 A1* | 12/2007 | Loose | G07F 17/32 709/213 |
| 2008/0009347 A1* | 1/2008 | Radek | G07F 17/3227 463/43 |
| 2008/0039215 A1* | 2/2008 | Hahn | A47C 9/022 463/47 |
| 2008/0054561 A1* | 3/2008 | Canterbury | G07F 17/3202 463/47 |
| 2008/0064486 A1* | 3/2008 | Pryzby | G07F 17/32 463/25 |
| 2008/0070685 A1* | 3/2008 | Pryzby | G07F 17/32 463/35 |
| 2008/0096666 A1* | 4/2008 | Pryzby | G07F 17/32 709/213 |
| 2008/0111408 A1* | 5/2008 | Duran | A63F 13/98 297/217.3 |
| 2008/0129874 A1* | 6/2008 | Herbrich | A63F 13/803 348/699 |
| 2008/0139284 A1* | 6/2008 | Pryzby | G07F 17/32 463/20 |
| 2008/0161108 A1* | 7/2008 | Dahl | G07F 17/3202 463/35 |
| 2008/0176654 A1* | 7/2008 | Loose | G07F 17/3227 463/35 |
| 2008/0188291 A1* | 8/2008 | Bonney | G07F 17/3227 463/43 |
| 2008/0194319 A1* | 8/2008 | Pryzby | G07F 17/32 463/43 |
| 2008/0211276 A1* | 9/2008 | Rasmussen | A47C 9/022 297/217.3 |
| 2008/0214289 A1* | 9/2008 | Pryzby | G07F 17/3209 463/43 |
| 2008/0234026 A1* | 9/2008 | Radek | G07F 17/3202 463/16 |
| 2008/0246321 A1* | 10/2008 | Canterbury | A47C 9/022 463/47 |
| 2009/0041257 A1* | 2/2009 | Yoshizawa | H04N 21/4882 381/59 |
| 2009/0051690 A1* | 2/2009 | Tipping | A63F 13/803 345/473 |
| 2009/0082112 A1* | 3/2009 | Itskov | A63F 13/46 463/42 |
| 2009/0170597 A1* | 7/2009 | Bone | G07F 17/323 463/25 |
| 2009/0209326 A1* | 8/2009 | Okada | G07F 17/3206 463/43 |
| 2009/0225087 A1* | 9/2009 | Herbrich | A63F 13/803 345/474 |
| 2009/0298579 A1* | 12/2009 | Radek | G07F 17/32 463/43 |
| 2010/0029385 A1* | 2/2010 | Garvey | 463/35 |
| 2010/0075750 A1* | 3/2010 | Bleich | G07F 17/3218 463/30 |
| 2010/0099487 A1* | 4/2010 | Canterbury | G07F 17/32 463/47 |
| 2010/0248815 A1* | 9/2010 | Radek | G07F 17/3202 463/25 |
| 2010/0279823 A1* | 11/2010 | Waters | A63B 71/0622 482/8 |
| 2010/0298051 A1* | 11/2010 | Loose | G07F 17/32 463/35 |
| 2010/0317437 A1* | 12/2010 | Berry | G07F 17/3202 463/43 |
| 2011/0003631 A1* | 1/2011 | Tastad | G07F 17/3216 463/47 |
| 2011/0043006 A1* | 2/2011 | Butt | A47C 7/723 297/217.3 |
| 2011/0069003 A1* | 3/2011 | Konishi | A63F 13/42 345/156 |
| 2011/0086686 A1* | 4/2011 | Avent | A63F 13/537 463/31 |
| 2011/0086747 A1* | 4/2011 | Broderick | A63F 13/24 482/142 |
| 2011/0111839 A1* | 5/2011 | Lesley | G07F 17/3216 463/25 |
| 2011/0111847 A1* | 5/2011 | Lesley | A47C 7/72 463/30 |
| 2011/0115262 A1* | 5/2011 | Hill | A63F 13/214 297/16.1 |
| 2011/0124409 A1* | 5/2011 | Baynes | A63F 13/67 463/43 |
| 2011/0173204 A1* | 7/2011 | Murillo | A63F 13/213 715/863 |
| 2011/0254327 A1* | 10/2011 | Halsey | A47C 7/50 297/188.15 |
| 2011/0275436 A1* | 11/2011 | Kidakarn | A63F 13/803 463/37 |
| 2012/0071246 A1* | 3/2012 | Thomas | A63F 13/79 463/43 |
| 2012/0108321 A1* | 5/2012 | Radek | G07F 17/3216 463/25 |
| 2012/0108333 A1* | 5/2012 | Radek | G07F 17/3216 463/47 |
| 2012/0115589 A1* | 5/2012 | Canterbury | G07F 17/32 463/25 |
| 2012/0115596 A1* | 5/2012 | Otani | A63F 13/422 463/30 |
| 2012/0115609 A1* | 5/2012 | Sugiyama | A63F 13/218 463/36 |
| 2012/0129585 A1* | 5/2012 | Laycock | G06Q 10/10 463/9 |
| 2012/0231881 A1* | 9/2012 | Matsunaga | A63F 13/26 463/31 |
| 2012/0233105 A1* | 9/2012 | Cavallaro | A63F 13/46 703/3 |
| 2012/0258791 A1* | 10/2012 | Pryzby | G07F 17/3216 463/25 |
| 2012/0282997 A1* | 11/2012 | Miner | G07F 17/3216 463/25 |
| 2012/0289312 A1* | 11/2012 | Hamlin | G07F 17/3216 463/25 |
| 2012/0302302 A1* | 11/2012 | Hamlin | G07F 17/3202 463/31 |
| 2012/0302323 A1* | 11/2012 | Gagner | G07F 17/3202 463/25 |
| 2012/0315971 A1* | 12/2012 | Granger | G07F 17/3216 463/16 |
| 2012/0315985 A1* | 12/2012 | Granger | G07F 17/3216 463/31 |
| 2012/0322564 A1* | 12/2012 | Granger | G07F 17/3216 463/46 |
| 2013/0005442 A1* | 1/2013 | Erickson | G07F 17/3216 463/25 |
| 2013/0059667 A1* | 3/2013 | Nadal Berlinches | A63F 13/98 463/47 |
| 2013/0083061 A1* | 4/2013 | Mishra | A63F 13/803 345/633 |
| 2013/0107216 A1* | 5/2013 | Haight | A63F 13/28 352/1 |
| 2013/0273987 A1* | 10/2013 | Laycock | G06Q 10/10 463/9 |
| 2014/0109023 A1* | 4/2014 | Murillo | G06F 16/436 715/863 |
| 2014/0113721 A1* | 4/2014 | Sitnikov | A63F 13/67 463/31 |
| 2014/0200059 A1* | 7/2014 | Thomas | A63F 13/00 463/2 |
| 2014/0256447 A1* | 9/2014 | Woodman | A63F 13/44 463/42 |
| 2015/0048933 A1* | 2/2015 | Danieau | G08B 6/00 340/407.1 |
| 2015/0099566 A1* | 4/2015 | Lall | A63F 13/56 463/6 |
| 2015/0289662 A1* | 10/2015 | Iulita | A47C 9/022 297/344.1 |
| 2016/0045828 A1* | 2/2016 | Bowron | A63F 13/67 463/31 |

(56) References Cited

U.S. PATENT DOCUMENTS

| | | | |
|---|---|---|---|
| 2016/0151712 A1* | 6/2016 | Woodman | A63F 9/143 463/6 |
| 2016/0303473 A1* | 10/2016 | Cheung | A63F 13/245 |
| 2016/0320862 A1* | 11/2016 | Schradin | A63F 13/211 |
| 2017/0144067 A1* | 5/2017 | Murillo | A63F 13/42 |
| 2017/0251979 A1 | 9/2017 | Franz et al. | |
| 2017/0333798 A1* | 11/2017 | Hnida | A63F 13/245 |
| 2018/0049553 A1* | 2/2018 | Fecher | A63B 67/002 |
| 2018/0053433 A1* | 2/2018 | Dunn | G09B 7/00 |
| 2018/0207485 A1* | 7/2018 | Sun | A63F 13/212 |
| 2018/0240297 A1* | 8/2018 | Czubak | G07F 17/3209 |
| 2018/0240298 A1* | 8/2018 | Czubak | G07F 17/3209 |
| 2018/0279788 A1* | 10/2018 | Schmidt | A63B 67/06 |
| 2018/0304774 A1 | 10/2018 | Mizoi | |
| 2018/0353863 A1* | 12/2018 | Krosky | A63F 13/67 |
| 2019/0030432 A1* | 1/2019 | Catlin | A63F 13/50 |
| 2019/0046871 A1* | 2/2019 | Froy | G07F 17/32 |
| 2019/0070501 A1* | 3/2019 | Shafto | A63F 13/52 |
| 2019/0080554 A1* | 3/2019 | Barbour | G07F 17/3209 |
| 2019/0111337 A1* | 4/2019 | Ergen | A63F 13/245 |
| 2019/0121425 A1* | 4/2019 | Lee | A47C 7/004 |
| 2019/0126097 A1* | 5/2019 | Thomson | A63B 21/0555 |
| 2019/0293278 A1* | 9/2019 | McNae | A47B 3/02 |
| 2019/0354099 A1* | 11/2019 | Shomin | A63F 13/25 |
| 2020/0035114 A1* | 1/2020 | Koga | A47C 3/0255 |
| 2020/0047069 A1* | 2/2020 | Wang | A63F 13/285 |
| 2020/0069059 A1* | 3/2020 | Ortiz | A47C 4/24 |
| 2020/0206620 A1* | 7/2020 | Hayashi | A63F 13/67 |
| 2020/0238178 A1* | 7/2020 | Lin | A63F 13/56 |
| 2020/0281359 A1* | 9/2020 | Fukunaga | A47C 31/008 |
| 2020/0286328 A1* | 9/2020 | Czubak | G07F 17/3244 |
| 2020/0298130 A1* | 9/2020 | Lai | A63F 13/67 |
| 2020/0346106 A1* | 11/2020 | Lee | G06F 3/04883 |
| 2020/0353356 A1* | 11/2020 | Li | A63F 13/67 |
| 2020/0360204 A1* | 11/2020 | Stajic | A47C 15/004 |
| 2020/0377036 A1* | 12/2020 | Lee | G06F 3/03547 |
| 2020/0384355 A1* | 12/2020 | Gruzdev | A63F 13/218 |
| 2021/0016184 A1* | 1/2021 | Kalama | A63G 31/16 |
| 2021/0016187 A1* | 1/2021 | Lee | B60N 2/002 |
| 2021/0065508 A1* | 3/2021 | Abrahamson | G07F 17/3272 |
| 2021/0170283 A1* | 6/2021 | Brown | A63F 13/65 |
| 2021/0183202 A1* | 6/2021 | Barbour | G07F 17/3211 |
| 2021/0192968 A1* | 6/2021 | Madison | G09B 9/052 |
| 2021/0197090 A1* | 7/2021 | Chiu | A63F 13/67 |
| 2021/0260481 A1* | 8/2021 | Kawamoto | A63F 13/49 |
| 2021/0260482 A1* | 8/2021 | Nakahashi | G06N 20/00 |
| 2021/0264806 A1* | 8/2021 | Ariki | G06N 20/00 |
| 2021/0365782 A1* | 11/2021 | Huang | A63F 13/335 |
| 2021/0370180 A1* | 12/2021 | Carraway | A63F 13/497 |
| 2021/0374560 A1* | 12/2021 | Alameh | A63F 13/214 |
| 2021/0379498 A1* | 12/2021 | Sampaio | A63F 13/245 |
| 2021/0380189 A1* | 12/2021 | Tett | B62J 45/42 |
| 2022/0008834 A1* | 1/2022 | Szabolcs | A63F 13/98 |
| 2022/0054335 A1* | 2/2022 | Stajic | A47C 9/025 |
| 2022/0111296 A1* | 4/2022 | Kaku | A63F 13/98 |

FOREIGN PATENT DOCUMENTS

| | | |
|---|---|---|
| JP | 2014151027 | 8/2014 |
| JP | 2017065504 | 4/2017 |
| JP | 2017081194 | 5/2017 |
| JP | 2018090057 A | 6/2018 |

OTHER PUBLICATIONS

Office Action issued for Japanese Patent Application No. 2018-224038, dated Oct. 4, 2022, 6 pages including English translation.

* cited by examiner

| IDENTIFICATION INFORMATION | TOTAL GOAL TIME (s) | NUMBER OF ACQUISITIONS |
|---|---|---|
| 00001 | 372 | 30 |
| 00002 | 850.2 | 78 |
| 00003 | 2019.6 | 132 |
| ⋮ | | |

FIG.24

| EXERCISE POINT Pt | EVALUATION VALUE |
|---|---|
| Pt <35 | Worst |
| 35≤ Pt <70 | Bad |
| 70≤ Pt <90 | Good |
| 90≤ Pt <110 | Great |
| 110≤ Pt | Excellent |

FIG.29
(a)
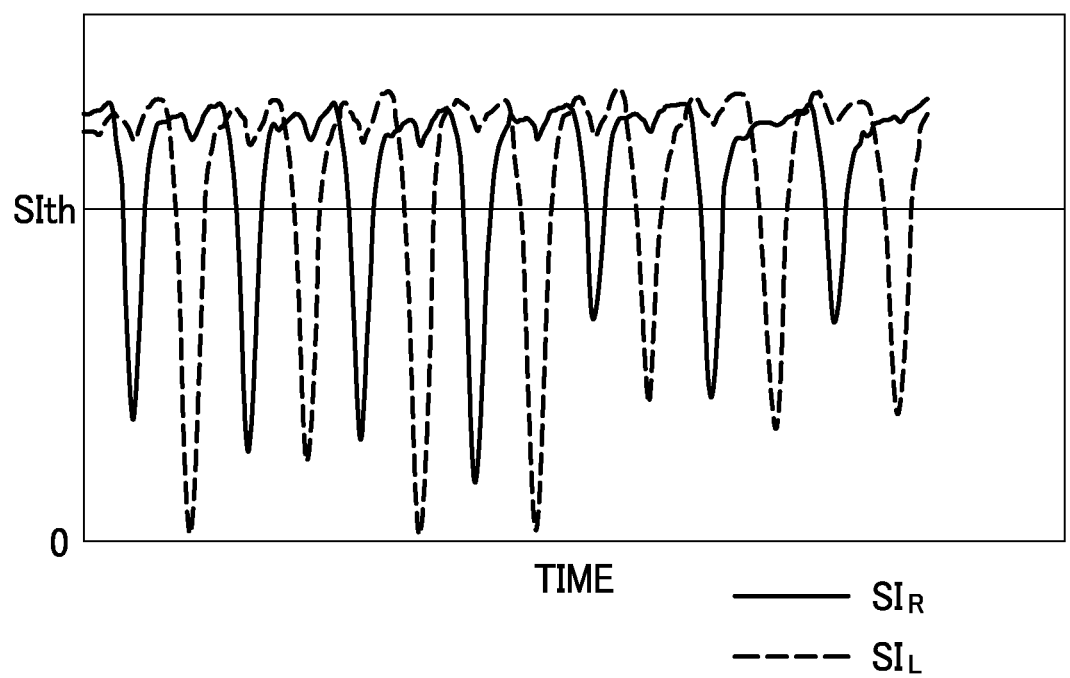
(b)
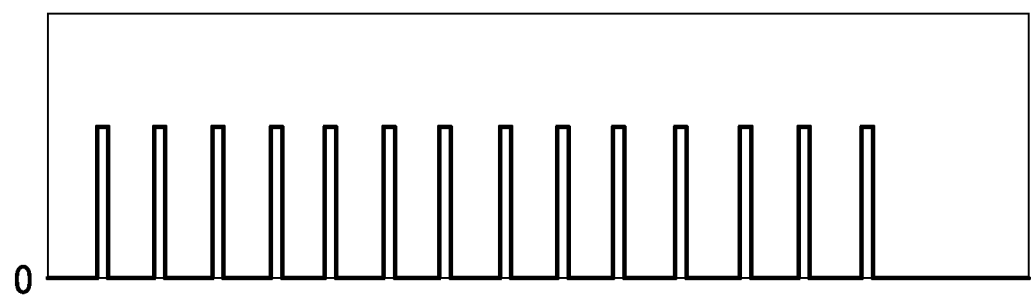

FIG.30
(a)
INFRARED SENSOR MEASUREMENT VALUES
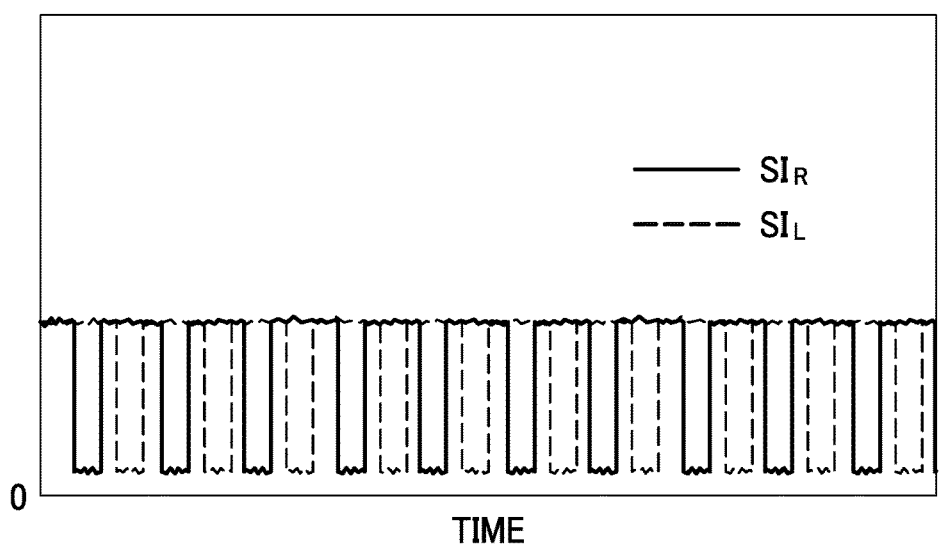
(b)
CORRECTED INPUT SIGNALS
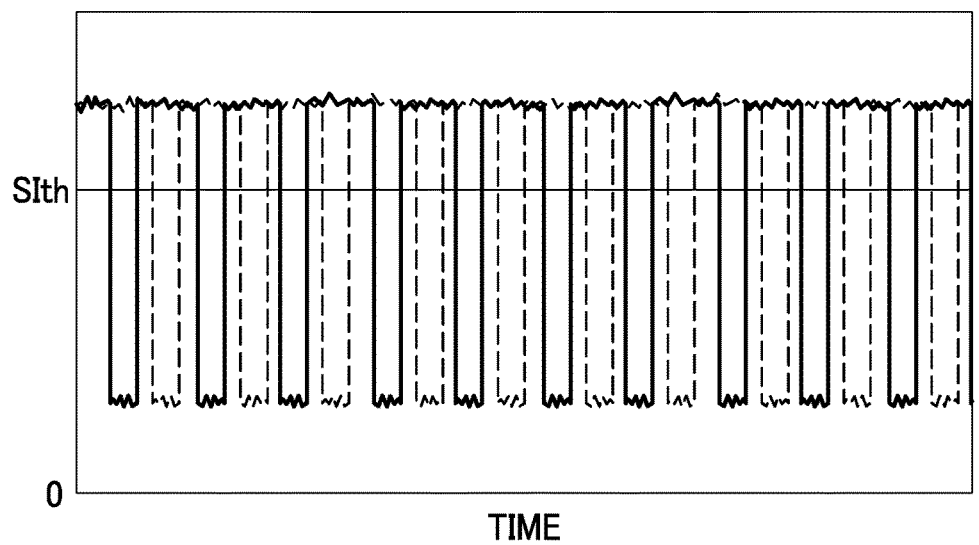
(c)
DETECTION SIGNALS
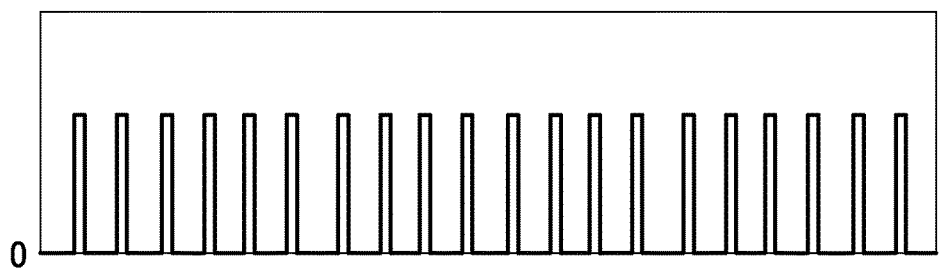

(a)

(b)

| No. | FUNCTION |
|---|---|
| 1~12 | SIGNAL TERMINAL |
| 13 | 5V TERMINAL |
| 14~20 | IDENTIFICATION TERMINAL |

(a)

| 14 | CONTENTS |
|---|---|
| LOW | A COMPANY SENSOR |
| HIGH | B COMPANY SENSOR |

(b)

| 15 | 16 | 17 | CONTENTS |
|---|---|---|---|
| LOW | LOW | LOW | PRESSURE SENSOR |
| LOW | LOW | HIGH | INFRARED SENSOR |
| LOW | HIGH | LOW | HEARTBEAT SENSOR |
| ⋮ | ⋮ | ⋮ | ⋮ |

FIG.37
(a)
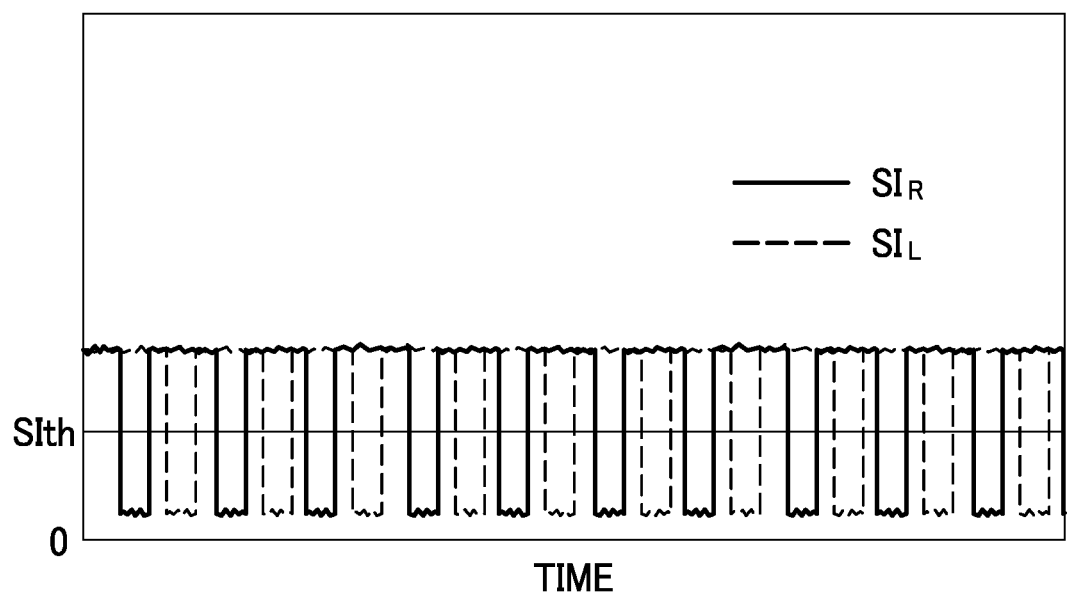
(b)
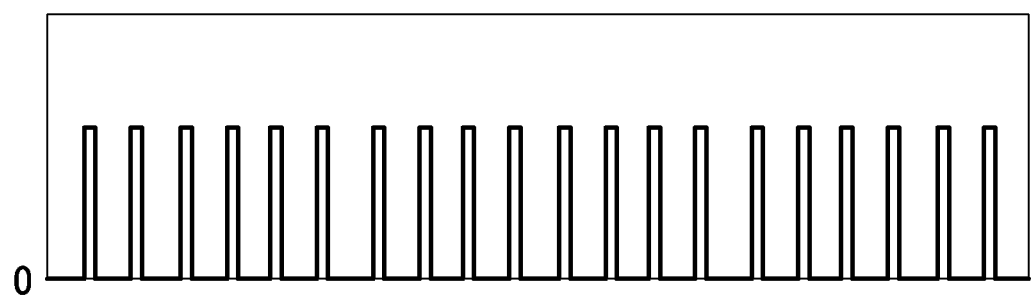

FIG.43

| NUMBER OF STEPS | ACTIVITY PLAN |
|---|---|
| 0~3000 | 100 METER DASH |
| 3000~5000 | ZAZEN |
| 5000~ | BREAK TIME |

SEAT SYSTEM AND SEAT EXPERIENCE DEVICE

TECHNICAL FIELD

The present disclosure relates to a seat system and a seat experience device comprising a seat having a sensor.

BACKGROUND ART

A vehicle seat with a plurality of pressure sensors provided on the seat to detect a sitting posture of an occupant is known in the art (Patent Document 1). A device with a pressure sensor or the like provided on a driver's seat to estimate a sitting posture of an occupant is also known in the art (Patent Document 2).

CITATION LIST

Patent Document

Patent Document 1: JP 2017-65504 A
Patent Document 2: JP H11-064131 A

SUMMARY OF INVENTION

However, since the vehicle seat of Patent Document 1 only evaluates and presents the sitting posture of the occupant, the effective use of the vehicle seat is an issue.

In one aspect, a new value for a seat is suggested that provides a seat system and a seat experience device which allows players to compete at the same level even when physical abilities of the players vary greatly, for example, when a competitive game is played using a seat with a sensor.

A seat system comprising a seat including a seat body, and a sensor provided at the seat body and configured to acquire information for detection of a motion of an occupant seated on the seat body; a terminal device configured to acquire the information from the sensor; and a server capable of communicating with the terminal device is disclosed.

The terminal device is configured to: execute a game program using the sensor, based on the information, and acquire an execution result corresponding to the occupant for a game provided by execution of the game program and played by the occupant.

The server is configured to: generate integrated data by integrating execution results of the game acquired from another terminal device, and compute a reference value for the execution results of the game based on the integrated data.

The terminal device or the server is configured to: assign a difficulty level of the game for the terminal device based on the execution result corresponding to the occupant and the reference value.

The terminal device is configured to reflect the difficulty level on the game during execution of the game program.

Further, a seat experience device comprising: a seat including a seat body, and a sensor provided at the seat body and configured to acquire information for detection of a motion of an occupant seated on the seat body; and a terminal device configured to acquire the information from the sensor and capable of communicating with a server is disclosed.

The terminal device is configured to: execute a game program using the sensor, based on the information, and acquire an execution result corresponding to the occupant for a game provided by execution of the game program and played by the occupant.

The server is configured to: generate integrated data by integrating execution results of the game acquired from another terminal device, and compute a reference value for the execution results of the game based on the integrated data.

The terminal device is configured to reflect a difficulty level for the terminal device on the game during execution of the game program, the difficulty level of the game being assigned based on the execution result corresponding to the occupant and the reference value.

According to such a seat system or such a seat experience device, the difficulty level which is assigned based on a reference value computed based on the execution results of a game played on another terminal device, and the execution result of the game corresponding to the occupant is reflected on the game played on the terminal device of the occupant. Therefore, for example, when a person playing the game on another terminal device and the occupant play a competitive game, they are allowed to compete at the same level.

The terminal device or the server may be configured to assign the difficulty level of the game by setting a control amount for a control target which is controlled in the game based on the execution result corresponding to the occupant and the reference value.

According to this configuration, since the control amount is set in accordance with the difficulty level of the game, for example, compared to an alternative configuration in which a difficulty level is reflected on execution results, for example, advantageous effects can be achieved such as enabling a control target which is controlled on the another terminal device and a control target which is controlled on the occupant's terminal device to compete on the same screen.

The terminal device or the server may be configured to: accumulate execution results corresponding to the occupant as an individual overall result associated with identification information of the occupant, compute an individual reference value for the execution results of the game for the occupant corresponding to the identification information based on the individual overall result, and assign the difficulty level based on the individual reference value and the reference value.

Since the execution results of the occupant are accumulated as the individual overall result, it is possible to reduce variations in the execution results corresponding to the occupant and assign the difficulty level. Therefore, it is possible to reduce large fluctuations in the difficulty level due to variations in the execution results.

The reference value may be an average value of the execution results of the game accumulated as the integrated data.

According to this configuration, for example, compared to an alternative configuration in which a median value of the execution results of the game accumulated in the integrated data is used as the reference value, a proper value for the reference value can be computed easily.

The terminal device or the server may be configured to lower the difficulty level when the execution result corresponding to the occupant is worse than the reference value.

The terminal device or the server may be configured to raise the difficulty level when the execution result corresponding to the occupant is better than the reference value.

In the specific examples described below, a program is disclosed that is configured to cause a terminal device to operate together with a seat system comprising a seat including a sensor based on information acquired from the seat including the sensor.

A new value is suggested that provides a seat system and a program configured to make an occupant seated on a seat properly preform an activity plan such as an exercise.

The seat system comprises a seat including a seat body and a plurality of sensors provided at the seat body and configured to acquire information for detection of motion of the occupant seated on the seat body, and a terminal device configured to acquire the information from the sensor.

The terminal device is configured to provide instructions to instruct the occupant to make a predetermined pose, display on the screen of the terminal device a plurality of first images located in positions corresponding to the plurality of sensors provided at the seat body, display the first images corresponding to target sensors which should be caused to react more strongly compared with non-target sensors which are not targets when the occupant makes the predetermined pose on the seat body so as to stand out compared with the other first images, and compute an evaluation value which indicates a degree of match between an occupant's pose and the predetermined pose based on the information.

The program is a program for causing the terminal device to operate based on the information acquired from the plurality of sensors provided on the seat body.

The program causes the terminal device to function as a means for instructing the occupant to make the predetermined pose, displaying the plurality of first images in positions corresponding to the plurality of sensors provided at the seat body and cause the first images corresponding to the target sensors which should be caused to react more strongly compared with the non-target sensors which are not targets when the occupant makes the predetermined pose on the seat body in such a manner as to stand out compared with the other first images, and computing the evaluation value which indicates the degree of match between the occupant's pose and the predetermined pose.

According to such a seat system or such a program, since the first images corresponding to the target sensors are displayed to stand out compared with the other first images when the occupant seated on the seat makes the predetermined pose according to the instructions from the terminal device, it is possible to make the occupant seated on the seat to properly carry out an activity plan such as an exercise.

The terminal device may be configured to change the predetermined pose every predetermined time period.

The terminal device may be configured to display the first images corresponding to the target sensors in a color different from the other first mages.

According to this configuration, the first images corresponding to the target sensors can be caused to clearly stand out due to the difference in color.

The terminal device may be configured to display on the screen a plurality of second images located in positions corresponding to the plurality of sensors provided at the seat body and to display the second images corresponding to sensors which react more strongly compared with the other sensors to stand out compared with the other second images based on the information when the occupant makes the predetermined pose on the seat body.

According to this configuration, since the first images which are targets for the pose and the second images which change depending on the motion of the occupant are displayed on the screen, it is possible to properly check whether the occupant is making the predetermined pose.

The terminal device may be configured to display the second images corresponding to the sensors which react more strongly compared with the other sensors larger than the other second images.

According to this configuration, the second images corresponding to the sensors which react more strongly can be caused to clearly stand out by the difference in size.

The terminal device may be configured to display on the screen the plurality of first images and the plurality of second images side by side.

According to this configuration, since the plurality of first images and the plurality of second images are displayed side by side, the occupant can easily compare the first images which are targets and the second images which change depending on the motion of the occupant can be easily compared.

The terminal device may be configured to display on the screen the plurality of first images and the plurality of second images in an overlapped manner.

According to this configuration, since the plurality of first images and the plurality of second images are overlapped, the occupant can easily compare the first images which are targets and the second images which change depending on the motion of the occupant.

The terminal device may be configured to compute a higher evaluation value, when the information acquired from the target sensors is equal to or higher than a first threshold, than when the information is lower than the first threshold, within a predetermined time period including a time of instruction of the predetermined pose.

According to this configuration, for example, compared to an alternative method in which an evaluation value is computed based on information acquired at the time of instruction of the predetermined pose, the degree of match between the occupant's pose and the predetermined pose can be properly determined since the evaluation value is computed based on the information acquired within the predetermined time period.

The terminal device may compute a higher evaluation value, when the information acquired from the non-target sensors is equal to or lower than a second threshold, than when the information is higher than the second threshold, within a predetermined time period including the time of instruction of the predetermined pose.

According to this configuration, for example, compared to an alternative method in which an evaluation value is computed based on information acquired at the time of instruction of the predetermined pose, the degree of match between the occupant's pose and the predetermined pose can be properly determined since the evaluation value is computed based on the information acquired within the predetermined time period.

The seat body may comprise a seat cushion and a seat back, and the sensor may be provided at both the seat cushion and the seat back.

According to this configuration, since the motion of the upper body and the lower body of the occupant can be detected by the sensors, the predetermined pose can include various poses, and it is possible to instruct the occupant to make various motions.

The sensor may be a pressure sensor.

According to this configuration, for example, compared to a structure using an optical sensor which only provides ON and OFF output signals as the sensor, for example, the degree of noticeability of the first images may be set by three or more levels and the predetermined pose can include various poses since continuously changing pressure values can be obtained.

In the specific examples described below, a seat system is disclosed that comprises a seat experience device capable of detecting, and operating by, a motion of an occupant.

The device described in Patent Document 2 also cannot be used so effectively since it only evaluates and presents the evaluation of a sitting posture of the driver. Therefore, the developers of the present invention and their colleagues are considering a seat system comprising a seat experience device which can be operated by the motion of the occupant in order to suggest a new value for a seat. Future Seats may be considered as places used to perform activities and not just for sitting.

However, if there is only one type of sensor for detecting the motion of the occupant for operating the seat experience device, there is a problem that a person who cannot make a motion suitable to that sensor, for example, some disabled people cannot use the seat to perform activities.

It is desirable that many people be able to use the seat to preform activities.

A seat system comprising a first seat body, a second seat body, a first sensor provided at the first seat body and configured to acquire a first measurement value for detecting a motion of an occupant seated on the first seat body, a second sensor different from the first sensor, provided at the second seat body and configured to acquire a second measurement value for detecting a motion of an occupant seated on the second seat body, and a seat experience device configured to be capable of acquiring the first measurement value from the first sensor and the second measurement value from the second sensor is suggested.

The seat experience device includes a motion detection unit which is configured to detect the motion of the occupant based on an acquired input signal to be capable of detecting the motion of the occupant by either the first measurement value or the second measurement value. The seat experience device is configured to be capable of carrying out a specific operation based on the motion detection unit detecting the motion of the occupant.

According to this configuration, the occupant seated on the first seat can cause the first sensor to detect his/her motion and cause the seat experience device to carry out the specific operation based on this detection. On the other hand, the occupant seated on the second seat can cause the second sensor to detect his/her motion and cause the seat experience device to carry out the specific operation based on this detection. Accordingly, people who can only make a motion which can only be detected by one of the first sensor and the second sensor can also perform the activities using the seat. Therefore, many kinds of people can use the seat to perform activities. For example, people who cannot make the same motions can participate in the same community and enjoy an experience through use of the seat.

As another aspect, the seat system may comprise a seat body, a first sensor provided at the seat body and configured to acquire a first measurement value for detecting a motion of an occupant seated on the seat body, a second sensor provided at the seat body and configured to acquire a second measurement value of a type different from that of the first measurement value, and a seat experience device configured to be capable of acquiring the first measurement value from the first sensor and the second measurement value from the second sensor. That is, a single seat body may include the first sensor and the second sensor.

According to this configuration, the occupant seated on the seat body can cause the first sensor to detect his/her motion and cause the seat experience device to carry out a specific operation based on this detection, and cause the second sensor to detect his/her motion and cause the seat experience device to carry out the specific operation based on this detection. Accordingly, a person who can only make a motion which can only be detected by one of the first sensor and the second sensor can also perform activities using the seat. Therefore, many kinds of people can perform activities using the seat.

In the seat system described above, it is desirable that the seat experience device be configured to prompt the occupant to make a motion.

According to this configuration, it is possible to instruct the occupant to make a motion and effectively use the seat system.

In the above-described seat system, the second sensor may include an amplifier circuit for approximating the amplitude of the second measurement value to the amplitude of the first measurement value.

According to this configuration, it will become unnecessary to adjust the output of input signals from the sensor.

In the above-described seat system, the seat experience device may include a sensor distinction unit configured to identify whether the sensor connected to allow acquisition of a measurement value is the first sensor or the second sensor, and a signal correction unit which corrects the magnitude of an input signal acquired from the second sensor when the sensor identified in the sensor distinction unit is the second sensor in such a manner that an amplitude of the input signal approximates the case where a signal is acquired from the first sensor.

According to this configuration, by correcting the magnitude of the input signal in response to the characteristics of the second sensor, it is possible to make the seat experience device operate, when the second sensor is used, in a manner similar to the manner the seat experience device operates when the first sensor is used.

In the above-described seat system, the seat experience device may include a sensor distinction unit configured to identify whether the sensor connected to allow acquisition of a measurement value is the first sensor or the second sensor, and a threshold setting unit which is configured to set a first threshold as a threshold when the sensor identified in the sensor distinction unit is the first sensor, and to set a second threshold different from the first threshold as the threshold when the sensor identified in the sensor distinction unit is the second sensor. In this case, the motion detection unit can detect the motion of the occupant by comparing the input signal and the threshold set in the threshold setting unit.

According to this configuration, by setting the threshold according to respective characteristics of the first sensor and the second sensor, the seat experience device may be caused to operate, when the second sensor is used, in a manner similar to the manner the seat experience device operates when the first sensor is used.

The above-described seat system may comprise a first connector which is connected to the first sensor and includes a plurality of terminals, and a second connector which is connected to the second sensor and includes a plurality of terminals, and a third connector which is connectable to both the first sensor and the second sensor and connected to the above-described seat experience device. In this case, the combination of connections between the plurality of terminals of the second connector are different from the combination of connections between the plurality of terminals of the first connector, and the sensor distinction unit can identify whether the connected sensor is the first connector or the second connector by identifying whether the connector connected to the third connector is the first connector or the second connector.

The third connector includes a common output terminal set at a predetermined voltage and at least one identification signal input terminal for detecting a voltage; the first connector and the second connector include a common input terminal that contacts the common output terminal; at least one of the first connector and the second connector includes at least one identification terminal which contacts the identification signal input terminal and is electrically connected to the common input terminal; and the first connector and the second connector may have portions corresponding to the at least one identification signal input terminal in which portions identification terminal arrangements are different from each other.

According to this configuration, the seat experience device can identify the type of sensor even if it does not include an IC chip, etc. having a storage medium.

In the specific examples described below, another aspect of a seat system comprising a seat including a sensor is disclosed.

A new value is suggested that provides a seat system capable of providing an occupant seated on a seat including a sensor with an activity plan suitable for physical information, biological information, activity information, etc. of the occupant.

The seat system comprises a seat including a seat body, and a first sensor provided at the seat body and configured to acquire first information for detection of a motion of an occupant seated on the seat body, a wearable device worn by the occupant and including a second sensor configured to acquire second information for detecting the physical state of the occupant, and a terminal device configured to acquire the first information from the first sensor and the second information from the wearable device.

The terminal device presents an activity plan using the first sensor to the occupant based on the second information.

According to this configuration, since the terminal device presents the activity plan using the first sensor to the occupant based on the second information acquired from the wearable device worn by the occupant, it is possible to present an activity plan to the occupant suitable for the physical state, biological information, activity information, etc. of the occupant.

The first sensor may be a pressure sensor and the first information may be a pressure value.

According to this configuration, an activity plan using the pressure sensor, for example, for encouraging the occupant to perform an exercise can be presented to the occupant.

The terminal device may determine whether or not the occupant is seated on the seat body based on the first information and present the plan to the occupant on the condition that it is determined that the occupant is seated.

According to this configuration, since the plan is presented when the occupant is capable of using the seat, the occupant can select and carry out the plan without delay.

When the occupant carries out the plan, the terminal device may compute the amount of activity of the occupant practicing the plan based on the first information, and inform the occupant of the amount of activity.

According to this configuration, since the amount of activity is computed and the occupant is informed thereof when the occupant carries out the plan, the occupant can easily know how much activity has been performed.

When the occupant carries out the plan, the terminal device may compute the amount of activity of the occupant when the occupant is practicing the plan based on the first information and present the plan based on the amount of activity and the second information.

According to this configuration, after the plan determined based on the second information is carried out, the plan is determined again based on the amount of activity on which the execution results of the plan is reflected and the second information, and this plan is presented to the occupant; therefore, it is possible to present a plan most suitable for the physical state of the occupant at that time.

The terminal device may transmit the amount of activity to the wearable device.

According to this configuration, the amount of activity on the seat can be used in the wearable device; therefore, for example, it is possible to cause the wearable device to store an accurate amount of activity.

The terminal device may compare the second information with a specific reference value in order to determine a plan to present to the occupant.

According to this configuration, a suitable plan can be determined in the terminal device.

BRIEF DESCRIPTION OF DRAWINGS

FIG. 24 is a diagram showing a table for computing an evaluation value from an exercise point.

FIG. 29 are (a) a graph showing measurement values of pressure sensors, and (b) a graph showing detection signals.

FIG. 30 are (a) a graph showing measurement values of infrared sensors, (b) a graph showing iput signals after correction, and (c) a graph showing detection signals.

FIG. 37 is (a) a graph of measurement values of infrared sensors and (b) a graph of detection signals in the fourth embodiment.

FIG. 43 is a diagram showing a table for determining an activity plan from the number of steps.

DESCRIPTION OF EMBODIMENTS

Next, a first embodiment will be described with reference made to accompanying drawings.

Figure 1:
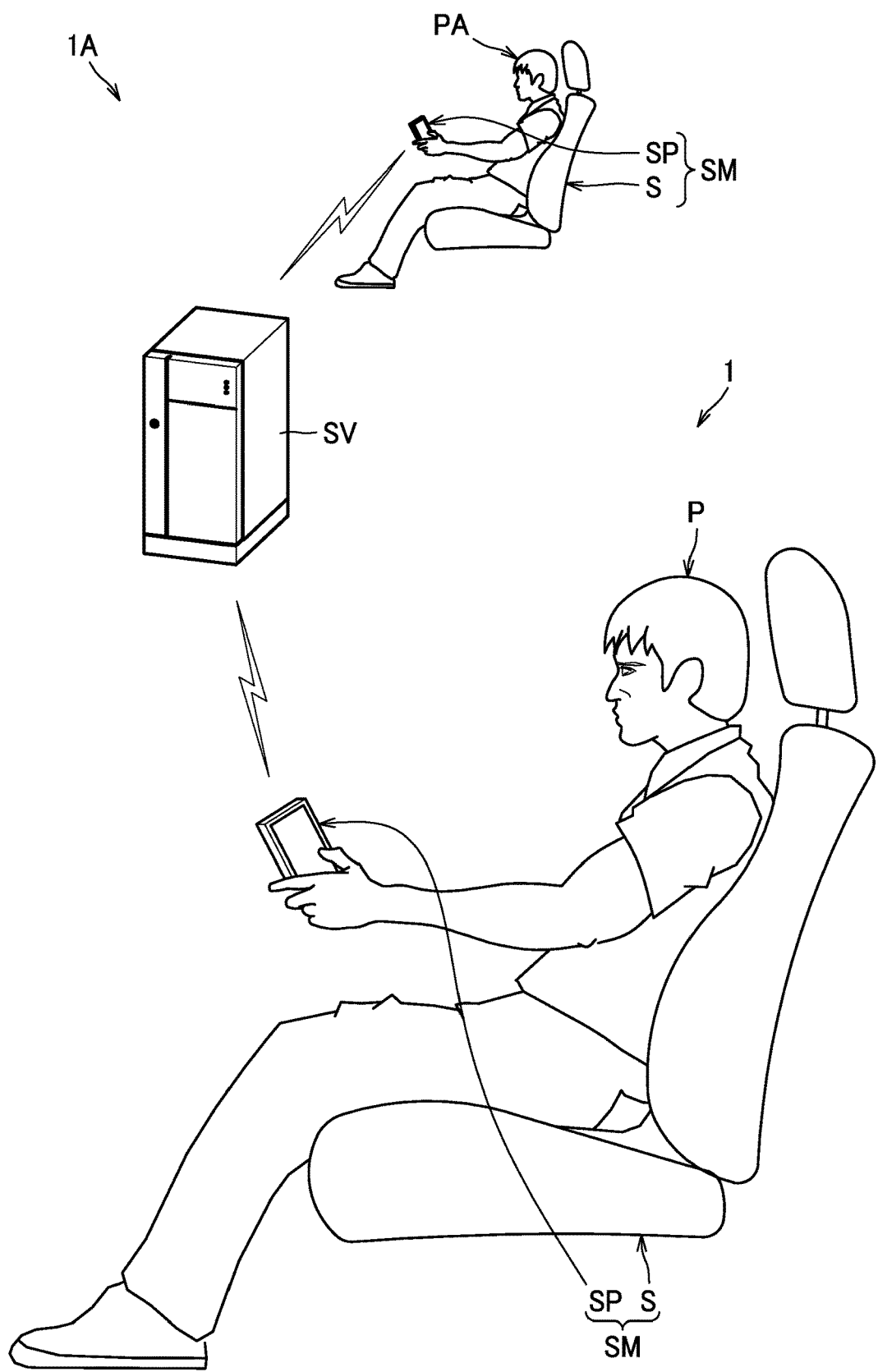
FIG. 1 is a diagram showing a first embodiment of a seat system.

As shown in FIG. 1, a seat system 1 comprises a seat experience device SM and a server SV. The seat experience device SM includes a seat S and a smartphone SP as an example of a terminal device.

The server SV also constitutes another seat system 1A. Specifically, the another seat system 1A is a system used by a person (hereinafter also referred to as "another person PA") other than an occupant P that uses the seat system 1. This seat system 1A comprises a seat experience device SM (a seat S and a smartphone SP) and the server SV. Since hardware constituting each system 1, 1A has the same structure and function, the hardware constituting the seat system 1 will be explained hereafter.

The seat S, in one example, is a vehicle seat to be installed on a vehicle such as a car. Hereafter, front-rear, left-right, up-down will be defined with respect to the occupant P seated on the seat S.

Figure 2:
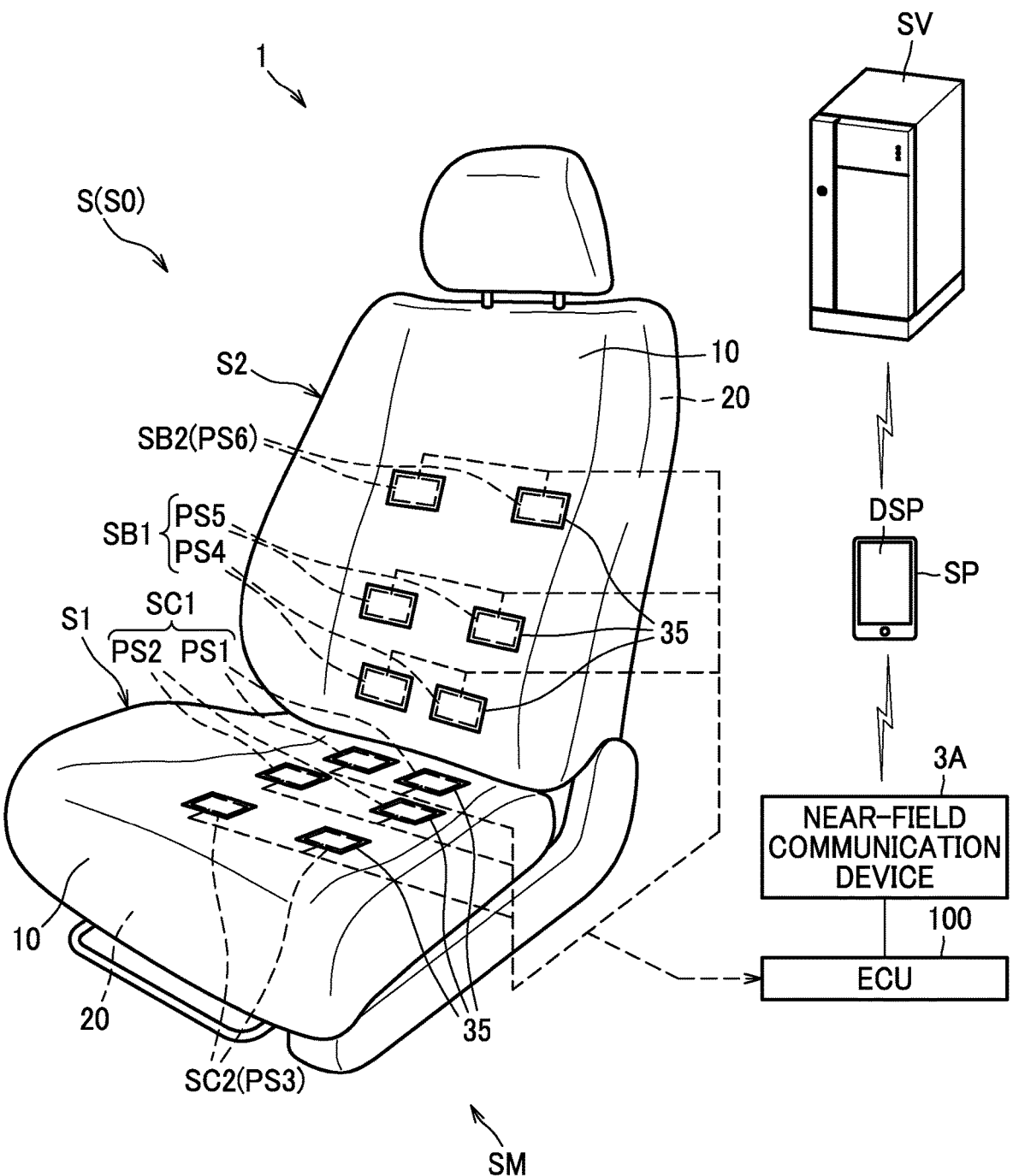
FIG. 2 is a diagram for explaining a configuration of the seat system.

As shown in FIG. 2, the seat S comprises a seat body S0 and an ECU (electronic control unit) 100. The seat body S0 includes a seat cushion S1 and a seat back S2. The seat cushion S1 and the seat back S2 each includes a cushion pad 20 and an outer covering 10 that covers the cushion pad 20. The cushion pad 20 is made of urethane foam or the like and is supported by a frame (not shown). The outer covering 10 is made of artificial leather, fabric, etc.

A plurality of pressure sensors PS1 to PS6 are provided under the outer coverings 10 of the seat cushion S1 and the seat back S2. The pressure sensors PS1 to PS6 are examples of a sensor and are configured to acquire measurement values which are information for detecting a motion of the occupant P seated on the seat body S0. The pressure sensors PS1 to PS6 are located so as to be capable of detecting a state of a seat surface that faces the occupant P seated on the seat body S0, and acquire pressure values from the occupant P seated on the seat body S0.

The respective pressure sensors PS1 to PS6 are provided in pairs, each located left and right, symmetric with respect to a laterally central position of the vehicle seat S.

To be more specific, the pressure sensors PS1 to PS3 are provided at the seat cushion S1. The pressure sensors PS1 and the pressure sensors PS2 are provided in positions of the seat cushion S1 corresponding to the buttocks the occupant P. The pressure sensors PS1 and the pressure sensors PS2 constitute a first cushion sensor SC1 for measuring pressure from the buttocks of the occupant P. The pressure sensors PS2 are located a little frontward of the pressure sensors PS1. The first cushion sensor SC1 may comprise only either pair of the pressure sensors PS1 and the pressure sensors PS2.

The pressure sensors PS3 are located under the thighs of the occupant P. The pressure sensors PS3 constitute a second cushion sensor SC2 for measuring values of pressure from the thighs of the occupant P. The pressure sensors PS3 are located frontward and largely apart from the pressure sensors PS1 and the pressure sensors PS2.

The pressure sensors PS4 to PS6 are provided at the seat back S1. The pressure sensors PS4 are provided in positions corresponding to the back of the lumbar region of the occupant P. The pressure sensors PS5 are located a little above the pressure sensors PS4. The pressure sensors PS4 and the pressure sensors PS5 both constitute a first back sensor SB1 for measuring pressure from the lumbar region of the occupant P. The first back sensor SB1 may comprise only either pair of the pressure sensors PS4 and the pressure sensors PS5.

The pressure sensors PS6 are located above and largely apart from the pressure sensors PS4 and the pressure sensors PS5. The pressure sensors PS6 are provided in positions corresponding to upper portion of the back of the occupant P. The pressure sensors PS6 constitute a second back sensor SB2 for measuring values of pressure from the scapula of the occupant P.

The pressure sensors PS1 to PS6 are elements, for example, whose electrical resistance varies with external pressure applied thereto, wherein the larger the pressure value, the higher (or the lower, as the case may be) the voltage of the detection signal becomes.

At a location corresponding to each of the pressure sensors PS1 to PS6, a coating 35 that provides a location marking portion is applied to the outer surface of the outer covering 10. Since the coating 35 is applied on the outer surface of the outer covering 10, the coating 35 is exposed to the outside of the outer covering 10. The color of the coating 35 is different from that of the outer surface of the outer covering 10. Specifically, for example, if the outer surface of the outer covering 10 is black, the color of the coating 35 may be a color such as yellow which stands out in black.

Such a coating 35 provides marks which make the locations of the respective pressure sensors PS1 to PS6 visually recognizable from outside of the seat body S0 before the occupant P sits on the seat S.

The ECU 100 is connected to the pressure sensors PS1 to PS6 and is capable of acquiring pressure values from the respective pressure sensors PS1 to PS6. The ECU 100 is capable of transmitting the information detected by the respective pressure sensors PS1 to PS6 to the smartphone SP.

To be more specific, the ECU 100 is connected to a near-field communication device 3A which enables near-field wireless communication, such as Bluetooth (registered trademark), Wi-Fi (registered trademark), etc. The ECU 100 is capable of communicating with the smartphone SP via the near-field communication device 3A. The smartphone SP is capable of communicating with the server SV via the Internet.

The ECU 100, the smartphone SP, and the server SV each include a CPU, a ROM, a RAM, a rewritable nonvolatile memory, etc. (not shown) and execute a pre-stored program. The smartphone SP further includes a display DSP.

The smartphone SP has a function of acquiring pressure values from the respective pressure sensors PS1 to PS6 via the ECU 100. An application (app) for the seat (seat app) is installed in the smartphone SP which application provides to the occupant P a game that is executable based on a signal (pressure value) transmitted from the seat S. Here, the seat app is a game program that uses the pressure sensors PS1 to PS6.

The seat app of the present embodiment is configured to provide a 100-meter dash game to the occupant P. That is, the smartphone SP executes the seat app which is a game program to provide the 100-meter dash game to the occupant P. The 100-meter dash game is a game that uses the pressure sensors PS1 to PS3, more specifically, it is a game in which characters displayed on the display DSP are made to run and which is executed based on pressure values transmitted from the seat S.

Specifically, when the smartphone SP executes the 100-meter dash game, it acquires pressure values $P3_R$, $P3_L$ from the left and right pressure sensors PS3 of the seat S. Then, a normal pressure $P3_n$ which is an average pressure of the occupant P seated on the seat at that time and a threshold P3th for detecting peaks of the pressure values are determined, and a normal step cycle $TS_n$ that is an average time cycle in which the occupant P moves his/her legs is computed.

Figures 3, 4:
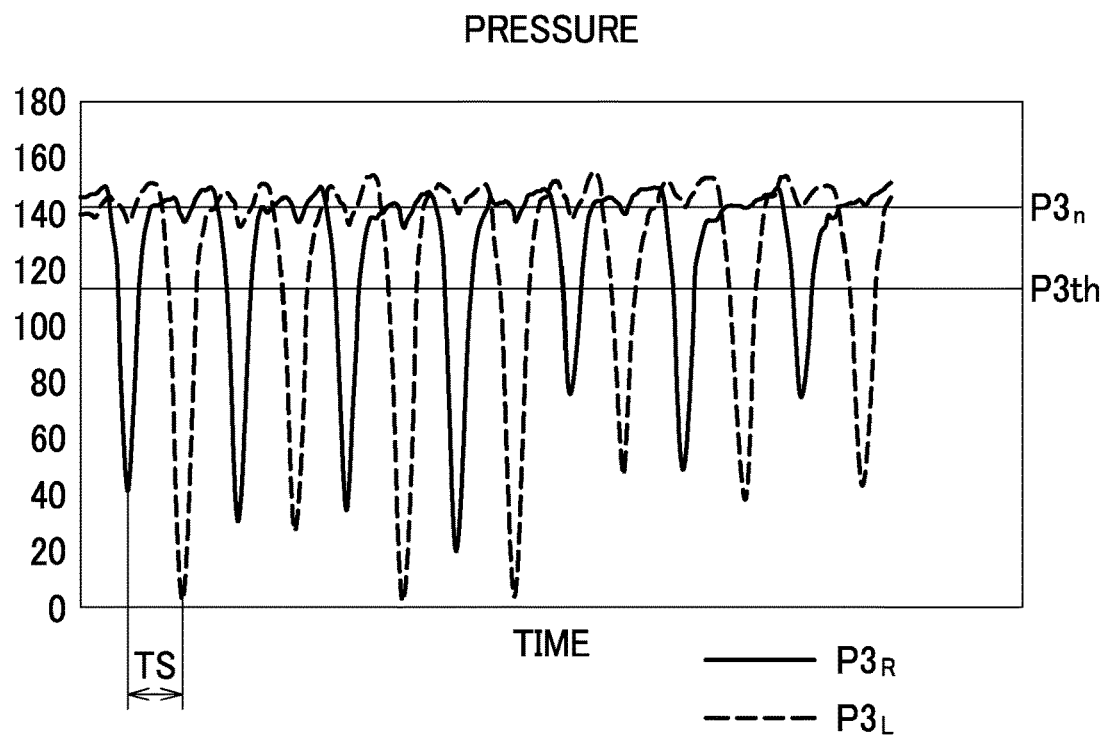
FIG. 3 is a graph showing fluctuations in pressure values acquired in the 100-meter dash game.
FIG. 4 is a diagram showing integrated data accumulated in a server.

To be more specific, when an occupant P lifts his/her legs alternately, the pressure values $P3_R$, $P3_L$, for example, fluctuate as shown in FIG. 3. In FIG. 3, a term in which the pressure goes down sharply indicates that the occupant P has lifted his/her leg up and the pressure at an area detected by the pressure sensors PS3 has become small accordingly. In fact, the pressure values that have not gone down but kept at about 140 represent an average normal pressure $P3_n$ when the legs are not lifted up. To compute the normal pressure $P3_n$, for example, you may identify absolute values at or lower than a predetermined value (i.e., when fluctuations are small) among the absolute values of the differences between the last value and the present value of the pressure values $P3_R$, $P3_L$ (remainders each determined by subtraction of the last value $P3(n-1)$ from the present value $P3(n)$), and sum up and average the present values from which the identified absolute values were obtained.

The threshold P3th is a threshold for determining that one of the legs are being lifted up; for example, as is the case of FIG. 3, values ranging generally from 100 to 120 may be used. For this purpose, the threshold P3th may be a value obtained by multiplying the normal pressure $P3_n$ by a predetermined value. For example, a value obtained by multiplying the normal pressure $P3_n$ by a predetermined value ranging generally from 0.6 to 0.9 may be suitable as the threshold P3th.

The normal step cycle $TS_n$ is an average value of the step cycles TS that are time intervals between peaks of the pressure values $P3_R$, $P3_L$.

It may be determined that the pressure values $P3_R$, $P3_L$ have reached a peak when the difference between the last value and the present value changes from the negative to the positive under the condition that each pressure value $P3_R$, $P3_L$ is smaller than the threshold P3th (i.e., the pressure value has crossed the threshold from above to below), and the last value $P3(n-1)$ detected at this time is regarded as a peak value Pm.

When the smartphone SP detects the peaks of the pressure values $P3_R$, $P3_L$ according to the motions of the occupant P, it computes the peak value Pm and then computes a step intensity F ($F_R$, $F_L$) that is a leg-lift motion magnitude based on the peak value Pm and the normal pressure $P3_n$. The step intensity F may be a peak magnitude, i.e., a value obtained by subtraction of the peak value Pm from the normal pressure $P3_n$. In this embodiment, the obtained value is normalized by the normal pressure $P3_n$ to eliminate variations caused by the size of an occupant P. For example, the step intensity F may be given as follows:

$$F=(P3_n-Pm)/P3_n$$

When the smartphone SP computes the step intensity F during the 100-meter dash game, it moves the character on the display DSP toward a goal. The amount of movement in this operation is determined according to the magnitude of the step intensity F. For example, the smartphone SP causes the character to move a distance F[m] toward the goal.

When the 100-meter dash game ends, the smartphone SP obtains a goal time (the time it took to reach the goal of the 100-meter race) as an example of an execution result of the game. Here, the goal time may be measured by starting measuring time when the 100-meter dash game starts and stopping measuring time when a value obtained by multiplying the step intensity F by the number of times the step intensity F is computed is equal to or larger than 100.

After the 100-meter game ends, the smartphone SP acquires the execution result of the game played by the occupant P as an execution result corresponding to the occupant P by correlating the present acquired goal time with identification information of the occupant P. Here, the identification information may be stored in the smartphone SP, for example, by the occupant registering his/her ID via a given registration screen before the 100-meter dash game starts. When a plurality of users share one smartphone SP, execution results corresponding to each user may be acquired using the smartphone SP by each user registering his/her own ID in advance and selecting his/her ID before playing the 100-meter dash game and playing the game thereafter.

After the 100-meter dash game ends, the smartphone SP displays the goal time corresponding to the occupant P on the display DSP. If the smartphone SP is in a state capable of communicating with the server SV when the 100-meter dash game ends, the smartphone SP transmits the present acquired goal time together with the identification information of the occupant P to the server SV.

The server SV has a function of integrating the goal times acquired from the smartphone SP and generating integrated data. To be more specific, as shown in FIG. 4, each time the server SV acquires the goal time and the identification information (For example, "00001") from the smartphone SP used by the occupant P, the server SV updates the total goal time and the number of acquisitions corresponding to that identification information. To be more specific, when the server SV acquires the goal time and the identification information, it adds the present goal time to the total value of previous goal times corresponding to the identification information and stores the sum as the total goal time. That is, the server SV accumulates the goal times corresponding to the occupant P as the total goal time (individual overall result) associated with the identification information of the occupant P. When the server SV acquires the goal time and the identification information, it increases the number of acquisitions of the goal times corresponding to the identification information by 1.

Similarly, each time the server SV acquires the goal time and the identification information (for example, "00002") from another smartphone SP used by another person PA, it updates the total goal time and the number of acquisitions corresponding to that identification information. Thus, the server SV acquires and integrates the goal times and the identification information corresponding to users and acquired from the smartphones SP used by various users and generates integrated data (group of data) such as shown in the table of FIG. 4.

The server SV has a function of computing a reference value for the goal times based on the integrated data. To be more specific, the server SC computes an average value of the goal times accumulated in the integrated data as the reference value. That is, for example, in a situation in which the seat experience device SM is used nationwide by various users (elderly people, males, females, children, physically disabled people), the server SV computes a national average of the goal times of the 100-meter dash game. To be more specific, the server SV computes an average goal time for all users by dividing the integrated value of all the total goal times in the integrated data by the integrated value of the total number of acquisitions in the integrated data.

The server SV has a function of computing an individual reference value for the goal times of a user corresponding to the identification information based on the individual overall result. To be more specific, for example, when the server SV computes the individual reference value for the occupant P, it divides the total goal time corresponding to the identification information (for example, "00001") by the number of acquisitions corresponding to the identification information (for example, "00001") and thereby computes an average goal time for the occupant P as the individual reference value.

The server SV has a function of assigning a difficulty level for the 100-meter dash game based on the individual reference value and the reference value. To be more specific, the server SV assigns the difficulty level of the 100-meter dash game by setting a control amount for a control target which is controlled in the 100-meter dash game based on the individual reference value and the reference value.

In this embodiment, the server SV sets the control amount for the control target by setting a correction coefficient by which the step intensity F is to be multiplied based on the individual reference value and the reference value. To be more specific, when the individual reference value is greater than the reference value, i.e., when the running speed of the occupant P is slower than an average running speed of all users, the distance of travel per step of the occupant P is made longer by adjusting the correction coefficient to a value larger than an initial value. When the individual reference value is smaller than the reference value, i.e., when the running speed of the occupant P is faster than the average running speed of all users, the distance of travel per step of the occupant P is made shorter by adjusting the correction coefficient to a value smaller than the initial value.

That is, when the individual reference value is worse than the reference value, the difficulty level of the 100-meter dash game is lowered. When the individual reference value is better than the reference value, the difficulty level of the 100-meter dash game is raised. After the server SV sets the correction coefficient corresponding to the occupant P, it transmits the correction coefficient to the smartphone SP used by the occupant P based on the identification information of the occupant P. Similarly, when the server SV sets a correction coefficient for another person PA, it transmits the correction coefficient to the smartphone SP of the another person PA.

The smartphone SP has a function of measuring the goal time in the next 100-meter dash game based on a value obtained by multiplying the step intensity F by the correction coefficient when it acquires the correction coefficient from the server SV. That is, the smartphone SP is configured to reflect the difficulty level assigned in the server SV on the 100-meter dash game during execution of the seat app.

The smartphone SP allows selection of a single-player mode and a competitive play mode of the 100-meter dash game. Here, the single-player mode is a mode in which only the character corresponding to the user of the smartphone SP is made to run on the display DSP of the smartphone SP. In the single-player mode, for example, another character moved by the control unit of the smartphone SP may compete with the character corresponding to the user.

The competitive play mode is a mode in which a character corresponding to a user using a predetermined smartphone SP (for example, the occupant P) competes with a character corresponding to a user using another smartphone SP (for example, another person PA). In the competitive play mode, the smartphone SP used by each user is allowed to exchange information via the server SV. This allows the character corresponding to each user to move on the display DSP of each smartphone SP in response to the motion of each user on a respective seat S.

Next, the operation of the smartphone SP and the server SV (more specifically, the control units in the smartphone SP and the server SV) will be described in detail.

Figure 5:
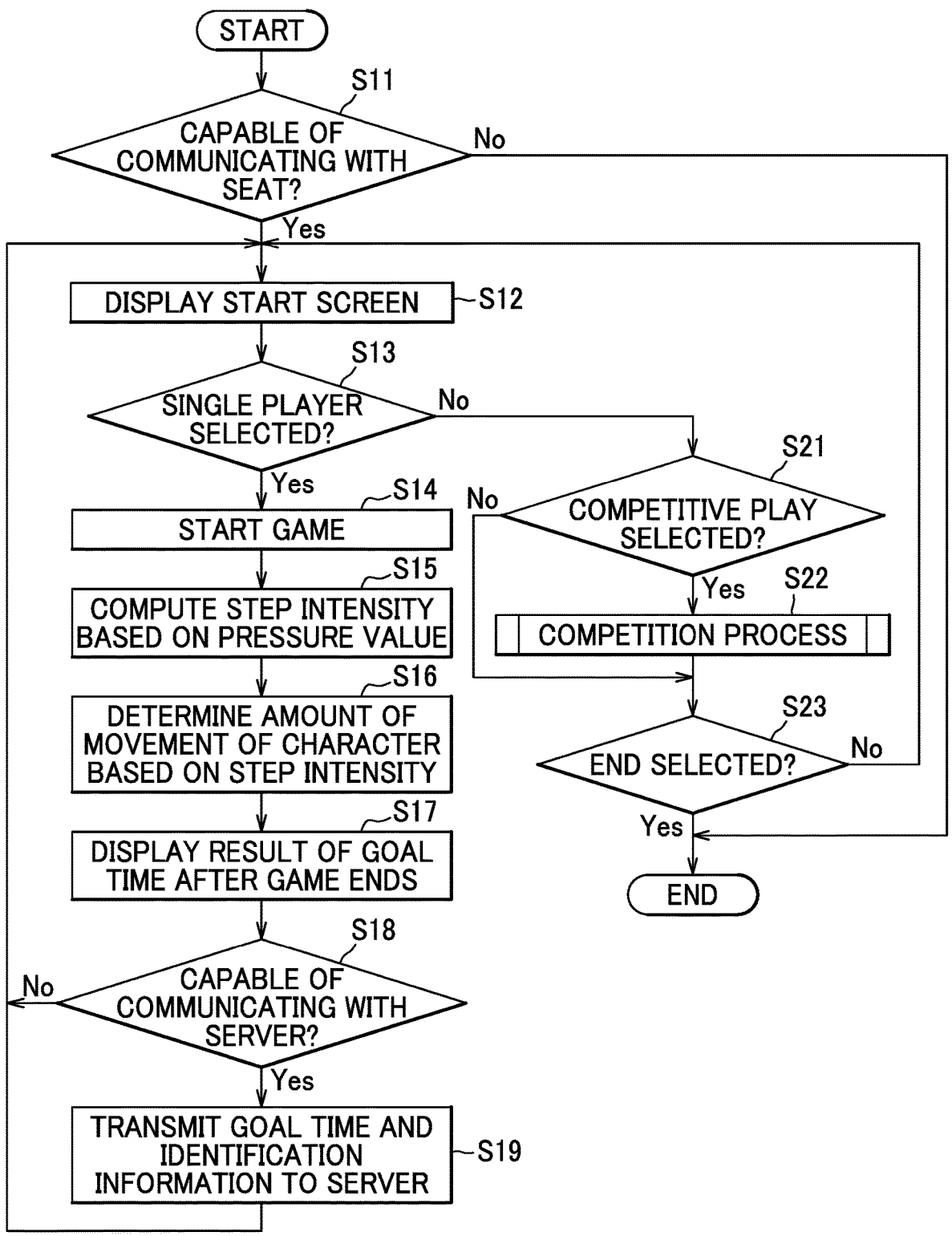
FIG. 5 is a flowchart of a process executed in a smartphone.

The smartphone SP starts the process shown in FIG. 5 (START) when the occupant P starts up the seat app. In this process, the smartphone SP first checks if it is in a state capable of communicating with the ECU 100 of the seat S (S11).

In step S11, if it is determined that it is not in a state capable of communicating (No), the smartphone SP ends the present process. If it is determined in step S11 that it is in a state capable of communicating (Yes), the smartphone SP displays a start screen for the 100-meter dash game (see to FIG. 8) on the display DSP (S12).

After step S12, the smartphone SP determines whether or not the single-player mode is selected (S13). If it is determined in step S13 that the single-player mode is selected (Yes), the smartphone SP starts the 100-meter dash game in the single-player mode (S14).

After step S14, specifically during the 100-meter dash game, the smartphone SP computes the step intensity F based on pressure values transmitted from the seat S (S15). After step S15, the smartphone SP determines the amount of movement of the character based on the step intensity F (S16).

After step S16, specifically, after the 100-meter dash game ends, the smartphone SP acquires the goal time and displays the acquired goal time on the display DSP (S17). After step S17, the smartphone SP determines whether or not it is in a state capable of communicating with the server SV (S18).

If it is determined in step S18 that it is in a state capable of communicating (Yes), the smartphone SP transmits the present acquired goal time and the identification information to the server SV (S19) and returns to the process of step S12. If it is determined in step S18 that it is not in a state capable of communicating (No), the smartphone SP returns to the process of step S12 without executing the process of step S19.

In step S13, if it is determined that the single-player mode is not selected (No), the smartphone SP determines whether or not the competitive play mode is selected (S21). If it is determined in step S21 that the competitive play mode is selected (Yes), the smartphone SP executes a competition process (S22). The competition process will be described later.

After step S22, or if it is determined No in step S13, the smartphone SP determines whether or not end is selected (S23). If it is determined in step S23 that end is selected (Yes), the smartphone SP ends the present process. If it is determined in step S23 that end is not selected (No), the smartphone SP returns to the process of step S12.

Figure 6:
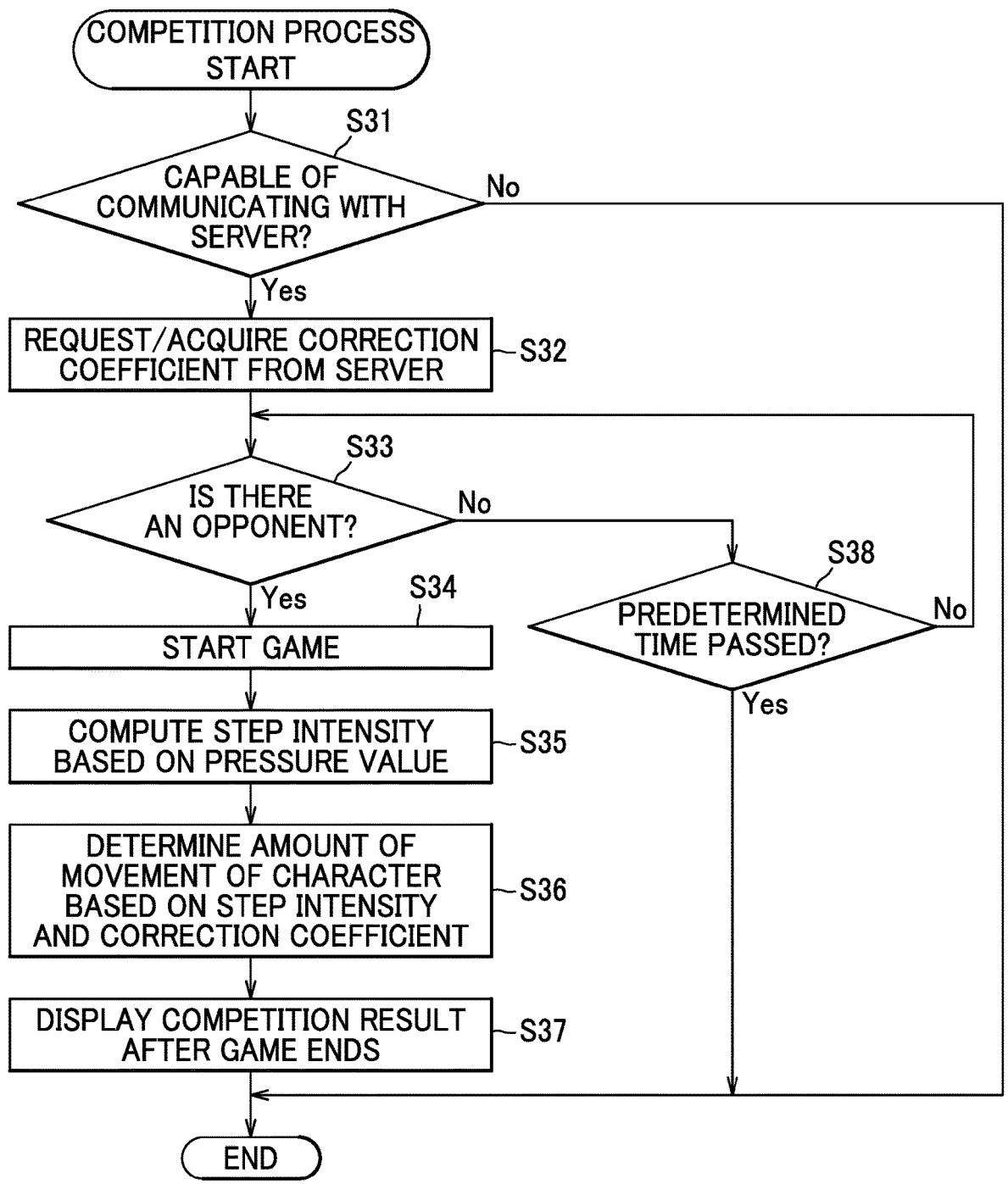
FIG. 6 is a flowchart of a competition process executed in the smartphone.

As shown in FIG. 6, in the competition process, the smartphone SP first determines whether or not it is in a state capable of communicating with the server SV (S31). If it is determined in step S31 that it is not in a state capable of communicating with the server SV (No), the smartphone SP ends the competition process.

If it is determined in step S31 that it is in a state capable of communicating (Yes), the smartphone SP requests and acquires from the server SV the correction coefficient (S32). At the time of request, the smartphone SP transmits the identification information of the user of the smartphone SP. After step S32, the smartphone SP determines whether or not there are is an opponent by inquiring to the server SV whether there is an opponent (S33). To be more specific, for example, in step 33, the smartphone SP transmits to the server SV a signal indicating that the competition play mode is selected, and determines whether there is an opponent based on information returned from the server SV in response to the transmission. Here, "information returned from the server SV" is a signal indicating that the competition play mode is selected in another smartphone SP.

If it is determined in step S33 that there is an opponent (Yes), the smartphone SP starts the 100-meter dash game in the competitive play mode (S34). After step S34, specifically, during the 100-meter dash game, the smartphone SP computes the step intensity F based on the pressure values transmitted from the seat S (S35).

After step S35, the smartphone SP determines the amount of movement of the character based on the step intensity F and the correction coefficient (S36). After step 36, specifically, after the 100-meter dash game ends, the smartphone SP acquires the goal times of the occupant's own character and another person's character which have competed on the display DSP, compares the goal times and displays a competition result on the display DSP (S37), and ends the competition process.

If it is determined in step S33 that there is no opponent (No), the smartphone SP determines whether or not a predetermined time period has passed (S38). If it is determined in step S38 that the predetermined time period has not passed (No), the smartphone SP returns to the process of step S33 and waits until an opponent accesses the server SV. When the predetermined time period has passed in step S33 (Yes), the smartphone SP ends this process.

Figure 7:
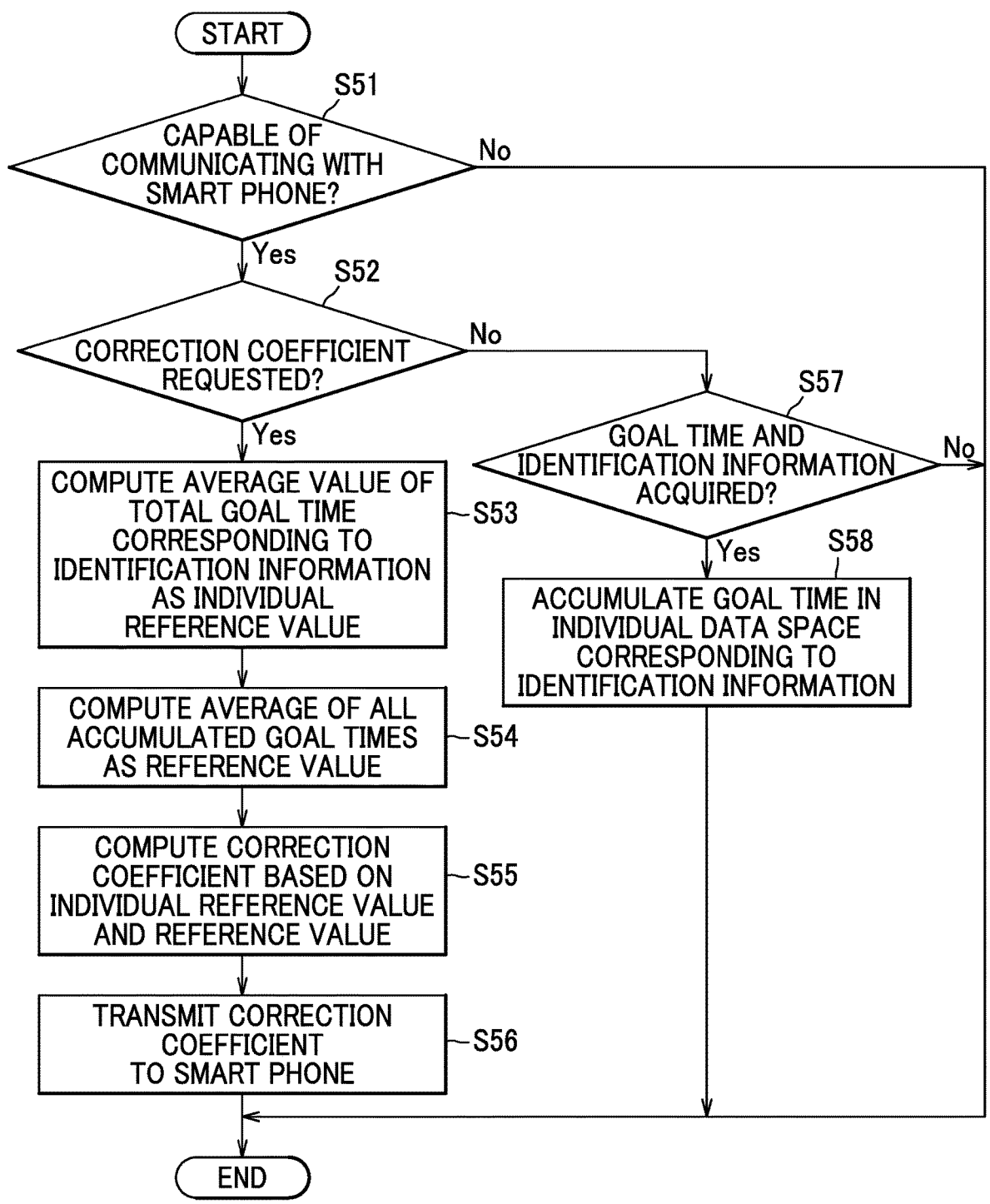
FIG. 7 is a flowchart of a process executed in a server.

The server SV continuously executes the process shown in FIG. 7.

As shown in FIG. 7, the server SV determines whether or not it is in a state capable of communicating with the smartphone SP (S51). If it is determined in step S51 that it is not in a state capable of communicating (No), the server SV ends the present process.

If it is determined in step S51 that it is in a state capable of communicating (Yes), the server SV determines whether or not there is a request for the correction coefficient from the smartphone SP (S52). If it is determined in step S52 that there is a request (Yes), the server SV computes an average value of the total goal time corresponding to the identification information transmitted from the smartphone SP as the individual reference value (S53).

After step S53, the server SV computes the average of the goal times as the reference value based on all total goal times and the number of acquisitions in the accumulated integrated data (S54). After step S54, the server SV computes the correction coefficient based on the individual reference value and the reference value (S55).

After step S55, the server SV transmits the correction coefficient to the smartphone SP (S56) and ends the present process. If it is determined in step S52 that there is no request for the correction coefficient (No), the server SV determines whether or not it has acquired a goal time and identification information from the smartphone SP, i.e., if the goal time and the identification information has been transmitted from the smartphone SP (S57).

If it is determined in step 57 that they have been acquired (Yes), the goal time is accumulated in an individual data space corresponding to the identification information (S58). To be more specific, for example, if the server SV acquires the identification information "00001", it adds the present acquired goal time to the total goal time corresponding to the identification information "00001" and increments the number of acquisitions.

After step S58, or when it is determined No in step S57, the server SV ends the present process.

Next, one example of a specific operation of the seat system 1 will be described.

Figure 8:
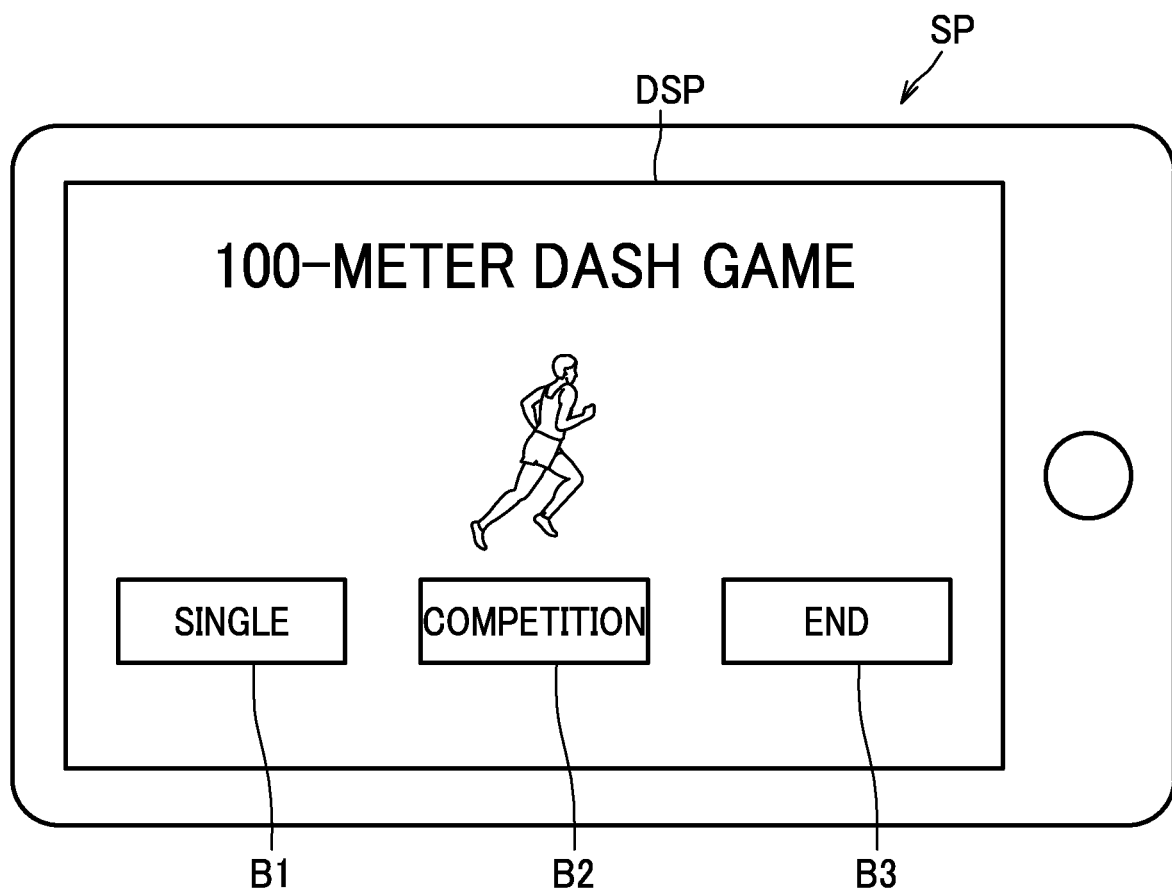
FIG. 8 is a diagram showing a start screen for a seat app.

In a state as shown in FIG. 1 where the hardware (S, SV, SP) constituting the seat system 1 is capable of communicating, when the occupant P operates the smartphone SP to start up the seat app, the process of step 11: Yes—>step 12 in the process shown in FIG. 5 is successively executed. As a result, the start screen shown in FIG. 8 is displayed on the display DSP.

On the start screen, there is a button B1 for starting the single-player mode and a button B2 for starting the competitive play mode of the 100-meter dash game, and a button B3 for ending the seat app. When the occupant P touches the button B1, it is determined Yes in step S13 and the 100-meter dash game is executed in the single-player mode (S14 to S17).

When the 100-meter dash game ends, the smartphone SP transmits the goal time which is the result of the present game and the identification information to the server SV (S18:Yes—>S19).

As shown in FIG. 7, when the goal time and the identification information is transmitted from the smartphone SP to the server SV, the server SV determines Yes in step S57 and accumulates the acquired goal time in the individual data space corresponding to the identification information (S58). Such operation takes place between the smartphones SP of various users and the server SV, so that a massive amount of integrated data (see FIG. 4) is generated in the server SV.

When the occupant P selects the button B2 for the competitive play mode on the start screen shown in FIG. 8, the smartphone SP determines Yes in step S21 and executes the competition process, as shown in FIG. 5 (S22). If the another person PA shown in FIG. 1 has selected the competitive play mode of the 100-meter dash game in his/her smartphone SP, the smartphone SP of the occupant P acquires from the server SV the correction coefficient corresponding to the occupant P and then starts the 100-meter dash game in the competitive mode (S32 to S34) in the competition process shown in FIG. 6.

On the other hand, the smartphone SP of the another person PA operates in a similar manner and acquires from the server SV the correction coefficient corresponding to the another person PA in the competition process, and then starts the 100-meter dash game in the competitive mode. In the 100-meter dash game executed in each smartphone SP, the character corresponding to the occupant P and the character corresponding to the another person PA on the display DSP are respectively allowed to compete at speeds near the reference value, since the step intensities F of the occupant P and the another person PA are corrected by the correction coefficients.

Therefore, even if there is a large difference between the athletic abilities of the occupant P and the another person PA, for example, when one is an adult and the other is a child, each character is allowed to compete by a narrow margin in the competitive mode of the 100-meter dash game and thereby it is possible to provide a good time to both.

As has been described above, with the seat system 1 according to the present embodiment, the following advantageous effects can be achieved.

Since the difficulty level of the game assigned based on the reference value computed based on the execution results of the game played on the smartphone SP of the another person PA, and the execution result of the game corresponding to the occupant P is reflected on the game played on the smartphone SP of the occupant P, it is possible to allow both persons to compete at the same level in the 100-meter dash game.

Since the control amount (specifically, the correction coefficient which affects the control amount) is set according to the difficulty level of the game, it is possible to allow characters corresponding to the occupant P and the another person PA to compete on the same screen, for example, compared to an alternative configuration in which a difficulty level is reflected by increasing or decreasing the goal time based on a reference value after the game ends.

Since the goal times corresponding to each user are accumulated as an individual overall result, it is possible to reduce large fluctuations in the difficulty level due to variations in the goal times.

Since the average value of the total goal times accumulated in the integrated data is used as the reference value, the reference value can be computed easily, for example, compared to an alternative configuration in which a median value of all the goal times accumulated in the integrated data is used as the reference value.

The first embodiment described above may be implemented in other forms modified where appropriate as described below. In the following description, the same reference characters will be applied to structures similar to those of the above embodiment and explanation thereof will be omitted.

Although the above-described embodiment is configured such that the server SV assigns the difficult level (correction coefficient) of the game, the smartphone SP may assign the difficulty level of the game. In this case, the smartphone SP may be configured to execute the competition process shown in FIG. 9 and the server SV may be configured to execute the process shown in FIG. 10.

Figure 9:
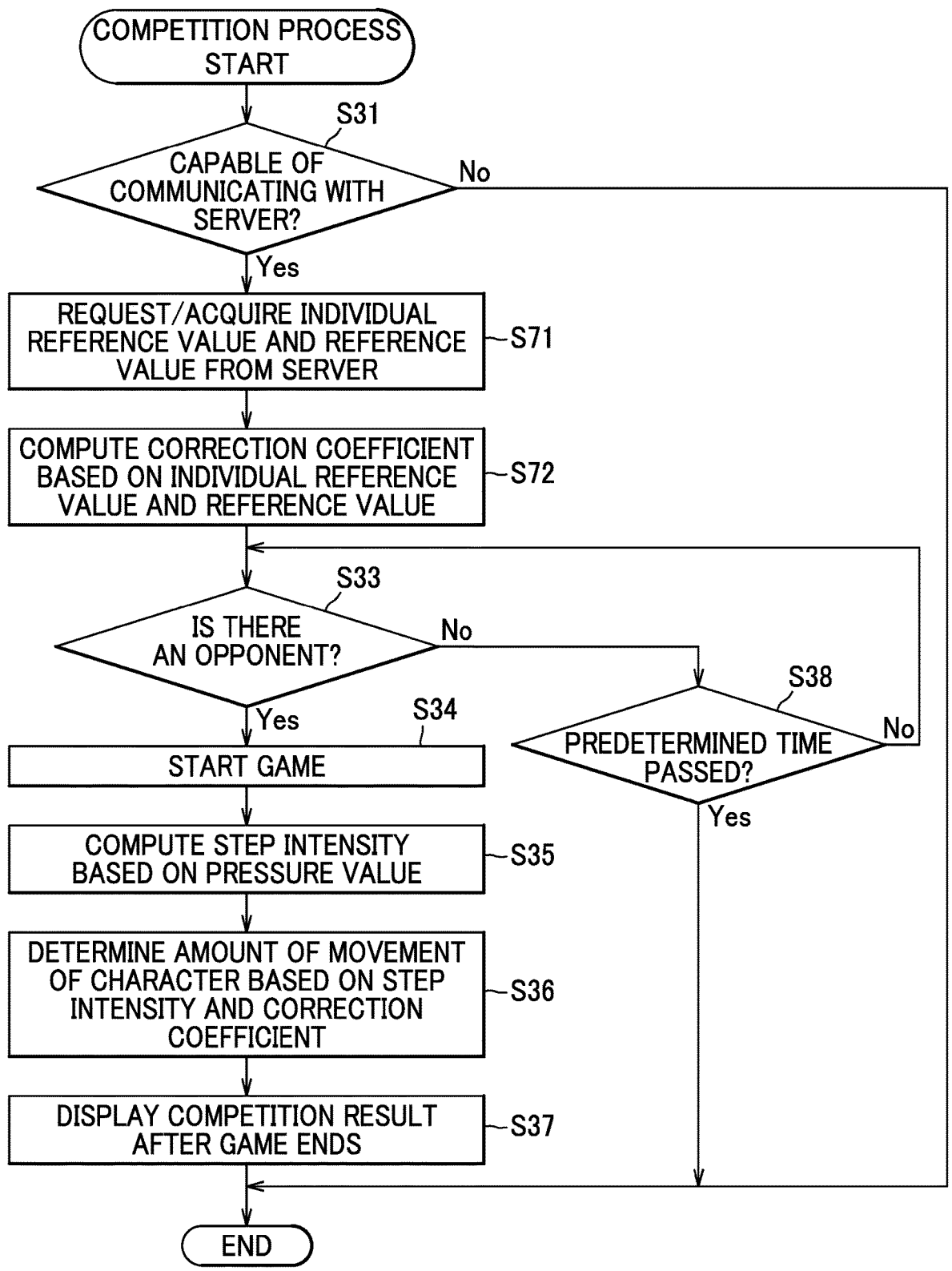
FIG. 9 is a flowchart of a competition process of a first modification.

The process shown in FIG. 9 includes new steps S71, S72 in place of step S32 in the process shown in FIG. 6; the other parts of the process are similar to that of FIG. 6. The process shown in FIG. 10 includes new steps S81, S82 in place of steps S52, S55, S56 in the process shown in FIG. 7; the other parts of the process are similar to that of FIG. 7.

In the competition process shown in FIG. 9, if the smartphone SP determines Yes in step S31, it requests and acquires from the server SV the individual reference value and the reference value (S71). That is, the smartphone SP of this configuration does not request a correction coefficient from the server SV as in the above-described embodiment, but requests and acquires the individual reference value and the reference value.

After step S71, the smartphone SP computes the correction coefficient based on the individual reference value and the reference value (S72), and assigns the difficulty level of the game. After step S72, the smartphone SP proceeds to the process of step S33.

Figure 10:
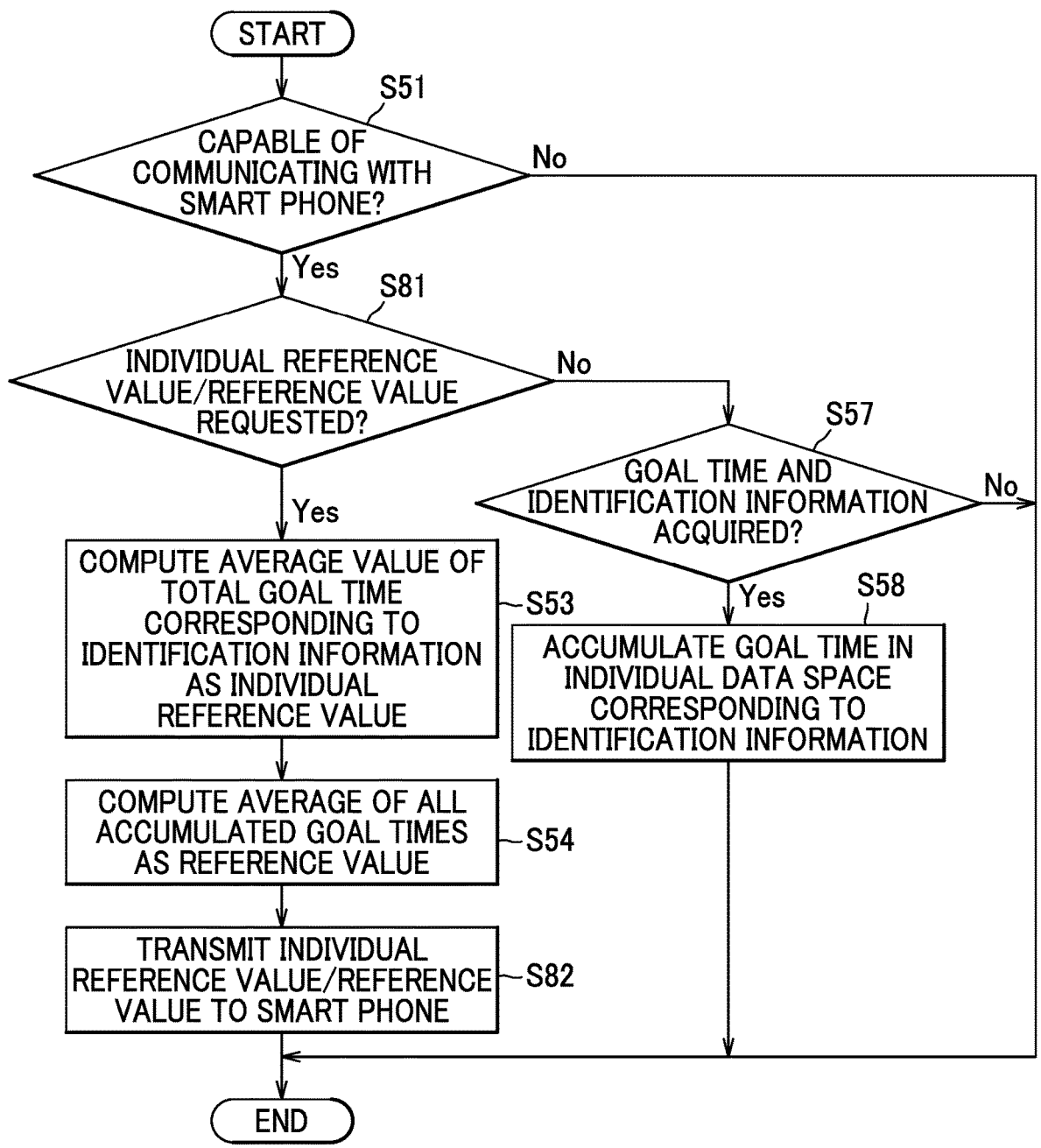
FIG. 10 is a flowchart of a process executed in a server of the first modification.

In the process shown in FIG. 10, if the server SV determines Yes in step S51, it determines whether or not there is a request for the individual reference value and the reference value from the smartphone SP (S81). In step S81, if the server SV determines that there is a request (Yes), it proceeds to the process of step S53; if the server SV determines that there is no request (No), it proceeds to the process of step S57.

In steps S53, S54, the server SV computes the individual reference value and the reference value, and then transmits the computed individual reference value and reference value to the smartphone SP (S82) and ends present process. Since it is also possible to cause the difficulty level to be reflected on the 100-meter dash game according to this configuration, advantageous effects similar to that of the above-described embodiment can be achieved. However, when the correction coefficient is computed in the server SV as in the above-described embodiment, it will not be necessary to compute the correction coefficient in the smartphone SP, and thus the processes carried out in the smartphone SP will be reduced allowing the competitive mode of the 100-meter dash game to be executed more smoothly.

Although the above-described embodiment is configured such that the individual overall result is accumulated in the server SV, the individual overall result may be accumulated in the smartphone SP of each user. In this case, for example, the smartphone SP may be configured to execute the processes shown in FIG. 11 and FIG. 12 and the server SV may be configured to execute the process shown in FIG. 13.

Figure 11:
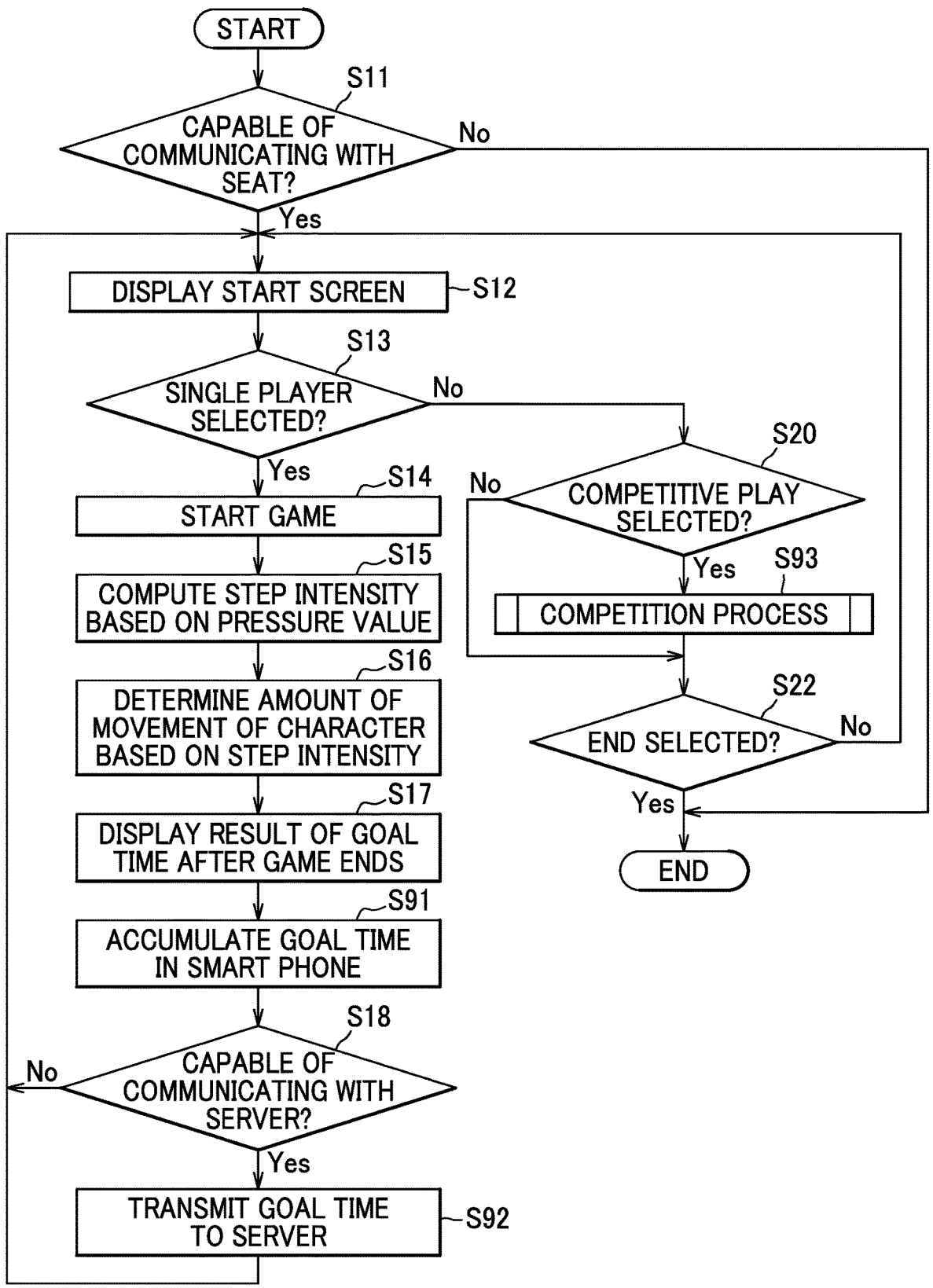
FIG. 11 is a flowchart of a process executed in a smartphone of a second modification.

The process shown in FIG. 11 includes new steps S91 to S93 in place of steps S19, S22 in the process shown in FIG. 5; the other parts of the process are similar to that of FIG. 5. The process shown in FIG. 12 includes new steps S110, S111 in place of step S71 in the process shown in FIG. 9; the other parts of the process are similar to that of FIG. 9. The process shown in FIG. 13 includes new steps S121 to S124 in addition to steps S51, S54 in the process shown in FIG. 7.

In the process shown in FIG. 11, the smartphone SP displays the goal time on the display DSP in step S17, and then accumulates the goal time in the smartphone SP by adding the present acquired goal time to the total of previous goal times (S91). After step S91, the smartphone SP proceeds to the process of step S18.

If it is determined Yes in step S18, the smartphone SP transmits the present acquired goal time to the server SV (S92) and returns to the process of step S12. Here, in step S92, the smartphone SP does not transmit the identification information together with the goal time as in the above-described embodiment, but only transmits the goal time to the server SV. If it is determined Yes in step S21, the smartphone SP executes a competition process different from that of the above-described embodiment (S93).

Figure 12:
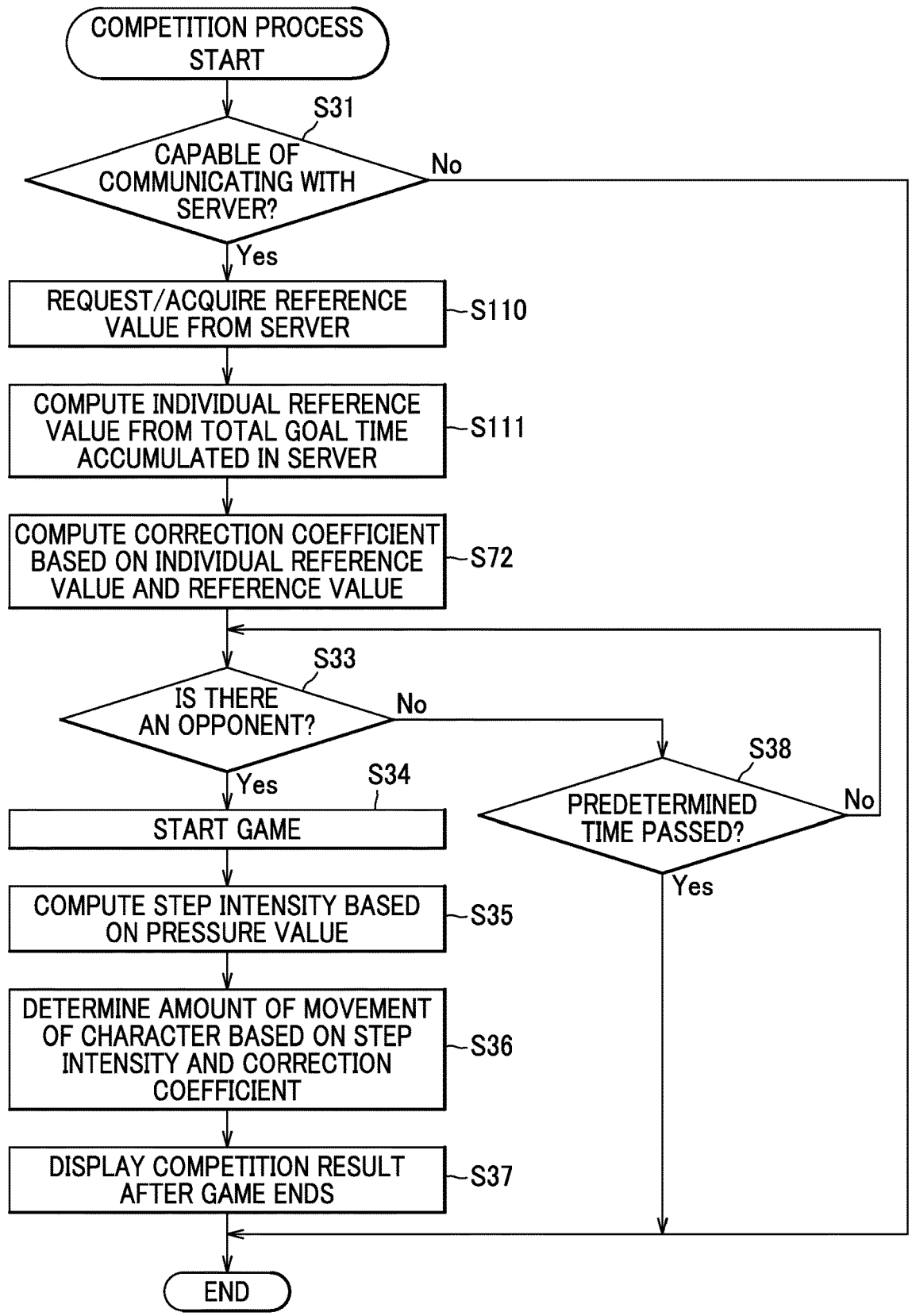
FIG. 12 is a flowchart of a competition process of the second modification.

In the competition process shown in FIG. 12, if the smartphone SP determines Yes in step S31, it requests and acquires from the server SV the reference value (S110). After step S110, the smartphone SP computes the average value of the goal times as the individual reference value based on the total goal time and the number of acquisitions accumulated in the smartphone SP (S111). After step S111, the smartphone SP proceeds to the process of step S72.

Figure 13:
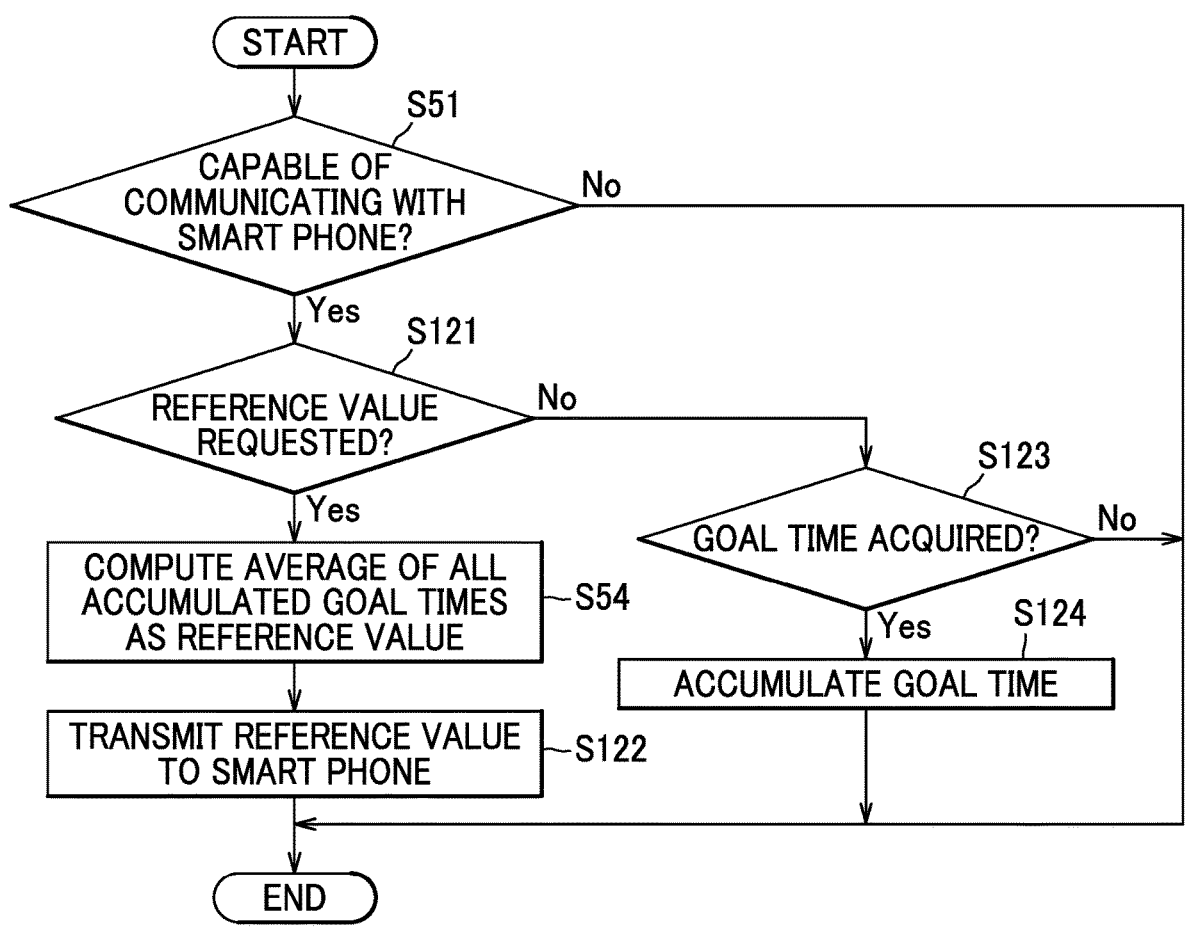
FIG. 13 is a flowchart of a process executed in a server of the second modification.

In the process shown in FIG. 13, if the server SV determines Yes in step S51, it determines whether or not there is a request for the reference value from the smartphone SP (S121). If it is determined that there is a request in step S121 (Yes), the server SV proceeds to the process of step S54 and computes the reference value.

After step S54, the server SV transmits the reference value to the smartphone SP (S122) and ends the present process. If it is determined in step S121 that there is no request (No), the server SV determines whether or not it has acquired a goal time from the smartphone SP (S123).

If it is determined in step 123 that it has acquired a goal time (Yes), the server SV accumulates the goal time by adding the present acquired goal time to the total value of previous goal times (S124). After step S124 or if it is determined No in step S123, the server SV ends the present process.

According to this configuration, since it is also possible to cause the difficulty level to be reflected on the 100-meter dash game, advantageous effects similar to that of the above-described embodiment can be achieved. However, when the individual overall result is accumulated in the server SV as in the above-described embodiment, it will be possible to save the storage space in the smartphone SP.

Although the above-described embodiment is configured such that the control amount of the control target is determined based on the step intensity F, the control amount may be determined for example, based on the number of steps. The number of steps may be determined for example, by the number of peak values Pm computed during the 100-meter game. In this case, the difficulty level of the game may be adjusted by making a change based on a reference value in a length of stride by which the number of steps is to be multiplied.

Although pressure sensors PS1 to PS3 are given as an example of a sensor in the above-described embodiment, for example, the sensor may be an optical sensor or the like. In this case, the number of steps or the like may be computed based on information on whether or not light has been detected by the optical sensor.

Although the 100-meter dash game is given as an example of a game in the above-described embodiment, the game may be any activity as long as it is an activity performed by following particular rules. For example, the game may involve a workout other than a 100-meter race or may be an exercise.

For example the game may be a Zazen game which requires the occupant P to sit in a cross-legged position as in Zen meditation on the seat S, as will be described below. The Zazen game, for example, may be configured as a game in which the occupant P is encouraged to keep a posture in such a manner that the pressures on the left side and the right side of the seat cushion S1 are nearly equal and the pressures on the front side and the back side of the seat cushion S1 are nearly equal. To be more specific, the Zazen game may be configured as a game in which a cursor which moves in response to the motion (fluctuations in pressure values) of the occupant P is adjusted to match a target image on the screen of the smartphone SP. In this case, when the execution result of the Zazen game is better than a reference value, i.e., when a good Zazen posture is being kept, the travel speed of the cursor on the screen may be made faster to increase the difficulty level of the game by increasing the amount of movement of the cursor with respect to a predetermined amount of pressure value fluctuation. When the execution result of the Zazen game is worse than the reference value, the travel speed of the cursor on the screen may be made slower to decrease the difficulty level of the game by decreasing the amount of movement of the cursor with respect to the given amount of pressure value fluctuation.

Although a car seat for use in an automobile is given as an example of a seat S in the above-described embodiment, the seat may be, for example, a seat used in a different vehicle such as a ship, an aircraft, etc. The seat is not limited to a vehicle seat; for example, the seat may be a chair with a backrest (as used in a Japanese-style room).

Although a smartphone SP is given as an example of a terminal device in the above-described embodiment, the terminal device may be, for example, a mobile terminal device other than the smartphone SP such as a tablet, etc. The terminal device may also be a stationary terminal device located on the seat S which may be provided integrally with the seat. The terminal device may be a terminal device which constitutes a car navigation system. In this case, a plurality of users seated on a plurality of seats may share one terminal device.

Second Embodiment

Next, a second embodiment will be described with reference made to accompanying drawings when necessary.

Figure 14:
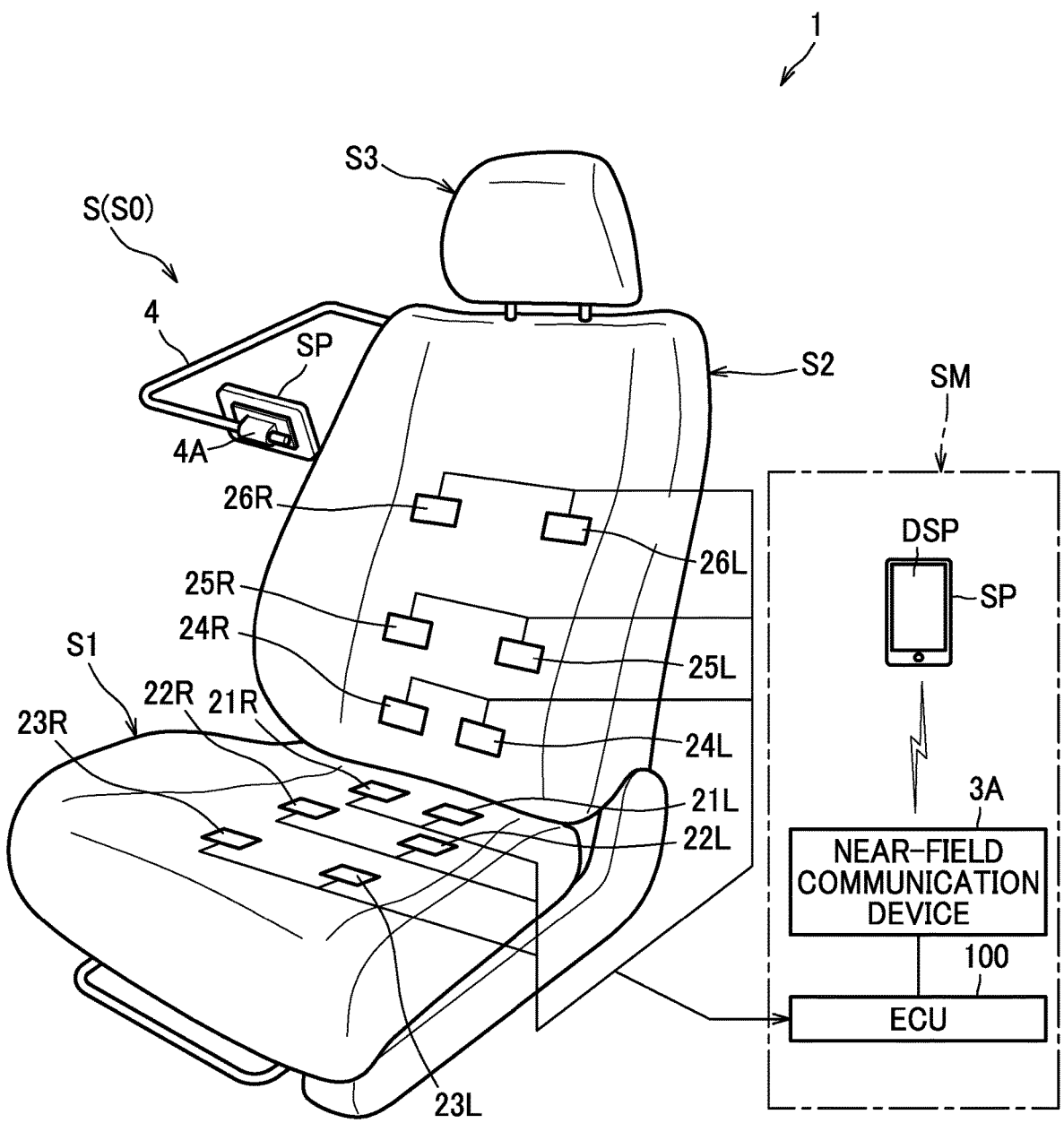
FIG. 14 is a diagram showing a second embodiment of a seat system.

As shown in FIG. 14, a seat system 1 of the present embodiment comprises a seat S and a seat experience device SM.

The seat S comprises a seat body S0 and pressure sensors 21 to 26. The seat body S0, in one example, is a vehicle seat to be installed on a vehicle such as a car and includes a seat cushion S1, a seat back S2 and a headrest S3. The seat cushion S1 and the seat back S2 include a plurality of pressure sensors 21 to 26 under outer coverings 10. The pressure sensors 21 to 26 are sensors configured to detect a motion of an occupant seated on the seat body S0.

The pressure sensors 21 to 26 are located so as to be capable of detecting a state of a seat surface that faces an occupant seated on the seat body S0, and acquire values of pressure from the occupant seated on the seat body S0. An ECU 100 (electronic control unit) which is a device for controlling operations of the seat body S0 (for example, a motor of a motor-driven reclining mechanism, heater, etc. not shown) is connected to each of the pressure sensors 21 to 26 and is capable of acquiring measurement values from the pressure sensors 21 to 26.

The respective pressure sensors 21 to 26 are provided in pairs, each located left and right, symmetric with respect to a laterally central position of the vehicle seat S. In the following description and in the drawings, the letter "L" will be added to the ends of the reference characters for the pressure sensors 21 to 26 located on the left and the letter "R" will be added to the ends of the reference characters for the pressure sensors 21 to 26 located on the right in order to distinguish the two as necessary.

The pressure sensors 21 to 23 are provided at the seat cushion S1.

The pressure sensors 21 are provided in positions corresponding to the lowermost portion of the ischial bones of the occupant. This position is where the weight of the occupant is most largely applied.

The pressure sensors 22 are located a little frontward of the pressure sensors 21.

The pressure sensors 21 and the pressure sensors 22 are both for measuring pressures from the buttocks of the occupant and only either pair may be provided.

The pressure sensors 23 are located frontward and largely apart from the pressure sensors 21 and the pressure sensors 22. The pressure sensors 23 are located under the thighs of the occupant and are capable of measuring values of pressure from the thighs of the occupant.

The pressure sensors 24 to 26 are provided at the seat back S2. The pressure sensors 24 are provided in positions corresponding to the back of the lumbar region of the occupant.

The pressure sensors 25 are located a little above the pressure sensors 24.

The pressure sensors 24 and the pressure sensors 25 are both for measuring pressure from the lumbar region of the occupant and only either pair may be provided.

The pressure sensors 26 are located above and largely apart from the pressure sensors 24 and the pressure sensors 25. The pressure sensors 26 are provided in positions corresponding to the shoulders of the occupant and are capable of measuring values of pressure from the shoulders of the occupant.

In this embodiment, the seat system 1 provides an exercise game using the respective sensors 21 to 26. In this embodiment, the respective sensors 21 to 26 are an example of a sensor for acquiring a measurement value for detecting the motion of the occupant seated on the seat body S0. The exercise game is a game which allows the occupant seated on the seat body S0 to perform an exercise according to a pose of a character and/or a message displayed on a display DSP of the smartphone SP.

The seat body S0 comprises a holder 4 for holding the smartphone SP. The holder 4 is formed by bending a wire, with one end fixed to the seat back S2 and the other end having a holding portion 4A for holding the smartphone SP. By fixing the smartphone SP on the holding portion 4A, the occupant can view the display DSP of the smartphone SP without holding the smartphone SP in his/her hand. Accordingly, the occupant can perform the motion instructed in the exercise game using his/her whole body while viewing the display DSP.

The seat experience device SM comprises the ECU 100 and the smartphone SP as an example of a terminal device.

The ECU 100 is connected to a near-field communication device 3A which enables near-field wireless communication, such as Bluetooth (registered trademark), Wi-Fi (registered trademark), etc. The ECU 100 is connected to the pressure sensors 21 to 26.

The ECU 100 and the smartphone SP each include a CPU, a ROM, a RAM, a rewritable nonvolatile memory, etc. (not shown) and execute a pre-stored program. The smartphone SP further includes the display DSP. The smartphone SP operates according to a program and functions as a means for executing the exercise game.

To be more specific, the smartphone SP has a function of acquiring measurement values from the respective sensors 21 to 26 via the near-field communication device 3A and the ECU 100 and executing the exercise game based on the acquired measurement values. The smartphone SP has a function of instructing the occupant to make a predetermined pose during the exercise game. The smartphone SP also has a function of changing the predetermined pose every predetermined time period.

Figure 19:
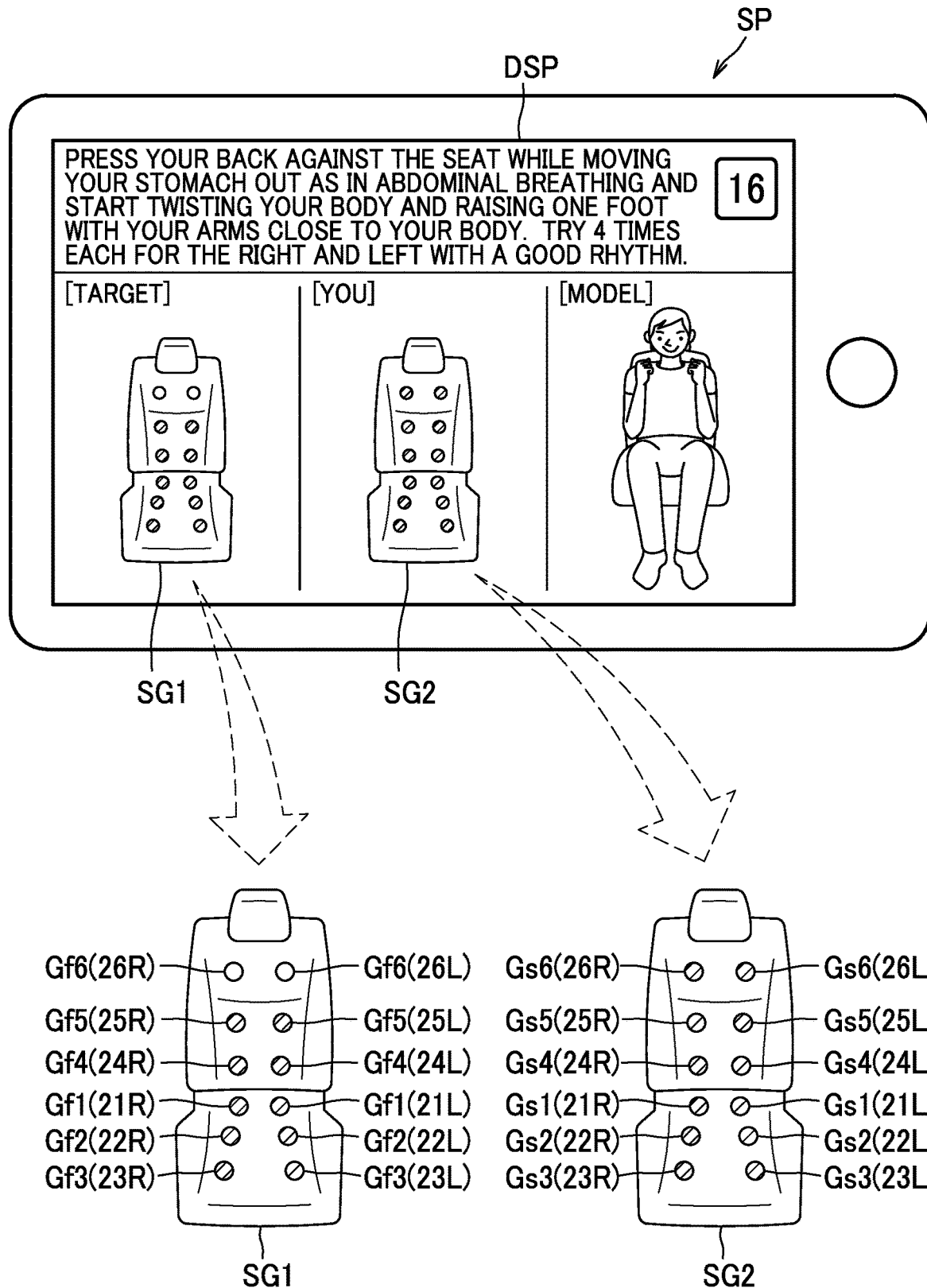
FIG. 19 is a diagram showing a screen at the start of a practice mode and an exercise game.
Figure 20:
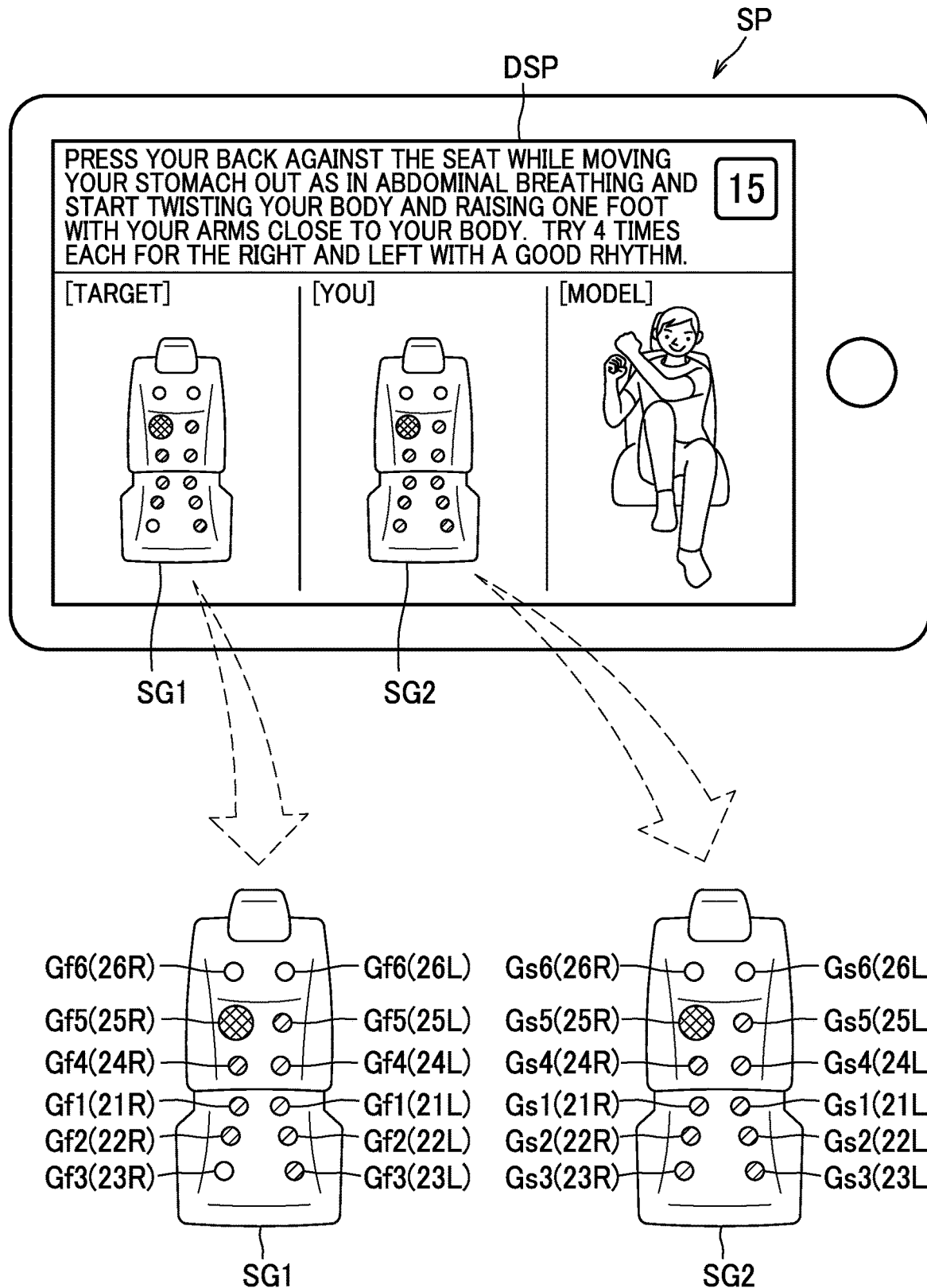
FIG. 20 is a diagram showing a screen for instructing a right foot twist-up pose.
Figure 21:
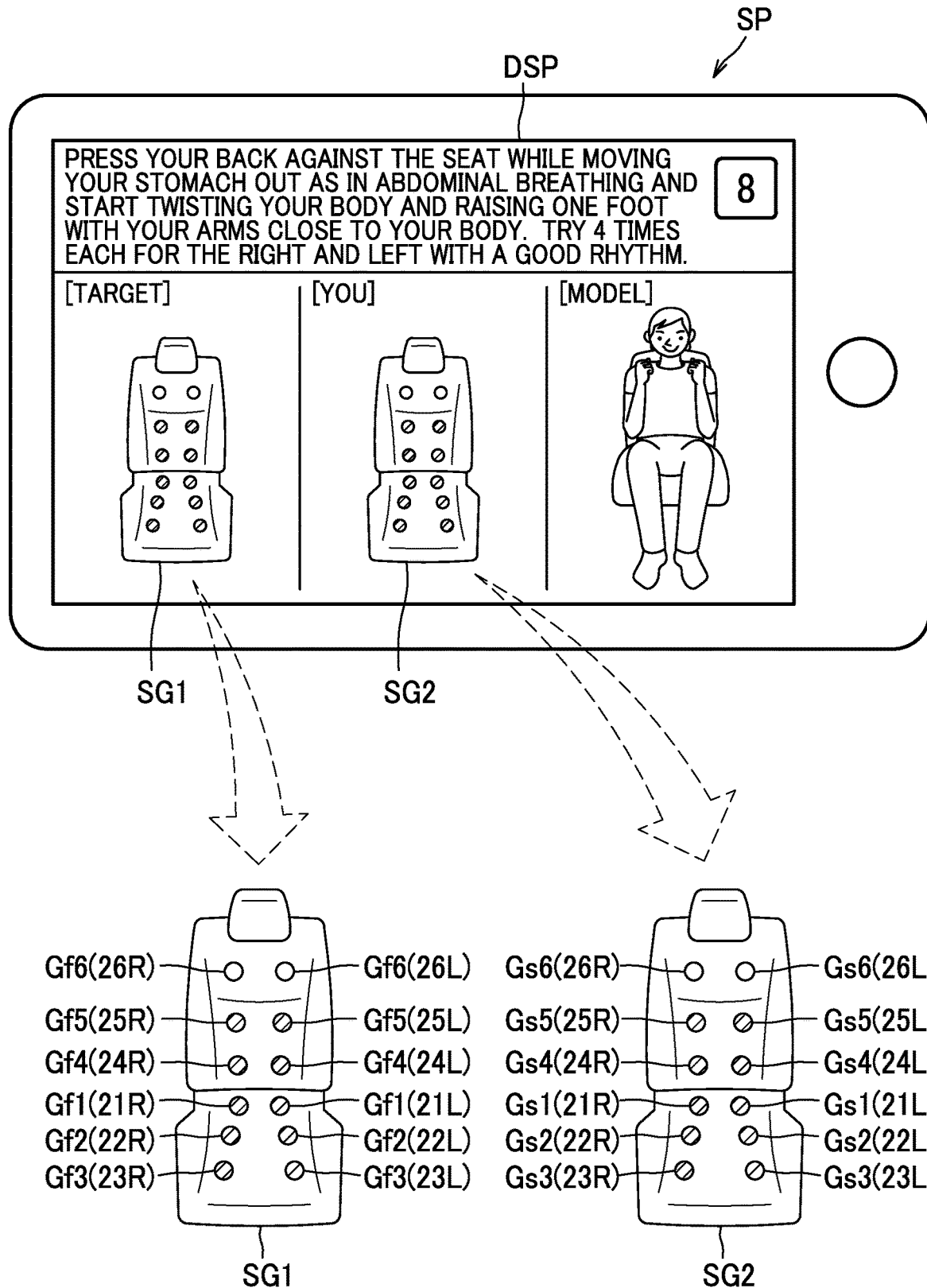
FIG. 21 is a diagram showing a screen for instructing a reference pose.
Figure 22:
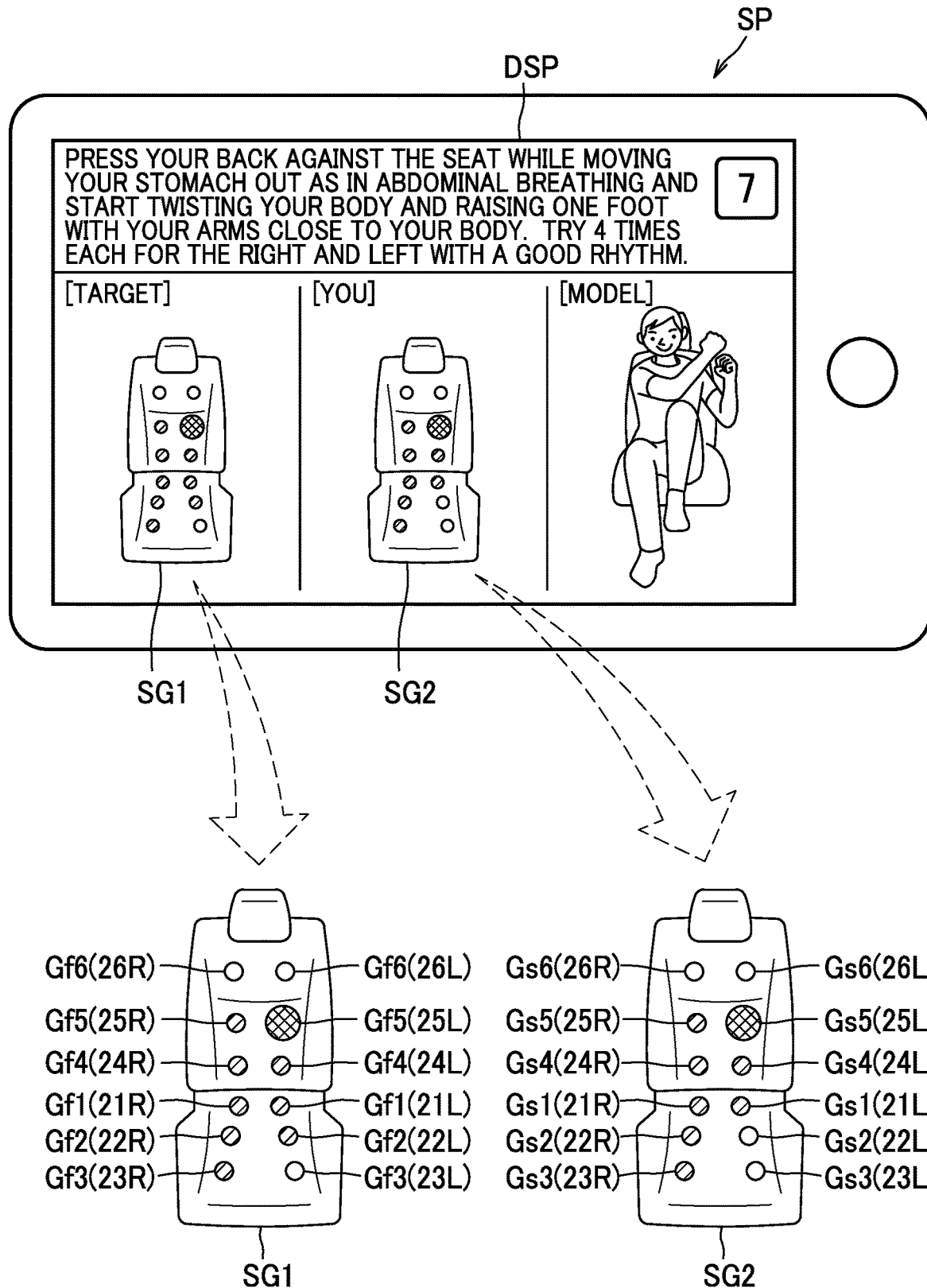
FIG. 22 is a diagram showing a screen for instructing a left foot twist-up pose.
Figure 23:
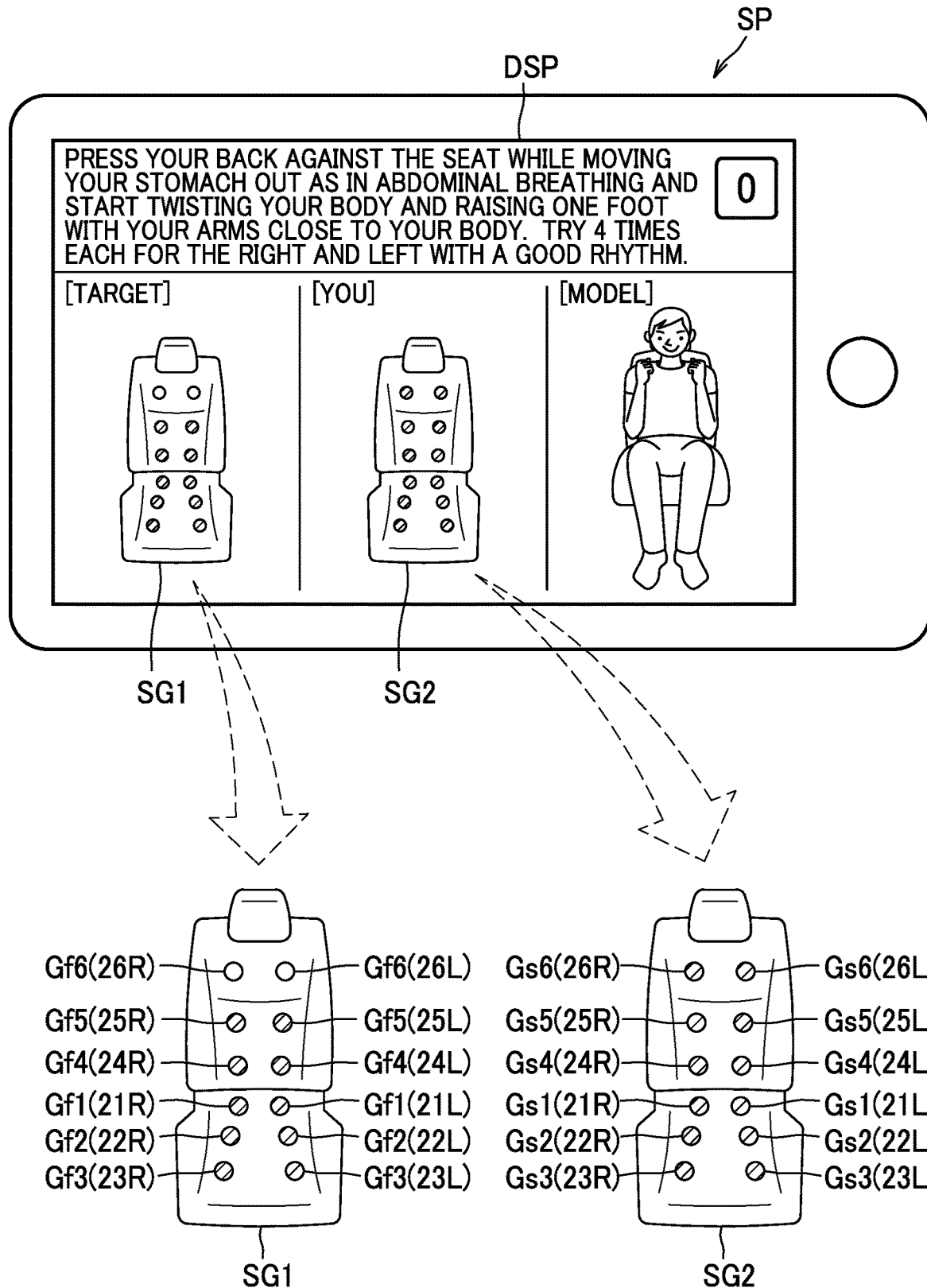
FIG. 23 is a diagram showing a screen at the end of the practice mode and the exercise game.

In this embodiment, in order to instruct the occupant to make a reference pose shown in FIG. 19 and a pose shown in FIG. 20 in which the upper body and the lower body are twisted so as to contact the right knee with the left elbow, alternately, four times each and eight times all together, the smartphone SP plays music with a good rhythm and displays images of each pose alternately every predetermined time period. Further, in order to instruct the occupant to make the reference pose shown in FIG. 19 and a pose shown in FIG. 22 in which the upper body and the lower body are twisted so as to contact the left knee with the right elbow, alternately, four times each and eight times all together, the smartphone SP displays images of each pose alternately every predetermined time period. In the following description, the pose shown in FIG. 20 is also referred to as right foot twist-up pose and the pose shown in FIG. 22 is also referred to as left foot twist-up pose.

As shown in FIG. 19, the smartphone SP has a function of displaying on the display DSP which is a display of the smartphone SP a plurality of first images Gf1 to Gf6 which are located in positions corresponding to the plurality of pressure sensors 21 to 26 located on the seat body S0. To be more specific, the smartphone SP displays each of the first images Gf1 to Gf6 so that they overlap an image of a seat SG1 displayed on the display DSP. To be more specific, the first images Gf1 to Gf6 are respectively provided in pairs, each located left and right, symmetric with respect to a laterally central position of the vehicle seat S, similar to the actual pressure sensors 21 to 26.

The smartphone SP has a function of displaying the first images corresponding to target sensors in such a manner that they stand out compared with the other first images, wherein the target sensors provide a target when the occupant makes a predetermined pose on the seat body S0 and should be caused to react more strongly compared with non-target sensors which are not a target. Here, the reference pose shown in FIG. 19 is defined as a pose in which the occupant's shoulders are off the seat body S0 so that the twist-up pose may be made more easily. Therefore, in the reference pose shown in FIG. 19, the left and right pressure sensors 26 which receive pressure from the shoulders of the occupant are the non-target sensors and the rest of the pressure sensors 21 to 25 are the target sensors. When the smartphone SP provides instructions for the reference pose, it displays the first images in such a manner that, compared with the left and right first images Gf6 corresponding to the non-target sensors, the other first images Gf1 to Gf5 corresponding to the target sensors stand out.

To be more specific, the smartphone SP displays the first images in such a manner that the first images corresponding to the target sensors stand out compared with the other first images by displaying the first images corresponding to the target sensors in a color different from that of the other first images. Specifically, for example, if the color of the seat image SG1 is grey, the smartphone SP displays the left and right first images Gf6 corresponding to the non-target sensors in a color that does not stand out in grey (for example grey) and displays the rest of the first images Gf1 to Gf5 corresponding to the target sensors in a color that stands out in grey (for example, a color having a higher saturation than grey) when it provides instructions for the reference pose.

If the right foot twist-up pose shown in FIG. 20 is performed correctly, pressure is not placed on the right pressure sensor 23R which receives pressure from the right thigh of the occupant and the left and right pressure sensors 26 which each receive pressure from the shoulders of the occupant, a highest first pressure is placed on the right pressure sensor 25R which receives pressure from the right side of the back of the occupant, and a second pressure smaller than the first pressure is placed on the other pressure sensors 21, 22, 23L, 24, 25L.

Accordingly, when the right foot twist-up pose is instructed, if the right pressure sensor 23R and the left and right pressure sensors 26 are the non-target sensors, the rest of the pressure sensors are the target sensors. When the right foot twist-up pose is instructed, if the pressure sensors 21, 22, 23L, 24, 25L which receive the second pressure are the non-target sensors, the right pressure sensor 25R which receives the first pressure is the target sensor.

Accordingly, when the smartphone SP provides instructions for the right foot twist-up pose, it displays the first images in such a manner that, compared with the first image Gf3 on the right side and the first images Gf6 on the left and right sides, the rest of the first images Gf1 to Gf5 stand out. When the smartphone SP provides instructions for the right foot twist-up pose, it displays the first image Gf5 on the right side corresponding to the first pressure in such a manner that it stands out compared with the first images Gf1 to Gf5 corresponding to the second pressure.

To be more specific, the smartphone SP makes the first image Gf5 on the right side corresponding to the first pressure stand out compared with the first images Gf1 to Gf5 corresponding to the second pressure by displaying the first image Gf5 on the right side in a color different from that of the first images Gf1 to Gf5 and larger than the first images Gf1 to Gf5. Specifically, if the smartphone SP displays the first images Gf1 to Gf5 in a color, for example, yellow with low saturation, it displays the first image Gf5 on the right side in yellow with high saturation.

To be more specific, for example, the smartphone SP displays the first images corresponding to the pressure sensors in which pressure values acquired therefrom should be lower than a first predetermined value in such a manner that these images have a size of a predetermined first area and grey color. The smartphone SP displays the first images corresponding to the pressure sensors in which pressure values acquired therefrom should be equal to or higher than the first predetermined value and lower than a second predetermined value in such a manner that these images have a size with the predetermined first area and yellow color with low saturation. Further, the smartphone SP displays the first images corresponding to the pressure sensors in which pressure values acquired therefrom should be higher than the second predetermined value in such a manner that these images have a size of a second area larger than the first area and yellow color with high saturation.

The smartphone SP has a function of displaying on the display DSP a plurality of second images Gs1 to Gs6 located in positions corresponding to the plurality of pressure sensors 21 to 26 located on the seat body S0. To be more specific, the smartphone SP displays each of the second images Gs1 to Gs6 so that the images overlap a seat image SG2 displayed on the display DSP. Specifically, the second images Gs1 to Gs6 are provided in pairs, each located left and right, symmetric with respect to a laterally central position of the vehicle seat S, similar to the actual pressure sensors 21 to 26. The smartphone SP displays on the display GSP the plurality of first images Gf1 to Gf6 and the seat image SG1, and the plurality of second images Gs1 to Gs6 and the seat image SG2 side by side.

The smartphone SP has a function of displaying second images corresponding to sensors which react more strongly compared with the other sensors in such a manner that they stand out compared with the other second images when the occupant makes a predetermined pose on the seat body S0 based on measurement values acquired from the respective pressure sensors 21 to 26. Specifically, for example, as shown in FIG. 20 when the occupant makes the right foot twist-up pose and specific sensors react more strongly than the other sensors, the smartphone SP displays the second images in such a manner that, compared with the second images Gs6 corresponding to the other sensors (the left and right pressure sensors 26), the second images Gs1 to Gs5 corresponding to the specific sensors (left and right pressure sensors 21 to 25) stand out. More specifically, the smartphone SP makes the images stand out by changing the color thereof similar to the case of the first images Gf1 to Gf6.

When the right pressure sensor 25R reacts more strongly than the other sensors (the left pressure sensor 25L and the left and right pressure sensors 21, 22, 23L, 24) among the specific sensors (the sensors which have reacted) as shown in FIG. 20, the smartphone SP displays the second images Gs5 on the right side corresponding to the right pressure sensor 25R in such a manner as to stand out compared with the second images Gs1 to Gs5 corresponding to the other sensors. To be more specific, the smartphone SP displays the second images in such a manner that the second images Gs5 corresponding to the sensors that have reacted more strongly compared with the other sensors have a size larger than, and a color different from, and thus stand out compared with the other second images Gs1 to Gs5.

To be more specific, for example, the smartphone SP displays the second images corresponding to the specific pressure sensors in which pressure values acquired therefrom are lower than a first predetermined value in such a manner that they have a size of a predetermined first area and a grey color. The smartphone SP displays the second images corresponding to the specific pressure sensors in which pressure values acquired therefrom are equal to or higher than the first predetermined value and lower than a second predetermined value in such a manner that they have a size of a predetermined first area and a yellow color with low saturation. Further, the smartphone SP displays the second images corresponding to the specific pressure sensors in which pressure values acquired therefrom are equal to or higher than the second predetermined value in such a manner that they have a size of a second area larger than the first area and a yellow color with high saturation.

The smartphone SP has a function of computing an evaluation value which indicates a degree of match between an occupant's pose and a predetermined pose based on the pressure values acquired from predetermined pressure sensors 23 to 26 among all of the pressure sensors 21 to 26. Specifically, within a predetermined time period including the time of instruction of the pose, when a pressure value acquired from a target sensor that is a sensor on which pressure should be applied is equal to or higher than a first threshold $\alpha$, the smartphone SP computes an evaluation value that is higher than an evaluation value computed when the pressure value is lower than the first threshold $\alpha$. Within the predetermined time period including the time of instruction of the pose, when a pressure value acquired from the non-target sensor is equal to or lower than a second threshold $\beta$, the smartphone SP computes an evaluation value that is higher than an evaluation value computed when the pressure value is higher than the second threshold $\beta$.

To be more specific, when the smartphone SP provides instructions for the reference pose, it determines whether or not the pressure values of the left and right pressure sensors 26 corresponding to the shoulders of the occupant are respectively equal to or lower than the second threshold $\beta$ and determines whether the pressure values of the right and left pressure sensors 24 corresponding to the lumbar region of the occupant are respectively equal to or larger than the first threshold $\alpha$ within the predetermined time period. Here, the second threshold $\beta$ is individually set for each of the left and right pressure sensors 26. That is, a unique second threshold $\beta61$ is set for the left pressure sensor 26L and a unique second threshold $\beta62$ is set for the right pressure sensor 26R. Similarly, with regard to the first threshold $\alpha$, a unique first threshold $\beta41$ is set for the left pressure sensor 24L and a unique first threshold $\beta42$ is set for the right pressure sensor 24R. The setting of the first threshold $\alpha$ and the second threshold $\beta$ will be described in detail later.

When the smartphone SP provides instructions for the right foot twist-up pose, it determines whether or not the pressure value of the right pressure sensor 23R corresponding to the right thigh of the occupant is equal to or lower than the second threshold $\beta$, and determines whether the pressure value of the right sensor 25R corresponding to right side of the back of the occupant is equal to or higher than the first threshold $\alpha$ within the predetermined time period. When the smartphone SP provides instructions for the left foot twist-up pose, it determines whether or not the pressure value of the left pressure sensor 23L corresponding to the left thigh of the occupant is equal to or lower than the second threshold $\beta$, and determines whether the pressure value of the left pressure sensor 25L corresponding to left side of the back of the occupant is equal to or higher than the first threshold a within the predetermined time period.

In the present embodiment, the evaluation value is provided as an exercise point wherein the higher the numeric value is, the higher the evaluation value. Specifically, the smartphone SP does not add points to the exercise point if it determines that the above conditions are not satisfied, but adds 1 point or 10 points to the exercise point if it determines that the above conditions are satisfied.

To be more specific, when the smartphone SP provides instructions for the reference pose, it adds 1 point to the exercise point if the above condition is satisfied. When the smartphone SP provides instructions for the right foot twist-up pose or the left foot twist-up pose, it adds points higher than those added for the reference pose, specifically 10 points, to the exercise point if the above conditions are met.

Next, the operation of the smartphone SP (more specifically, the control unit in the smartphone SP) will be described.

Figure 15:
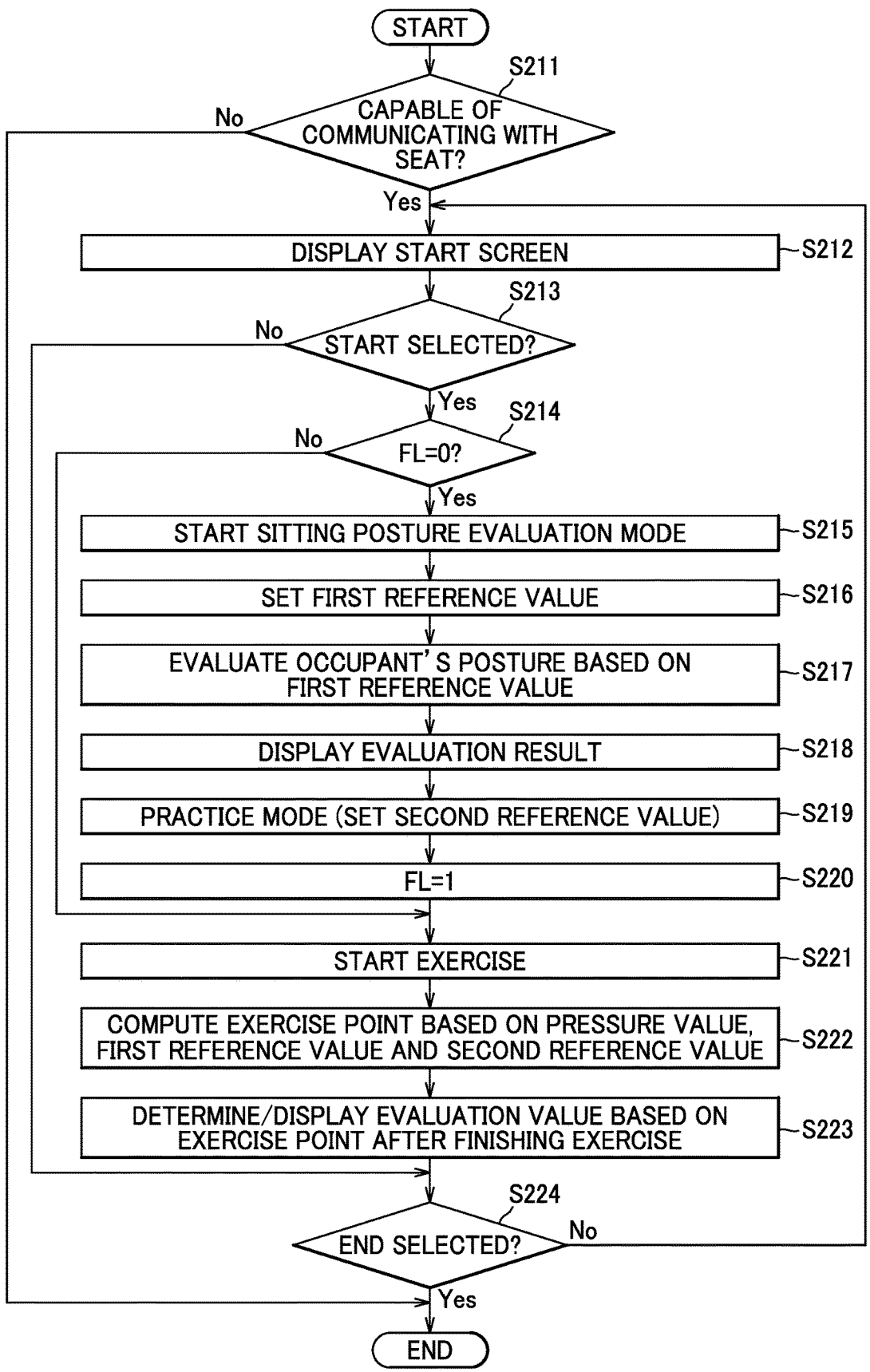
FIG. 15 is a flowchart of a process executed in a smartphone.

When the smartphone SP starts up an app which allows the occupant to play the exercise game, it starts the process shown in FIG. 15 (START). In this process, the smartphone SP first checks whether or not it is in a state capable of communicating with the seat S (S211).

In step S211, if it is determined that it is not in a state capable of communicating (No), the smartphone SP ends the present process. In step S211, if it is determined that it is in a state capable of communicating (Yes), the smartphone SP displays a start screen for the exercise game (see FIG. 16) on the display DSP (S212).

Figure 16:
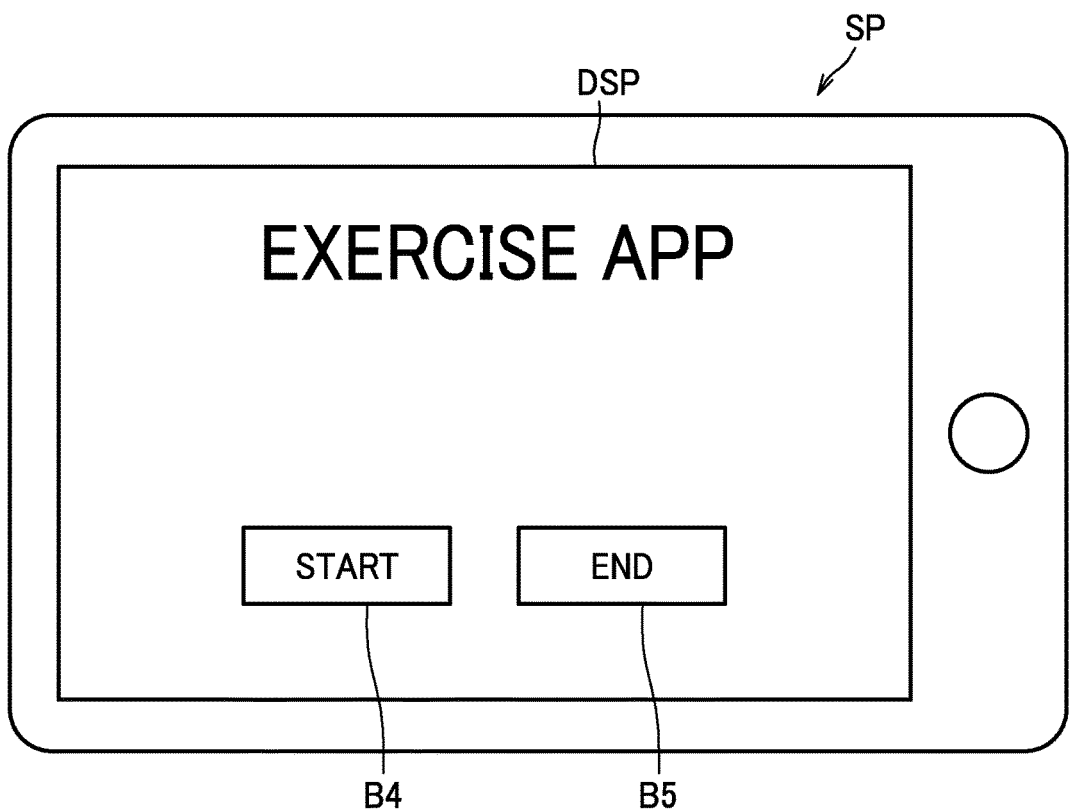
FIG. 16 is a diagram showing a start screen.

In the start screen shown in FIG. 16, a start button B4 for starting the exercise game and a button B5 for ending the exercise game are displayed.

After step S212, the smartphone SP determines whether or not the start button B4 is selected (S213). In step S213, if it is determined that the start button B4 is selected (Yes), the smartphone SP determines whether or not a flag FL is 0 which flag indicates whether a sitting posture evaluation mode and a practice mode of the exercise game have previously been executed (S214).

Here, the sitting posture evaluation mode is a mode for evaluating a usual sitting posture of the occupant, specifically, a mode in which the right and left weight balance of the upper body and the lower body of the occupant is evaluated. In the sitting posture evaluation mode, the smartphone SP acquires each of the pressure values for the usual sitting posture of the occupant, and sets first reference values based on the pressure values, which first reference values are used to determine target pressure values for the reference pose of the exercise game.

The practice mode is a mode in which the occupant is allowed to play the exercise game. In the practice mode, the smartphone SP acquires each of the pressure values while the exercise game is played and sets second reference values based on specific pressure values, which second reference values are used to determine target pressure values for the twisted postures during the exercise game.

In step S214, if it is determined that F=0 is not true (No), i.e., if the seat posture evaluation mode and the practice mode have previously been executed, the smartphone SP skips the sitting posture evaluation mode and the practice mode (S215 to S220) and starts the exercise game (S21). In step S214, if it is determined that F=0 is true (Yes), i.e., if the sitting posture evaluation mode and the practice mode have never been executed, the smartphone SP starts the sitting posture evaluation mode (S215).

Figure 17:
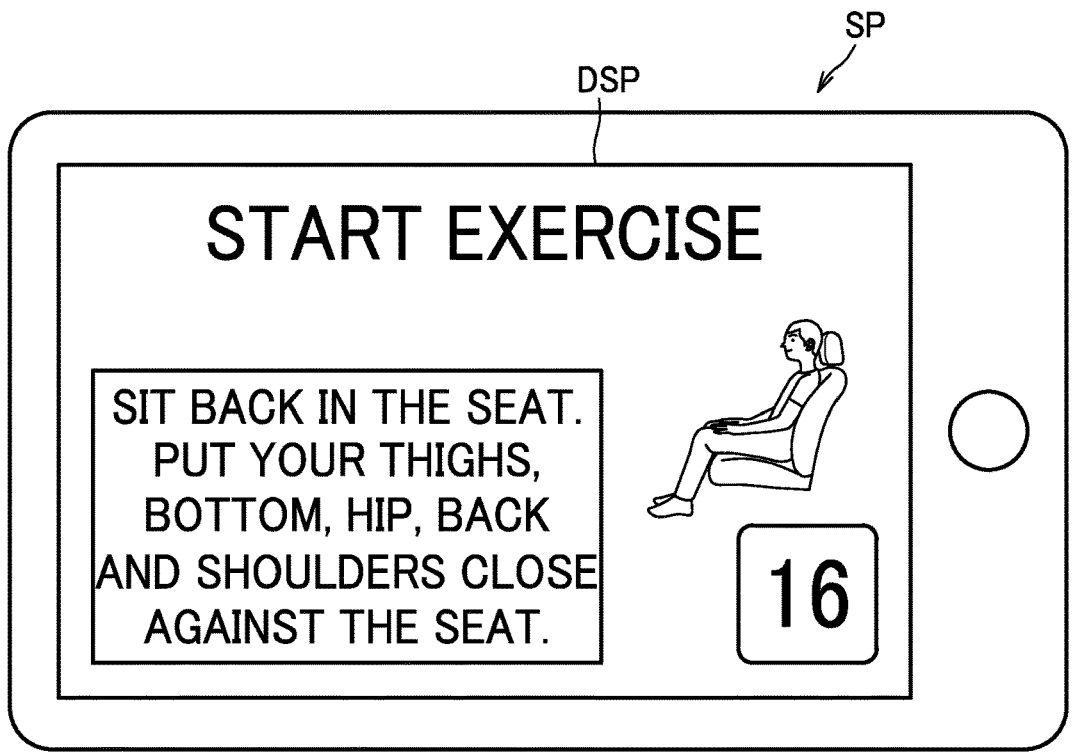
FIG. 17 is a diagram showing a screen at the start of a sitting posture evaluation mode.

When the smartphone SP starts the sitting posture evaluation mode, it displays the screen shown in FIG. 17 on the display DSP. In the screen shown in FIG. 17, a message "Sit back in the seat. Put your thighs, bottom, hip, back and shoulders close against the seat." and a countdown indicator which indicates the time left to measure weight distribution of the occupant is displayed. In this embodiment, the number "16" which indicates that the number to be decremented is 16 is displayed as the countdown indicator at the start of the sitting posture evaluation mode.

During counting down 16 counts, the smartphone SP acquires pressure values from the respective pressure sensors 21 to 26. To be more specific, the smartphone SP does not acquire the pressure values during the first 8 counts and acquires the pressure values while counting down the last 8 counts. That is, the smartphone SP does not acquire the pressure values for a predetermined time after the sitting posture evaluation mode starts and acquires the pressure values after lapse of the predetermined time. In this way, by not acquiring the pressure values for a predetermined time after the sitting posture evaluation mode starts, it is possible to eliminate unstable pressure values which may occur, for example, when the occupant is being reseated on the seat S and acquire more accurate pressure values.

To be more specific, the smartphone SP acquires the pressure values from the respective pressure sensors 21 to 26 at a predetermined cycle while counting down 8 counts. Here, for example, if the smartphone SP acquires the pressure values at a cycle of 20 Hz, and 1 count is 1 second, the number of pressure values acquired from one pressure sensor would be 161.

As shown in FIG. 15, the smartphone SP sets the average values of the pressure values acquired from the respective pressure sensors 21 to 26 as the first reference values for the respective pressure sensors 21 to 26 (S216). In the following description, the first reference values for the right pressure sensors 21R to 26R are also referred to as "FR1, FR2, ..., FR6" and the first reference values for the left pressure sensors 21L to 26L are also referred to as "FL1, FL2, ..., FL6".

After step S216, the smartphone SP evaluates the occupant's posture based on the first reference values (S217) and displays evaluation results on the display DSP (S218). Specifically, in step S217, the smartphone SP compares the first reference values FR1 to FR3 corresponding to the right side of the lower body of the occupant with the first reference values FL1 to FL3 corresponding to the left side of the lower body of the occupant and evaluates the weight distribution of the lower body. The smartphone SP also compares the first reference values FR4 to FR6 corresponding to the right side of the upper body of the occupant with the first reference values FL4 to FL6 corresponding to the left side of the upper body of the occupant and evaluates the weight distribution of the upper body.

To be more specific, the smartphone SP uses the following equations (1), (2) to evaluate the occupant's posture.

$$K1 \leq (FR1+FR2+FR3)/(FL1+FL2+FL3) \leq K2 \quad (1)$$

$$K3 \leq (FR4+FR5+FR6)/(FL4+FL5+FL6) \leq K4 \quad (2)$$

Here, K1 is a numerical value smaller than 1, for example, 0.9. K2 is a numerical value larger than 1, for example, 1.1. K3 is a numerical value smaller than 1, for example, 0.95. K4 is a numerical value larger than 1, for example, 1.05.

When the ratio of the right to left pressure values of the lower body and the upper body satisfies the above equations (1), (2), the smartphone SP displays a positive evaluation result on the display DSP and when the pressure values do not satisfy the above equations (1), (2), it displays a negative evaluation result on the display DSP.

Figure 18:
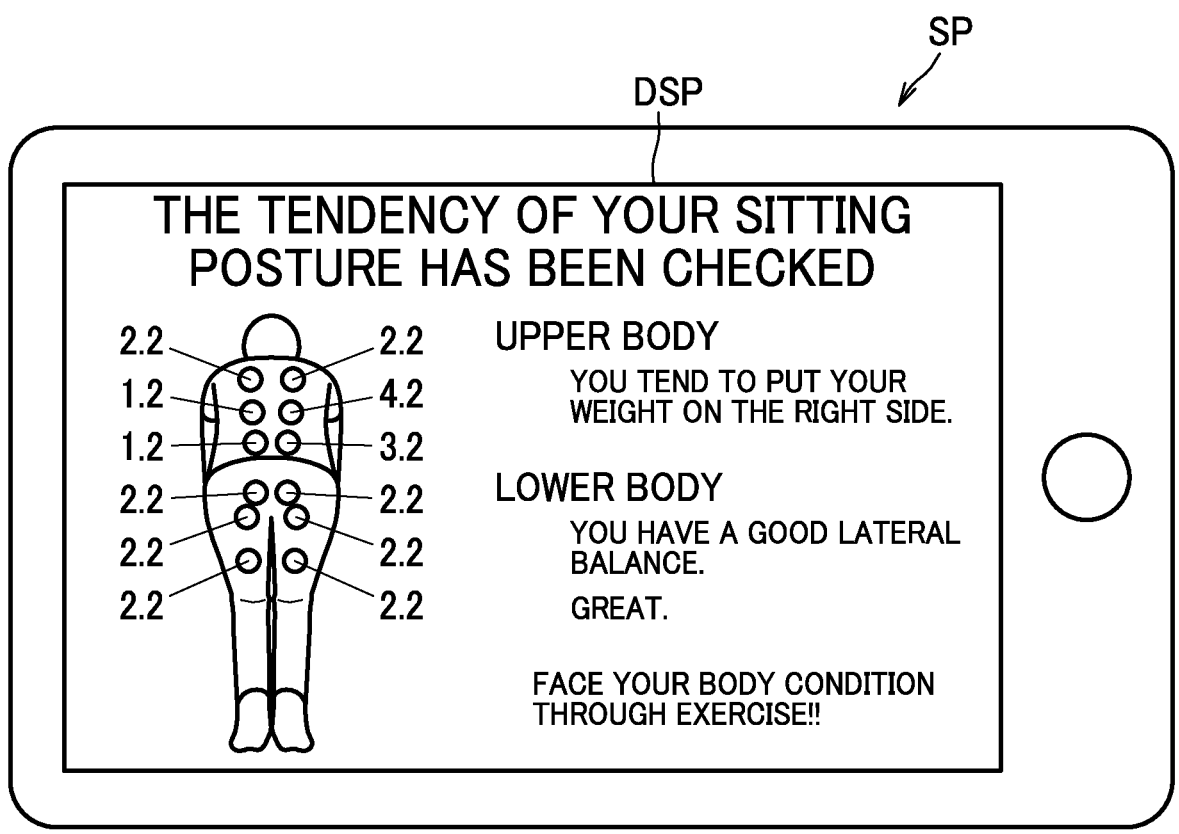
FIG. 18 is a diagram showing a screen displaying evaluation results of the sitting posture evaluation mode.

To be more specific, as shown in FIG. 18, for example, if the ratio of pressure values for the lower body satisfies the above equation (1), the smartphone SP displays a message such as "You have a good lateral balance." or "Great." on the display DSP regarding the lower body. For example, if the ratio of pressure values for the upper body exceeds the upper limit K4 of the above equation (2), the smartphone SP displays a message such as "You tend to put your weight on the right side." on the display DSP regarding the upper body.

Referring back to FIG. 15, after step S218, the smartphone SP executes the practice mode (S219). When the smartphone SP starts the practice mode, it displays the screen shown in FIG. 19 on the display DSP. In the screen shown in FIG. 19, a message "Press your back against the seat while moving your stomach out as in abdominal breathing and start twisting your body and raising one foot with your arms close to your body. Try 4 times each for the right and left with a good rhythm." and a countdown indicator which indicates the time left to perform the exercise is displayed. In this embodiment, the number "16" indicating that the number to be decremented is 16 is displayed as the countdown indicator at the start of the practice mode.

In addition to the above message, a message such as "First, twist your body to move your right knee closer to your left elbow 4 times, and then twist your body to move your left knee closer to your right elbow 4 times." may also be displayed.

In the practice mode, the smartphone SP displays an image of a character making a model pose for the occupant on the display DSP. Specifically, to instruct the occupant to make the right foot twist-up pose 4 times, the smartphone SP displays the reference posture shown in FIG. 19 and the right foot twist-up pose shown in FIG. 20 alternately for every 1 count and 4 times each as a model. To instruct the occupant to perform the left foot twist-up pose 4 times, the smartphone SP displays the above-described reference posture and the left foot twist-up pose shown in FIG. 22 alternately for every 1 count and 4 times each as a model. The smartphone SP switches the above poses in tune with the music with a good rhythm and decrements the number in the countdown indicator by 1 each time it switches the above-described poses.

In the practice mode, the smartphone SP acquires the pressure values from the respective pressure sensors 21 to 26 at a predetermined cycle. Specifically, when the smartphone SP makes the occupant perform the right foot twist-up pose within 8 counts, it does not acquire the pressure values for the first 4 counts of the 8 counts, and acquires the pressure values for the right foot twist-up pose while counting down the last 4 counts. When the smartphone makes the occupant perform the left foot twist-up pose within 8 counts, it does not acquire the pressure values for the first 4 counts of the 8 counts, and acquires the pressure values for the left foot twist-up pose while counting down the last 4 counts. That is, the smartphone SP does not acquire the pressure values for a predetermined time period after it starts providing instructions for the right foot twist-up pose or the left foot twist-up pose and acquires the pressure values after lapse of the predetermined time period. In this way, advantageous effects similar to that described above can be obtained.

The smartphone SP sets average values of the pressure values acquired from each right pressure sensor 23R to 25R within a period close to odd-numbered counts (close to when the countdown indicator is 11, 9) during the last 4 counts of the right foot-twist up pose, as the second reference values which serve as target values for the right foot twist-up pose. The smartphone SP sets average values of the pressure values of each left pressure sensor 23L to 25L within a period close to odd-numbered counts (close to when the countdown indicator is 3, 1) during the last 4 counts of the left foot-twist up pose, as the second reference values which serve as target values for the left foot twist-up pose. In the following description, the second reference values corresponding to the right pressure sensors 23R, 25R will also be referred to as "SR3, SR5", and the second reference values corresponding to the left pressure sensors 23L, 25L will also be referred to as "SL3, SL5".

Referring back to FIG. 15, when the smartphone SP finishes the practice mode of step S219, it sets the flag FL at 1 (S220) and starts the exercise game (S221). In the exercise game, the smartphone SP displays a screen similar to that of the practice mode (see FIG. 19 to FIG. 23) and makes the occupant perform an exercise.

During the exercise game, the smartphone SP computes the exercise point based on the pressure values acquired from the respective pressure sensors 21 to 26 and the first reference values and the second reference values respectively described above (S222). To be more specific, if the smartphone SP is providing instructions to the occupant for the pose of the reference posture on even-numbered counts among the 16 counts, it acquires the pressure values from the left and right pressure sensors 26 corresponding to the shoulders of the occupant and the left and right pressure sensors 24 corresponding to the lumbar region of the occupant within a predetermined time period including the time of instruction of the pose.

The smartphone SP determines the degree of match between the occupant's posture and the reference posture by comparing a smallest pressure value acquired within the predetermined time period from the pressure sensors 26 corresponding to the shoulders with the first reference values FR6, FL6 corresponding to the shoulders, and by comparing a largest pressure value acquired within the predetermined time period from the pressure sensor 24 corresponding to the lumbar region with the first reference values FR4, FL4 corresponding to the lumbar region. To be more specific, the smartphone SP adds 1 point to the exercise point each time one of the four conditions of the following equations (3) to (6) are satisfied. Accordingly, for example, when all the four conditions given in the following equations (3) to (6) are satisfied, the smartphone adds 4 points to the exercise point.

$$PR6 \leq FR6 \times K5 \quad (3)$$

$$PL6 \leq FL6 \times K5 \quad (4)$$

$$PR4 \geq FR4 \times K6 \quad (5)$$

$$PL4 \geq FL4 \times K6 \quad (6)$$

PR6: minimum value of the pressure values acquired within the predetermined time period from the pressure sensor 26R corresponding to the right shoulder PL6: minimum value of the pressure values acquired within the predetermined time period from the pressure sensor 26L corresponding to the left shoulder PR4: maximum value of the pressure values acquired within the predetermined time period from the pressure sensor 24R corresponding to the right side of the lumbar region PL4: maximum value of the pressure values acquired within the predetermined time period from the pressure sensor 24L corresponding to the left side of the lumbar region K5, K6: coefficients Here, $FR4 \times K6$ and $FL4 \times K6$ correspond to the first threshold $\alpha$ described above, and $FR6 \times K5$ and $FL6 \times K5$ correspond to the second threshold $\beta$ described above. K5 may be a numerical value smaller than 1, for example, 0.1. K6 may be a numerical value larger than 1, for example, 1.1.

Although the first reference values FR6, FL6, FR4, FL4 multiplied by the coefficients K5, K6 are respectively used as the thresholds $\alpha$, $\beta$, the thresholds $\alpha$, $\beta$ may be the first reference values FR6, FL6, FR4, FL4 themselves. However, by multiplying the first reference values by the coefficients, it is possible to clearly determine the strength or weakness of pressure in the reference posture, apart from fluctuations of the pressure values in the normal sitting posture.

To be more specific, for example, the first reference values FR6, FL6 corresponding to the shoulders are equivalent to the pressure values corresponding to the shoulders of the occupant in a normal sitting posture with his/her whole body held close against the seat S. By multiplying the first reference values FR6, FL6 which are pressure values such as described above by the coefficient K5 smaller than 1, it can be clearly determined that the occupant is pulling his/her shoulders away from the seat S. Similarly, by multiplying the first reference values FR4, FL4 corresponding to the lumbar region by the coefficient K6 larger than 1, it can be clearly determined that the occupant is holding his/her lumbar region close against the seat S.

When the smartphone SP is providing instructions for the right foot twist-up pose during the odd-numbered counts of the first 8 counts among the 16 counts, it acquires pressure values from the pressure sensor 25R corresponding to the right side of the back of the occupant and the pressure sensor 23R corresponding to the right thigh of the occupant within the predetermined time period including the time of instruction of the pose. Further, the smartphone SP determines a degree of match of the occupant's posture with the right foot twist-up pose by comparing the maximum pressure value of the right side of the back and the second reference value SR5 of the right side of the back, and by comparing the minimum pressure value of the right thigh and the second reference value SR3 of the right thigh.

To be more specific, the smartphone SP adds 10 points to the exercise point each time one of the two conditions of the following equations (7), (8) is satisfied. Accordingly, for example, when the both of the two conditions given in the following equations (7), (8) are satisfied, the smartphone SP adds 20 points to the exercise point.

$$PR5 \geq SR5 \times K7 \quad (7)$$

$$PR3 \leq SR3 \times K8 \quad (8)$$

PR5: maximum value of the pressure values acquired within the predetermined time period from the pressure sensor 25R corresponding to the right side of the back PR3: minimum value of the pressure values acquired within the predetermined time period from the pressure sensor 23R corresponding to the right thigh K7, K8: coefficients Here, $SR5 \times K7$ corresponds to the first threshold $\alpha$ described above, and $SR3 \times K8$ corresponds to the second threshold $\beta$ described above. K7 may be a numerical value larger than 1, for example, 1.5. K8 may be a numerical value smaller than 1, for example, 0.8.

Although the second reference values SR5, SR3 multiplied by the coefficients K7, K8 are respectively used as the thresholds $\alpha$, $\beta$, the thresholds $\alpha$, $\beta$ may be the second reference values SR5, SR3 themselves. However, by multiplying the second reference values by the coefficients, it is possible to clearly determine the strength or weakness of the pressure in the exercise game, apart from fluctuations of the pressure values in the practice mode.

To be more specific, for example, the second reference value SR5 corresponding to the right side of the back is equivalent to the pressure value corresponding to the right side of the back as acquired when the right-foot twist-up pose is made in the practice mode. By multiplying the second reference value SR5 which is a pressure value such as described above by the coefficient K7 larger than 1, it can be clearly determined that the occupant is strongly pressing the right side of his/her back against the seat S. Similarly, by multiplying the second reference value SR3 corresponding to the right thigh by the coefficient K8 smaller than 1, it can be clearly determined that the occupant is holding his/her right thigh off the seat S.

The operation to be performed when the smartphone provides instructions for the left foot twist-up pose is different from the operation performed when providing instructions for the right foot twist-up pose only in that the lateral orientation is reversed; besides that, it operates in a similar manner; therefore, explanation thereof will be omitted.

After the exercise game ends, the smartphone SP determines the evaluation value based on the exercise point and displays the evaluation value on the display DSP (S223). To be more specific, the smartphone SP determines the evaluation value based on the table shown in FIG. 24. Specifically, if the exercise point Pt is lower than 35 points, the smartphone SP determines that the evaluation value is "Worst". If $35 \leq Pt < 70$, the smartphone SP determines that the evaluation value is "Bad", and if $70 \leq Pt < 90$, it determines that the evaluation value is "Good". Further, if $90 \leq Pt < 110$, the smartphone SP determines that the evaluation value is "Great", and if $110 \leq Pt$, it determines that the evaluation value is "Excellent". After the smartphone SP displays the evaluation value on the display DSP, it displays the start screen.

Referring back to FIG. 15, after step 223, or if it is determined No in step S213, the smartphone SP determines whether or not the button B5 for ending the exercise game is selected in the start screen shown in FIG. 16 (S224). If it is determined in step S224 that the button B5 is not selected (No), the smartphone SP returns to the process of step S212. If it is determined in step S224 that the button B5 is selected (Yes), the smartphone SP ends the present process.

Next, one example of a specific operation of the seat system 1 will be described.

As shown in FIG. 14, if the occupant operates the smartphone SP and starts up the exercise app in a state where the respective hardware (S, SP) constituting the seat system 1 is capable of communicating, the process of step S211: Yes—>step S212 is successively executed in the process shown in FIG. 15. As a result, the start screen shown in FIG. 16 is displayed on the display DSP.

When the occupant selects the start button B3, it is determined Yes in step S213 and the process proceeds to step S214. Here, if the occupant has never carried out the sitting posture evaluation mode etc. in the past, it is determined Yes in step S214 and the sitting posture evaluation mode and the practice mode is executed (S215 to S220).

In the sitting posture evaluation mode, the screen shown in FIG. 17 is displayed on the display DSP. The occupant reseats himself/herself in such a manner that his/her whole body is held closely against the seat S according to the instructions on the screen. While the countdown indicator is decremented from 16 to 0, the smartphone SP acquires the pressure values from the respective sensors 21 to 26 with the occupant keeping a posture.

As shown in FIG. 18, the smartphone SP displays the tendency of the sitting posture of the occupant on the display DSP based on the pressure values acquired in the sitting posture evaluation mode. In this way, the occupant may understand how his/her weight is distributed on the right and left when he/she is seated and may learn the correct sitting posture.

The smartphone SP sets the first reference values which are used to evaluate the normal posture in the exercise game based on the pressure values acquired during the sitting posture evaluation mode.

In the practice mode, the smartphone SP sequentially displays the poses shown in FIGS. 19 to 23 every 1 count and acquires the pressure values from the respective pressure sensors 21 to 26. The smartphone SP sets the second reference values which are used to evaluate the twisted postures in the exercise game, based on the pressure values acquired in the practice mode.

After the practice mode ends, the smartphone SP starts the exercise game (S221). During the exercise game, the smartphone SP sequentially displays the poses shown in FIGS. 19 to 23 every 1 count similar to the practice mode and acquires the pressure values from the respective sensors 21 to 26.

During the practice mode and the exercise game, the first images Gf1 to Gf6 which are targets and the second images Gs1 to Gs6 reflecting the posture of the occupant are displayed side by side on the display DSP. This allows the occupant making a reference posture, for example, as shown in FIG. 19, to recognize that his/her posture is wrong when the second image Gs6 corresponding to the pressure sensors 26 for the shoulders which should not react is displayed in such a manner that it stands out compared with the first image Gf6. Therefore, in this case, the occupant can make a correct reference posture by holding his/her shoulders off the seat S so that the displays of the second images Gs6 become identical to the first images Gf6.

For example, as shown in FIG. 20, if the occupant forgets to lift his/her right foot up while making the right foot twist-up pose and the pressure sensor 23R corresponding to the right thigh is reacting, the second image Gs3 corresponding to the pressure sensor 23R is displayed in such a manner that it stands out compared with the first image Gf3. Therefore, in this case, the occupant can lift his/her right foot to take the correct right foot twist-up pose so that the display of the second image Gs3 becomes identical to the first image Gf3.

As has been described above, with the seat system 1 according to the present embodiment, the following advantageous effects can be achieved.

Since the first images corresponding to the target sensors are displayed in such a manner as to stand out compared with the other first images when the occupant seated on the seat S makes the predetermined pose in accordance with the instructions from the smartphone SP, it is possible to make the occupant seated on the seat S properly perform the exercise.

Since the smartphone SP displays the first images corresponding to the target sensors in a color different from the color of the other first images, it is possible to make the first images corresponding to the target sensors to sufficiently stand out by difference in color.

Since the first images which are targets for the pose, and the second images which change depending on the motion of the occupant are displayed on the screen, the occupant can reliably confirm whether he/she is making the predetermined pose.

Since the smartphone SP causes the second images corresponding to the sensors which react stronger to be displayed therein larger than the other second images, it is possible to make the second images corresponding to the sensors which react stronger sufficiently stand out by difference in size.

Since the plurality of first images and the plurality of second images are displayed side by side, the occupant can easily compare the first images which provide targets and the second images which change depending on the motion of the occupant.

Since the smartphone SP computes the evaluation value based on information acquired within a predetermined time period including the time of instruction of the predetermined pose, for example, compared to an alternative method in which the evaluation value is computed based on information acquired at the time the predetermined pose is instructed, the degree of match between the occupant's pose and the predetermined pose can be properly evaluated.

Since the pressure sensors 21 to 26 are provided on both the seat cushion S1 and the seat back S2, the motion of the lower body and the motion of the upper body of the occupant can be detected by the pressure sensors 21 to 26, and the predetermined pose can include various poses so that it is possible to instruct the occupant to make various motions.

Since pressure sensors 21 to 26 are used as the sensor, for example, compared to an alternative structure in which sensors such as optical sensors that can only acquire ON/OFF output signals are used, it is possible to obtain pressure values which continuously fluctuate. Accordingly, the degree of noticeability of the first image and/or the second image may be set by more than three levels and the predetermined pose can include various poses The second embodiment described above may be implemented in various other forms as described below. In the following description, the same reference characters will be applied to structures similar to those of the above embodiment and explanation thereof will be omitted.

Figure 25:
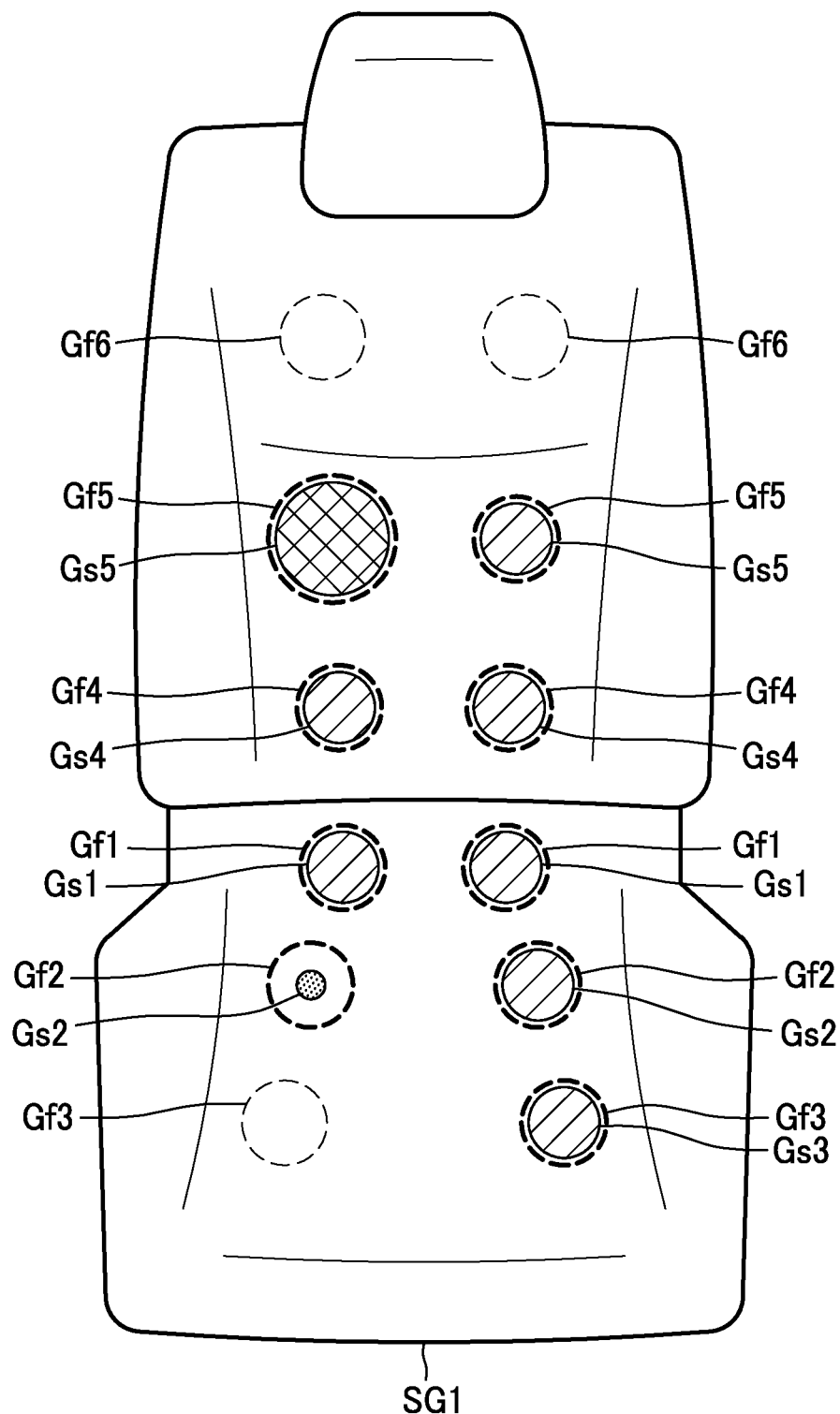
FIG. 25 is a diagram showing a modification of a first image and a second image.

Although the first images Gf1 to Gf6 and the second images Gs1 to Gs6 are displayed side by side in the above-described embodiment, the first images and the second images may be, for example, aligned in a direction other than the lateral direction. As shown in FIG. 25, the smartphone SP may display the plurality of first images Gf1 to Gf6 and the plurality of second images Gs1 to Gs6 in an overlapped manner on the screen.

To be more specific, in the configuration shown in FIG. 25, the first images Gf1 to Gf6 are displayed as circles drawn by broken lines with different colors and sizes, and the second images Gs1 to Gs6 are displayed as filled-in color circles drawn by solid lines with different colors and sizes. Specifically, the size of the first images Gf1 to Gf6 is set to be sequentially larger and the color of the first images Gf1 to Gf6 is set to sequentially stand out in the seat image SG1 accordingly as the necessary reaction becomes stronger. Similarly, the size of the second images Gs1 to Gs6 is set to be sequentially larger and the color of the second images Gs1 to Gs6 is set to sequentially stand out in the seat image SG1 accordingly as the pressure values become larger. In this configuration, the second images with a pressure value of 0 are not displayed.

According to this configuration, since the plurality of first images Gf1 to Gf6 and the plurality of second images Gs1 to Gs6 overlap each other, the occupant can easily compare the first images which are targets and the second images which change depending on the motions of the occupant.

Although the color and size are changed in order to make the images (the first images or the second images) stand out in the above-described embodiment, for example, shapes or intensities of the images may be changed to make the images stand out.

Although pressure sensors 21 to 26 have been given as examples of a sensor in the above-described embodiment, for example, the sensor may be an optical sensor, etc. In this case, the evaluation value which indicates the degree of match between the occupant's pose and the predetermined pose may be computed based on information on whether or not light is detected by the optical sensor. When the optical sensor can detect the amount of light, the evaluation value may be computed based on information on the amount of light.

Although the exercise game is given as an example of a game in the above-described embodiment, for example, the game may be a Zazen game which requires the occupant to sit in a cross-legged position as in Zen meditation on the seat S. The Zazen game, for example, may be configured as a game in which the occupant P is encouraged to keep a posture in such a manner that the pressures on the left side and the right side of the seat cushion S1 are nearly equal and the pressures on the front side and the back side of the seat cushion S1 are nearly equal. To be more specific, the Zazen game may be configured as a game in which a cursor which moves in response to a motion (fluctuations in pressure values) of the occupant P is adjusted to match a target image on the screen of the smartphone SP. In addition to such cursor and target image, first images and second images which indicate the locations of the pressure sensors may also be displayed. In the Zazen game, it is not necessary to change the predetermined pose every predetermined time period and one pose is sufficient.

Although a car seat for use in an automobile is given as an example of a seat S in the above-described embodiment, the vehicle seat may be a seat used in a different vehicle such as a ship, an aircraft, etc. The seat is not limited to a vehicle seat, for example, the seat may be a chair with a backrest (as used in a Japanese-style room).

Although a smartphone SP was given as an example of a terminal device in the above-than described embodiment, for example, the terminal device may be a mobile terminal device other the smartphone SP, such as a tablet, etc. The terminal device may also be a stationary terminal device located on the seat S which may be provided integrally with the seat. The terminal device may be a terminal device which constitutes a car navigation system.

The counts for switching the poses may not be limited to that described in the above-described embodiment, and may be set arbitrarily as appropriate. Although the counts are combined with a rhythm of music etc. in the above-described embodiment, the counts do not necessarily have to be combined with a rhythm of music etc.

Third Embodiment

Next, a third embodiment will be described with reference made to accompanying drawings when necessary.

Figure 26:
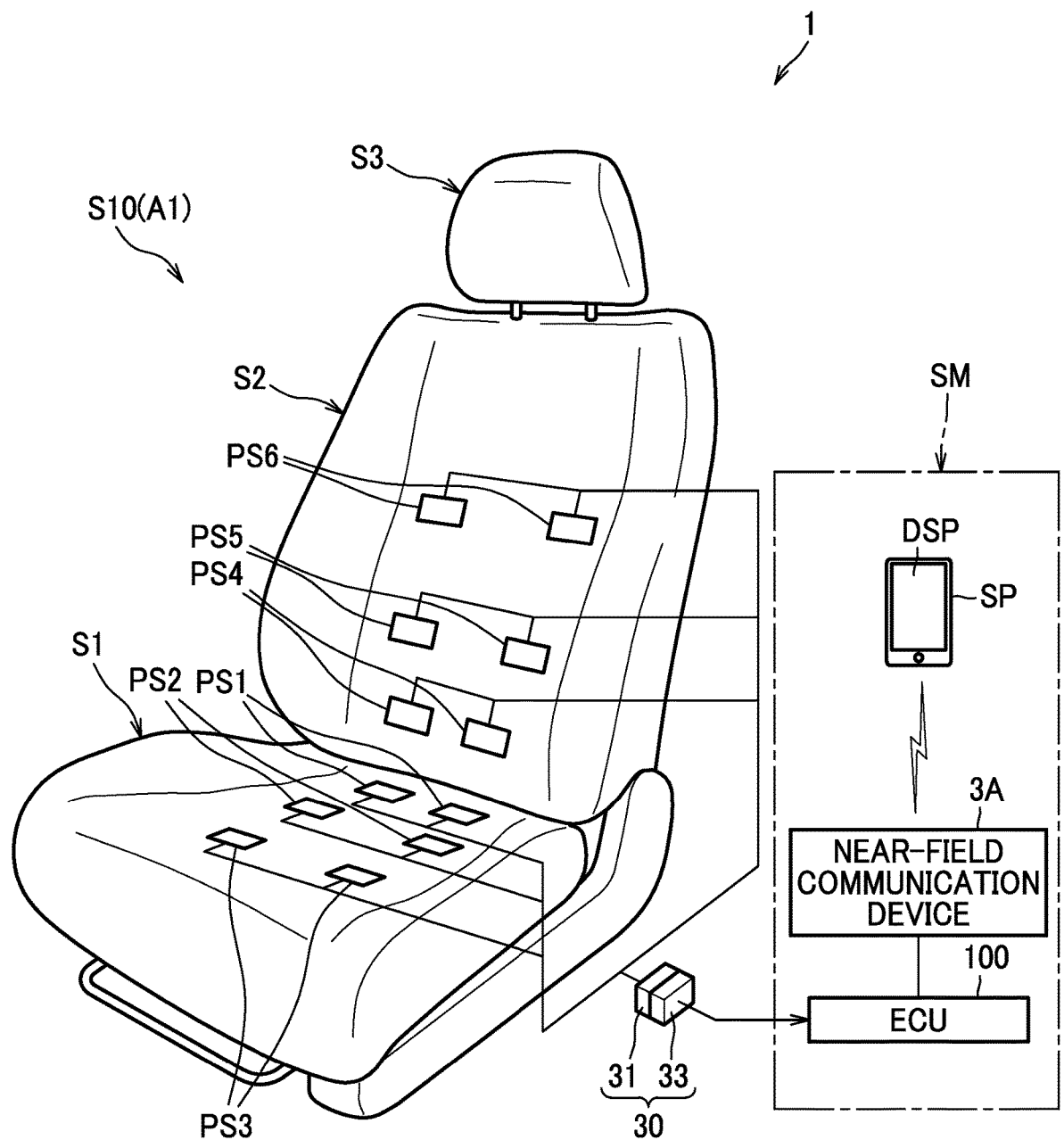
FIG. 26 is a system configuration diagram of a third embodiment in which a first seat is connected to a seat experience device.

As shown in FIG. 26, a seat system 1 of the present embodiment comprises a first seat A1 and a seat experience device SM. The first seat A1 comprises a first seat body S10 and pressure sensors PS1 to PS6. The first seat body S10, in one example, is a vehicle seat to be installed on a vehicle such as a car and includes a seat cushion S1, a seat back S2 and a headrest S3. The seat cushion S1 and the seat back S2 include a plurality of pressure sensors PS1 to PS6 under outer coverings 10. The pressure sensors PS1 to PS6 are sensors for detecting a motion of an occupant seated on the first seat body S10.

The pressure sensors PS1 to PS6 are located so as to be capable of detecting a state of a seat surface that faces the occupant seated on the first seat body S10, and acquire values of pressure from the occupant seated on the seat body S10. An ECU 100 (electronic control unit) which is a device for controlling operations of the first seat body S10 (for example, a motor of a motor-driven reclining mechanism, heater, etc. not shown) is connected to each of the pressure sensors PS1 to PS6 and is capable of acquiring measurement values from each of the pressure sensors PS1 to PS6.

The respective pressure sensors PS1 to PS6 are provided in pairs, each located left and right, symmetric with respect to a laterally central position of the first seat body S10.

To be more specific, the pressure sensors PS1 to PS3 are provided at the seat cushion S1.

The pressure sensors PS1 are provided in positions corresponding to the lowermost portions of the ischial bones of the occupant. This is the position where the weight of the occupant is most largely applied.

The pressure sensors PS2 are located a little frontward of the pressure sensors PS1.

The pressure sensors PS1 and the pressure sensors PS2 are both for measuring pressure from the buttocks of the occupant and only either pair may be provided.

The pressure sensors PS3 are located frontward and largely apart from the pressure sensors PS1 and the pressure sensors PS2. The pressure sensors PS3 are located under the thighs of the occupant and are capable of measuring values of pressure from the thighs of the occupant.

The pressure sensors PS4 to PS6 are provided at the seat back S2. The pressure sensors PS4 are provided in positions corresponding to the back of the lumbar region of the occupant.

The pressure sensors PS5 are located a little above the pressure sensors PS4.

The pressure sensors PS4 and the pressure sensors PS5 are both for measuring pressure from the lumbar region of the occupant and only either pair may be provided.

The pressure sensors PS6 are located above and largely apart from the pressure sensors PS4 and the pressure sensors PS5. The pressure sensors PS6 are provided in positions corresponding to the upper part of the back of the occupant and are capable of measuring values of pressure from the upper part of the back of the occupant.

In this embodiment, the seat system 1 provides a 100-meter dash game using the pressure sensors PS3. In this embodiment, the pressure sensors PS3 are one example of a first sensor for acquiring first measurement values for detecting a motion of the occupant seated on the first seat body S10. The 100-meter dash game is a game in which the occupant seated on the first seat body S10 causes the pressure sensors PS3 to detect pressure by alternately moving his/her legs up and down which causes a character displayed on a display DSP of a smartphone SP to run in accordance with the number of times (steps) the occupant raised his/her legs and which causes characters to compete in the 100-meter race with the smartphone SP or a character operated by another occupant (player).

The seat experience device SM comprises the ECU 100 and the smartphone SP.

The ECU 100 is connected to a near-field communication device 3A which enables near-field wireless communication, such as Bluetooth (registered trademark), Wi-Fi (registered trademark), etc. The ECU 100 is connected to the pressure sensors PS1 to PS6 via a connector 30. The connector 30 includes a first connector 31 with a plurality of terminals, which is connected to the pressure sensors PS1 to PS6 and a third connector 33 connected to the seat experience device SM.

The configurations of the smartphone SP and the ECU 100 will be described later.

Figure 27:
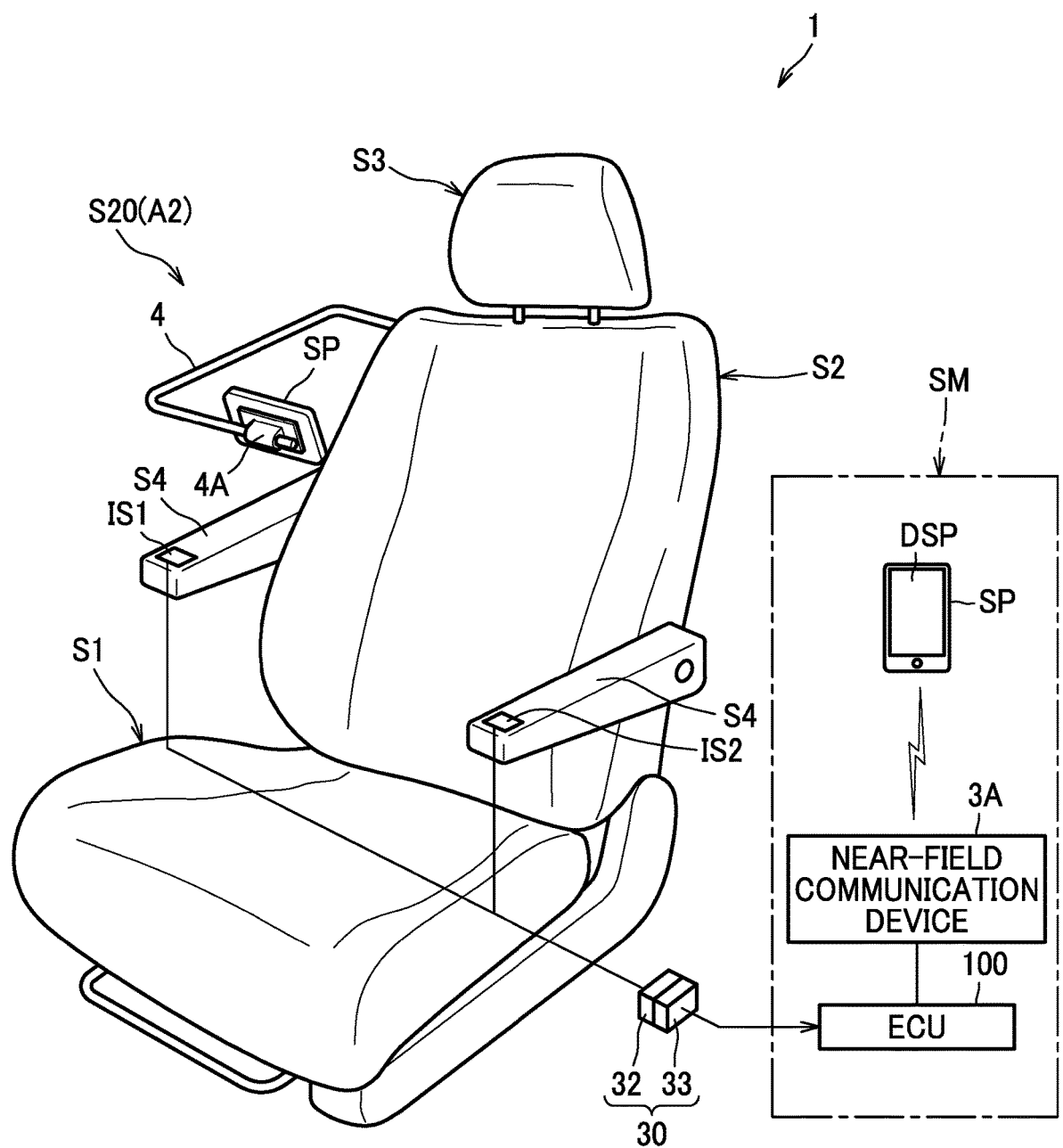
FIG. 27 is a system configuration diagram of the third embodiment in which a second seat is connected to the seat experience device.

As shown in FIG. 27, the seat system 1 may be configured by connecting a second seat A2 to the seat experience device SM. The second seat A2 is a seat different from the first seat A1, and is a seat, for example, which allows a disabled person who cannot move his/her legs to use the seat experience device SM in a manner similar to an able-bodied person.

The second seat A2 comprises a second seat body S20 and infrared sensors IS1, IS2 as one example of a second sensor.

The second seat body S20 includes, in addition to a seat cushion S1, a seat back S2 and a headrest S3 similar to those of the first seat body S10, left and right arm rests S4 rotatably provided on the seat back S2.

The infrared sensors IS1, IS2 are sensors for acquiring second measurement values for detecting the motion of the occupant seated on the second seat body S20 and are sensors of a type different from the type of the pressure sensors PS3. The infrared sensors IS1, IS2 are provided at the second seat body 20. Specifically, the infrared sensors IS1, IS2 are respectively located on the upper surfaces of the front end portions of the left and right armrests S4. The infrared sensors IS1, IS2 are sensors which sense infrared radiation; when a human hand is held over the infrared sensors IS1, IS2, the hand is sensed and an output voltage changes. In the present embodiment, signals of the second measurement values of the infrared sensors IS1, IS2 have smaller amplitudes compared with the amplitudes of the signals of the first measurement values of the pressure sensors PS3.

The infrared sensors IS1, IS2 are connected to the ECU 100 of the seat experience device SM via the connector 30. The connector 30 comprises a second connector 32 connected to the infrared sensors IS1, IS2 and the third connector 33 connected to the ECU 100. The third connector 33 shown in FIG. 27 is the same as the third connector 33 shown in FIG. 26. That is, the third connector 33 is connectable to both the first sensor and the second sensor. The seat experience device SM shown in FIG. 27 and the seat experience device SM shown in FIG. 26 are also the same. That is, the seat experience device SM is capable of acquiring the first measurement values from the pressure sensors PS3 and the second measurement values from the infrared sensors IS1, IS2.

A holder 4 for holding the smartphone SP is provided on the second seat body S20. The holder 4 is formed by bending a wire, with one end fixed to the seat back S2 and the other end having a holding portion 4A for holding the smartphone SP. By fixing the smartphone SP on the holding portion 4A, the occupant can view the display DSP of the smartphone SP without holding the smartphone SP in his/her hand. Accordingly, the occupant can view the display DSP while operating the app of the smartphone SP by holding his/her hand over the infrared sensors IS1, IS2.

Figure 28:
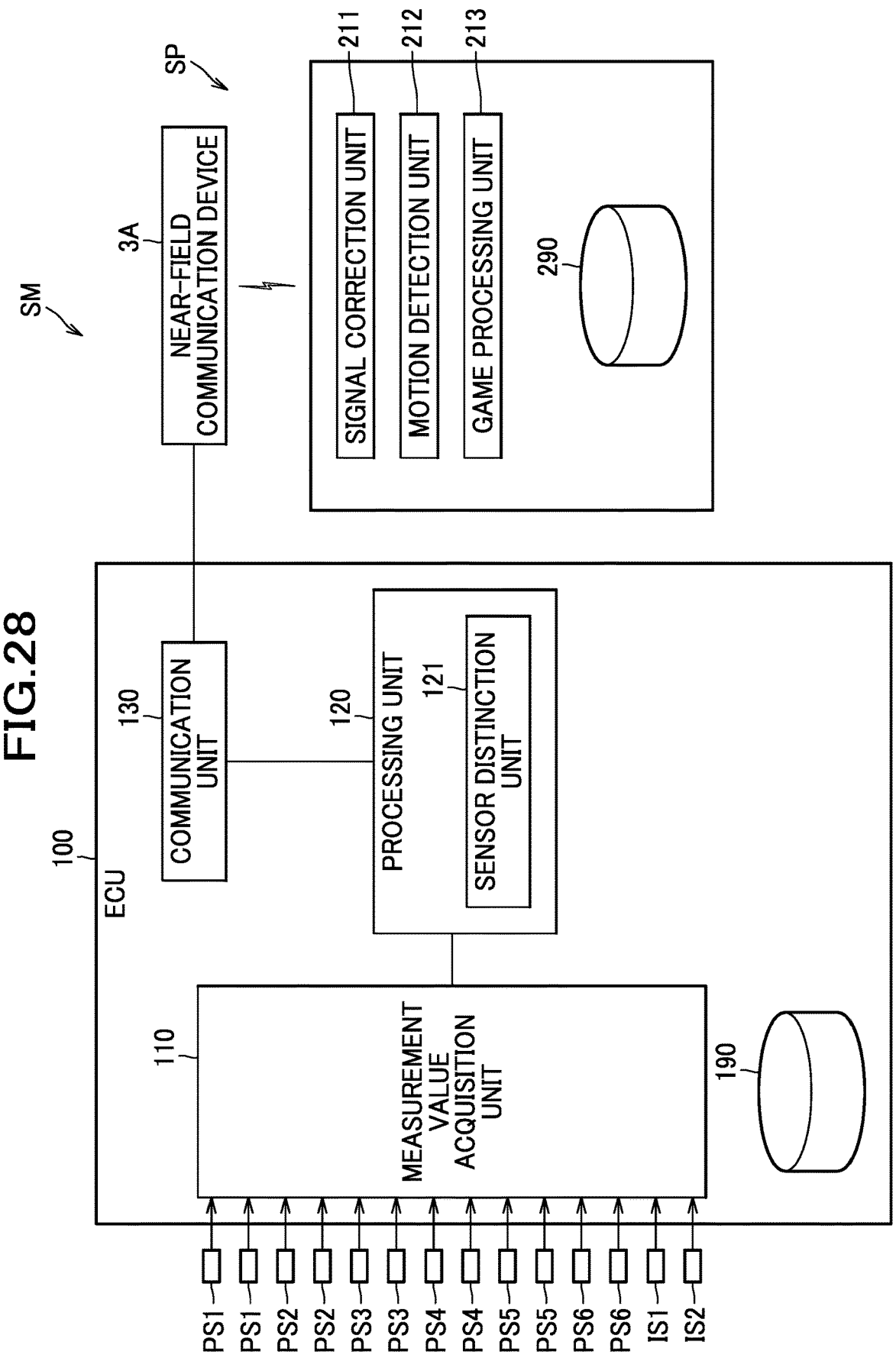
FIG. 28 is a block diagram for explaining the structure of a seat system of the third embodiment.

As shown in FIG. 28, the ECU 100 comprises a measurement value acquisition unit 110, a processing unit 120, a communication unit 130, and a storage unit 190. The ECU 100 and the smartphone SP each include a CPU, a ROM, a RAM, a rewritable nonvolatile memory, etc. (not shown); each functional unit is implemented through execution of pre-stored programs.

The measurement value acquisition unit 110 has a function of acquiring measurement values of pressure per regular control cycle from the respective pressure sensors PS1 to PS6 and the infrared sensors IS1, IS2. The measurement values acquired by the measurement value acquisition unit 110 are stored in the storage unit 190 and used in the processing unit 120. The storage unit 190 is used to store data required for computation, processing, etc., as appropriate.

The processing unit 120 has a function of identifying the type of sensor connected to the ECU 100, communicating with the smartphone SP, and transmitting measurement values and the type of sensor to the smartphone SP. Accordingly, the processing unit 120 includes a sensor distinction unit 121 for identifying whether the sensors connected to the ECU 100 to enable the ECU 100 to acquire measurement values are the pressure sensors PS3 or the infrared sensors IS1, IS2.

Here, the sensor distinction unit 121 will be described while describing the structure of the connector.

Figure 31:
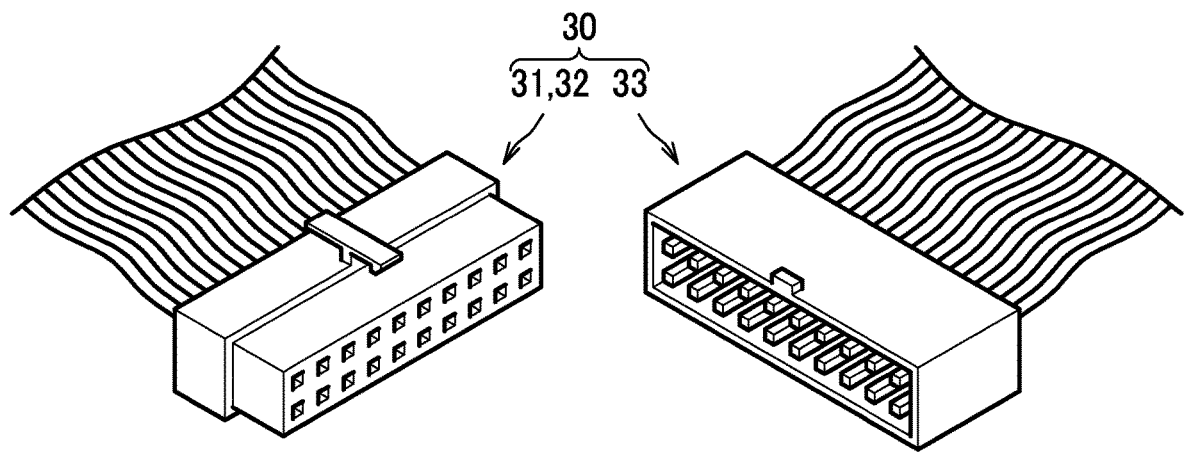
FIG. 31 are (a) a perspective view of an example of a first connector and a second connector, and (b) a table showing the relation between terminal numbers and functions.

As shown in FIG. 31(a), the first connector 31 and the second connector 32 each include a plurality of terminals and, for example, is a female connector including 20 pins; the third connector 33 includes a plurality of terminals which can be connected to both the first connector 31 and the second connector 32 and, for example, is a male connector including 20 pins. The first connector 31 and the second connector 32 each have holes for receiving 20 pins, but the respective holes do not all necessarily have an effective terminal inside, but includes unused holes. As will be described later, the combination of connections between the plurality of terminals of the second connector 32 are different from the combination of connections between the plurality of terminals of the first connector 31.

As shown in FIG. 31(b), a function corresponding to a pin number (No.) is assigned to each of the plurality of terminals, for example, No. 1 to 12 are terminals for signals. The output values of the sensors are assigned respectively to No. 1 to 12. For example, the pressure sensors PS1 to PS6 are respectively assigned to No. 1 to 12 and the infrared sensors IS1, IS2 are respectively assigned to No. 1 and 2.

No. 13 is a common terminal, for example, a 5V terminal. The No. 13 terminal of the third connector 33 is a common output terminal set at a predetermined voltage. On the other hand, No. 13 of the first connector 31 and the second connector is a common input terminal which contacts the common output terminal.

No. 14 to 20 are identification terminals for identifying the type of connected sensors. No. 14 to 20 of the third connector 33 is at least one identification signal input terminal for detecting an identification voltage. On the other hand, at least one of the first connector 31 and the second connector 32 has at least one identification terminal at No. 14 to 20 for connecting to the identification signal input terminal and which is electrically connected to the common input terminal. One of the first connector 31 and the second connector 32 does not have to have an effective identification terminal (a terminal for connecting to the identification signal input terminal) at No. 14 to 20.

The arrangement of the identification terminals in the portions of the first connector 31 and the second connector 32 which correspond to the identification signal input terminal of the third connector 33, i.e., which correspond to No. 14 to 20 are different from each other.

For example, the No. 14 portion of the first connector 31 does not include an identification terminal connected to the common input terminal (No. 13) and the No. 14 of the second connector 32 includes an identification terminal connected to the common input terminal (No. 13). Accordingly, as shown in FIG. 32(a), a LOW signal is obtained at the ECU 100 when the first connector 31 is connected to the third connector 33, and the sensor distinction unit 121 can identify the contents assigned to LOW of No. 14, for example, that it is a sensor of company A at the ECU 100. On the other hand, when the second connector 32 is connected to the third connector 33, a HIGH signal is obtained at the ECU 100 and the sensor distinction unit 121 can identify the contents assigned to HIGH of No. 14, for example, that it is a sensor of company B at the ECU 100.

Similarly, the sensor distinction unit 121 can identify the type of sensor from the combination of whether or not an identification terminal is provided in each of the portions No. 15 to 17 of a connector (for example, the first connector and the second connector) to be connected to the third connector 33. For example, as shown in FIG. 32(b), if no identification terminal is provided at any of the portions No. 15 to 17, No. 15 to 17 will all be LOW making it possible to identify that a pressure sensor is connected, and if only No. 17 is provided with an identification terminal, only No. 17 becomes HIGH making it possible to identify that an infrared sensor is connected. Regarding connectors with other sensors connected thereto, it will be possible to identify many types of sensors by providing identification terminals in a combination which is different from that of the pressure sensors and the infrared sensors, such as, if only No. 16 is provided with an identification terminal, it is possible to identify that a heartbeat sensor has been connected. The types of sensors may also be set at No. 18 to 20 corresponding to the combination of HIGH and LOW signals.

When power of the ECU 100 is turned on and another connector is connected to the third connector 33, the sensor distinction unit 121 identifies the type of sensor corresponding to the connected connector and transmits an ID (identification information) of the ECU 100 and the identified type of sensor to the smartphone SP.

Referring back to FIG. 28, the smartphone SP includes a signal correction unit 211, a motion detection unit 212, a game processing unit 213 and a storage unit 290.

The signal correction unit 211 has a function of correcting a magnitude of an input signal acquired from the infrared sensors IS1, IS2 when the sensor identified by the sensor distinction unit 121 is an infrared sensor IS1, IS2, in such a manner that an amplitude of the input single approximates an amplitude of a signal acquired from the pressure sensors PS3.

To be more specific, the signal correction unit 211 generates a corrected input signal by multiplying an input signal (value) which is input as a digital value by a correction coefficient. Accordingly, in the storage unit 290, correction coefficients by which the signals (signal values) acquired from the sensors are to be multiplied are stored in a table associated with the type of sensor. For example, in the storage unit 190, 1 is stored for the pressure sensors PS3, 2 is stored for the infrared sensors IS1, IS2, etc.

The signal correction unit 211 acquires the correction coefficient corresponding to the sensor based on the type of sensor received from the ECU 100 referring to the storage unit 290. The signal correction unit 211 multiplies the input signal by the correction coefficient and generates the corrected input signal.

For example, since the correction coefficient for the pressure sensors PS3 is 1, signals such as input signals $SI_R$, $SI_L$ shown in FIG. 29(a) serve directly as corrected input signals. Since the correction coefficient for the infrared sensors IS1, IS2 is 2, when an input signal as shown in FIG. 30(a) is input, the values are doubled and corrected input signals as shown in FIG. 30(b) are provided. In this way, even when the amplitude of input signals from the infrared sensors IS1, IS2 are small, they can be corrected to signals having an amplitude equivalent to those of the corrected input signals of the pressure sensors PS3, and the same threshold SIth may be used to detect motion.

The motion detection unit 212 detects the motion of the occupant based on acquired input signals. In this embodiment, the motion of the occupant is detected based on corrected input signals corrected by multiplying the input signal by the correction coefficient. To be more specific, the motion detection unit 212 compares the corrected input signals with the threshold SIth and generates a detection signal when the corrected input signal is lower than the threshold SIth (when the corrected input signal changes from a base signal value and crosses the threshold SIth). The motion detection unit 212 can thereby generate a detection signal such as shown in FIG. 29(b) based on the measurement values of the pressure sensors PS3. The motion detection unit 212 can also generate detection signals as shown in FIG. 30(c) based on the correction input signals (FIG. 30(b)) of the infrared sensors IS1, IS2. The motion detection unit 212 can detect the motion of the occupant by either the first detection values or the second detection values.

The game processing unit 213 has a function of processing a game which uses the detection signals. In the present embodiment, the game provided on the smartphone is a 100-meter dash game in which the number of steps is incremented by one each time a detection signal is generated and the character is moved on the display DSP of the smartphone SP in such a manner that the character runs 1 meter each time the number of steps is incremented by 1. That is, the seat experience device SM is configured to be capable of performing a predetermined operation, i.e., making the character in the game to take one step forward (run) in response to the detection of the motion of the occupant in the motion detection unit 212.

A simple description of an example of the 100-meter dash game is provided; the game processing unit 213 displays a start screen that displays a game start button on the display DSP to allow the occupant to instruct the start of the game. When the occupant selects the game start button, the game processing unit 213 displays on the display DSP instructions for moving the character, based on the type of sensor received from the ECU 100. For example, when the sensors are the pressure sensors PS3, an instruction such as "Alternately move your right leg and left leg up and down. If you move your legs fast alternately, the character runs fast." is displayed. When the sensors are the infrared sensors IS1, IS2, an instruction such as "Wave your hands to the right and left over the optical sensor. If you wave your hands fast, the character runs fast." is displayed. That is, the smartphone SP (seat experience device SM) is configured to prompt the occupant to make a motion. These instructions may be output by voice.

The game processing unit 213 is configured to execute processes to move the character in response to the detected signals until the player of the game finishes running 100 meters, and to display, on the display DSP after finishing running 100 meters, the time it took from start to finish as the result of the game.

Next, one example of a process of the seat experience device SM will be described with reference to FIG. 33 and FIG. 34.

Figures 32, 33:
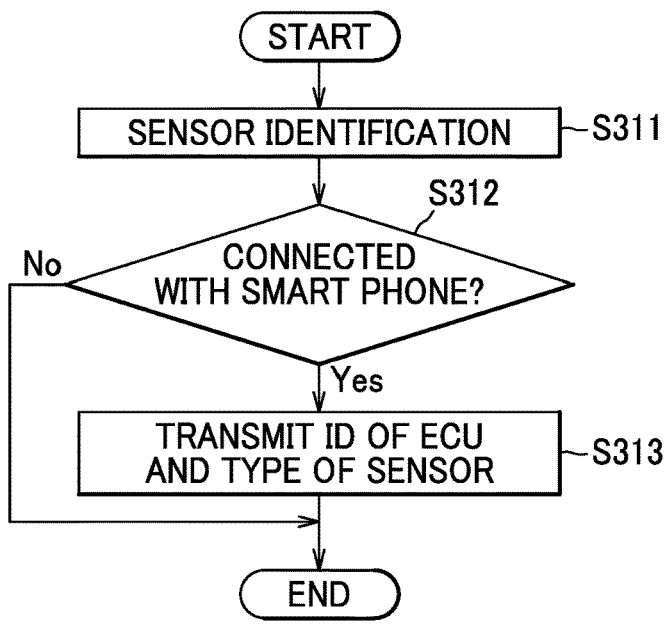
FIG. 32 are a (a) table showing the contents of terminal No. 14, and (b) a table showing the contents corresponding to a combination of terminals No. 15 to 17.
FIG. 33 is a flowchart showing an example of a process executed in an ECU.

As shown in FIG. 33, when the power is on, the ECU 100 identifies the sensor connected to the third connector 33 based on signals input from the identification signal input terminal by referring to the above-described table (S311). The ECU 100 determines whether or not connection with the smartphone SP is established (S312), and if connection is established (S312, Yes), the ECU 100 transmits an ID of the ECU and the type of the identified sensor to the smartphone SP and ends the process (S313). On the other hand, if it is determined that connection with the smartphone SP is not established (S312, No), the process is ended without proceeding further.

Figure 34:
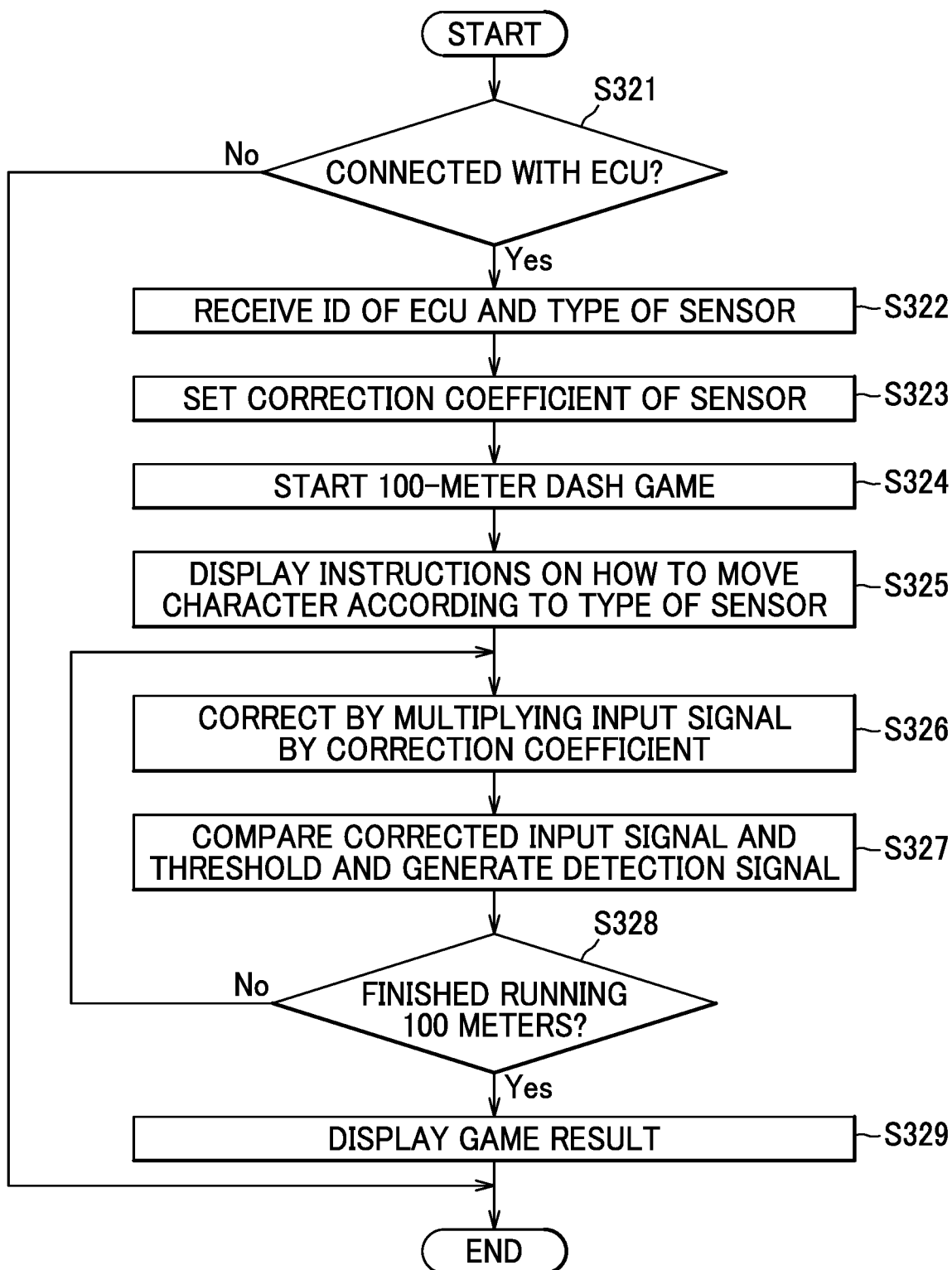
FIG. 34 is a flowchart showing an example of a process executed in a smartphone.

As shown in FIG. 34, the app of the smartphone SP determines whether or not connection with the ECU 100 is established (S321), and if it is determined that connection is not established (S321, No), then the process is brought to an and. On the other hand, if it is determined that connection with the ECU 100 is established (S321, Yes), the ID of the ECU 100 and the type of sensor is received from the ECU 100 (S322). Then, the storage unit 290 is referred to and the correction coefficient is set based on the type of sensor (S323).

The 100-meter dash game starts when the game processing unit 213 prompts the occupant to start the game and the occupant selects the game start button (S324). The game processing unit 213 displays on the display DSP instructions to move the character depending on the type of sensor (S325).

After the race of the 100-meter dash game starts, the signal correction unit 211 corrects the input signal received from the ECU 100 by multiplying the input signal by the set correction coefficient (S326). The motion detection unit 212 compares the corrected input signal with the threshold S1th, and generates a detection signal if the corrected input signal is lower than the threshold S1th (S327). The game processing unit 213 renews the image on the display DSP each time the detection signal is generated, to cause the character to take one step (1 meter) forward.

The process of steps S326, S327 are repeated until the character finishes running 100 meters (S328, No), and after the character finishes running 100 meters, i.e., when the number of generated detection signals reaches 100 (S328, Yes), the time it took to run 100 meters, i.e., the time it took the number of detection signals to reach 100 from the start is displayed on the display DSP as the game result (S329) and the process is ended.

As has been described above, with the seat system 1 according to the present embodiment, the following advantageous effects can be achieved.

The occupant seated on the first seat body S10 can cause the pressure sensors PS3 to detect the motion of his/her legs moving up and down, and thereby cause the seat experience device SM to perform a specific operation, i.e., cause the character to run in the 100-meter dash game. On the other hand, the occupant seated on the second seat body S20 can cause the infrared sensors IS1, IS2 to detect the motion of waving his/her hand left and right, and thereby cause the seat experience device SM to perform a specific operation, i.e., cause the character to run in the 100-meter dash game. Accordingly, a person who can only make a motion which can be detected by only one of the pressure sensors PS3 and the infrared sensors IS1, IS2 can perform activities using the seat. Therefore, many kinds of people can use the seat to perform activities. For example, even if some people cannot make the same motions as others can make, they may participate in the same community and enjoy an experience through use of the seat.

Since the seat experience device SM prompts the occupant to make a motion, it is possible to prompt the occupant to make a motion and use the seat system effectively.

Since the signal correction unit 211 corrects the magnitude of the input signals from the infrared sensors IS1, IS2 so that they approximate the input signals from the pressure sensors PS3, it is possible to cause the seat experience device SM to operate, when the infrared sensors IS1, IS2 are used, in a manner similar to the manner the seat experience device SM operates when the pressure sensors PS3 are used.

Since the seat system 1 can identify which one of the first connector 31 and the second connector 32 is connected to the third connector 33 by the signal input from the identification signal input terminal of the third connector 33, the type of sensor can be identified even if an IC chip, etc. having a storage medium is not provided. That is, it is possible to identify the type of sensor using a simple structure.

Fourth Embodiment

Next, a fourth embodiment will be described. In the fourth embodiment, only the parts different from those of the third embodiment will be described, and the parts similar to those of the third embodiment will be given the same reference characters in the drawings, and explanation thereof will be omitted.

Figure 35:
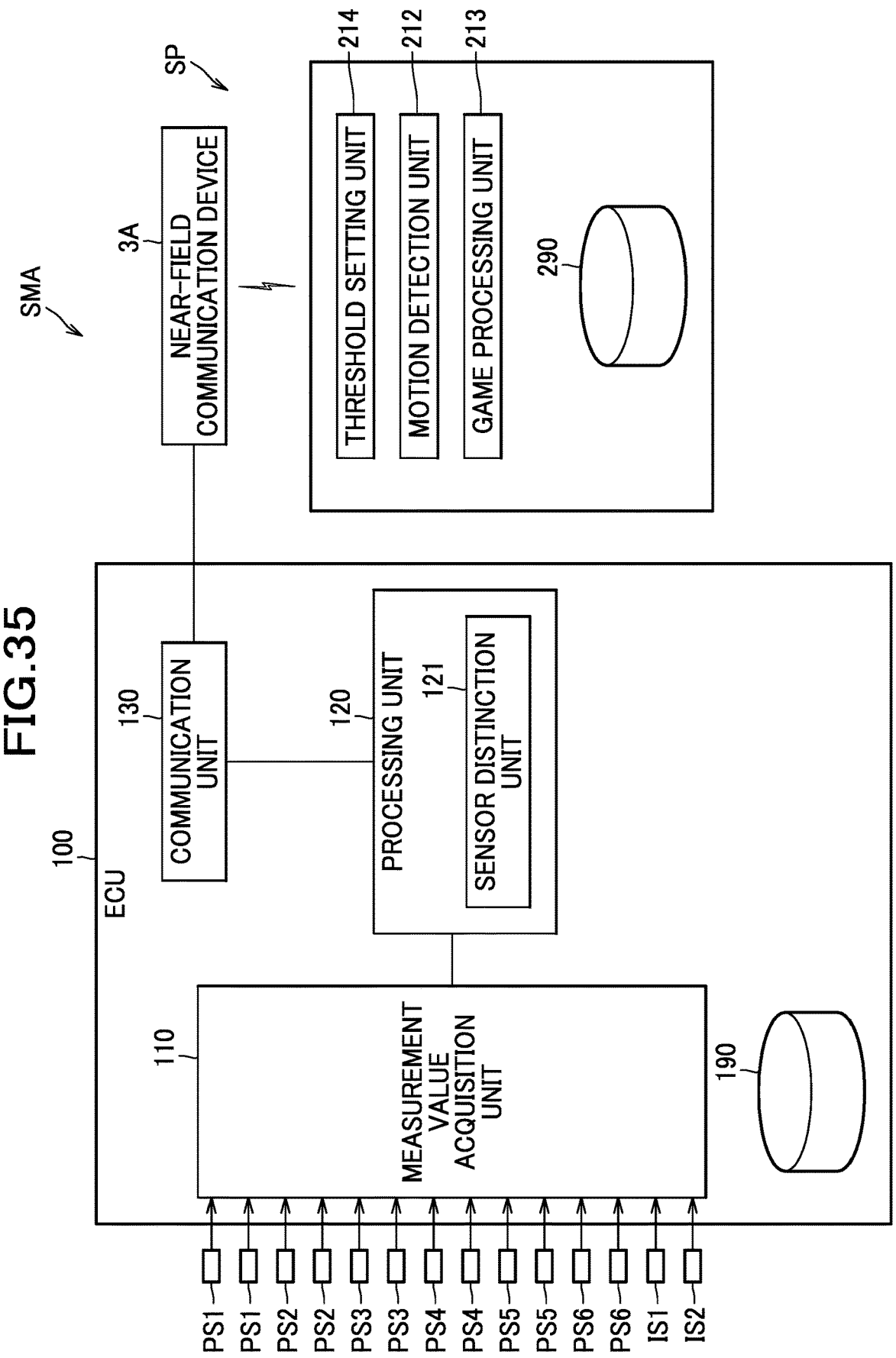
FIG. 35 is a block diagram of a seat system of a fourth embodiment.

As shown in FIG. 35, in a seat system of the fourth embodiment, a smartphone SP of a seat experience device SMA includes a threshold setting unit 214 in place of the signal correction unit 211.

The threshold setting unit 214 sets a first threshold as a threshold S1th when the sensors identified in a sensor distinction unit 121 are pressure sensors PS3 (first sensor), and sets a second threshold different from the first threshold as the threshold S1th when the sensors identified in the sensor distinction unit 121 are infrared sensors IS1, IS2 (second sensor). The second threshold is pre-stored in a storage unit 290 in the smartphone SP according to the type of sensor and is set so as to be included within amplitudes of input signals from the infrared sensors IS1, IS2. It is also possible to compute an average of high signal values and low signal values of previous input signals within a predetermined time period and set the second threshold by computation such that the second threshold is included between the high signal value and the low signal value.

A motion detection unit 212 can detect a motion of an occupant by comparing an input signal with the threshold set by the threshold setting unit 214, in a manner similar to the third embodiment.

Figure 36:
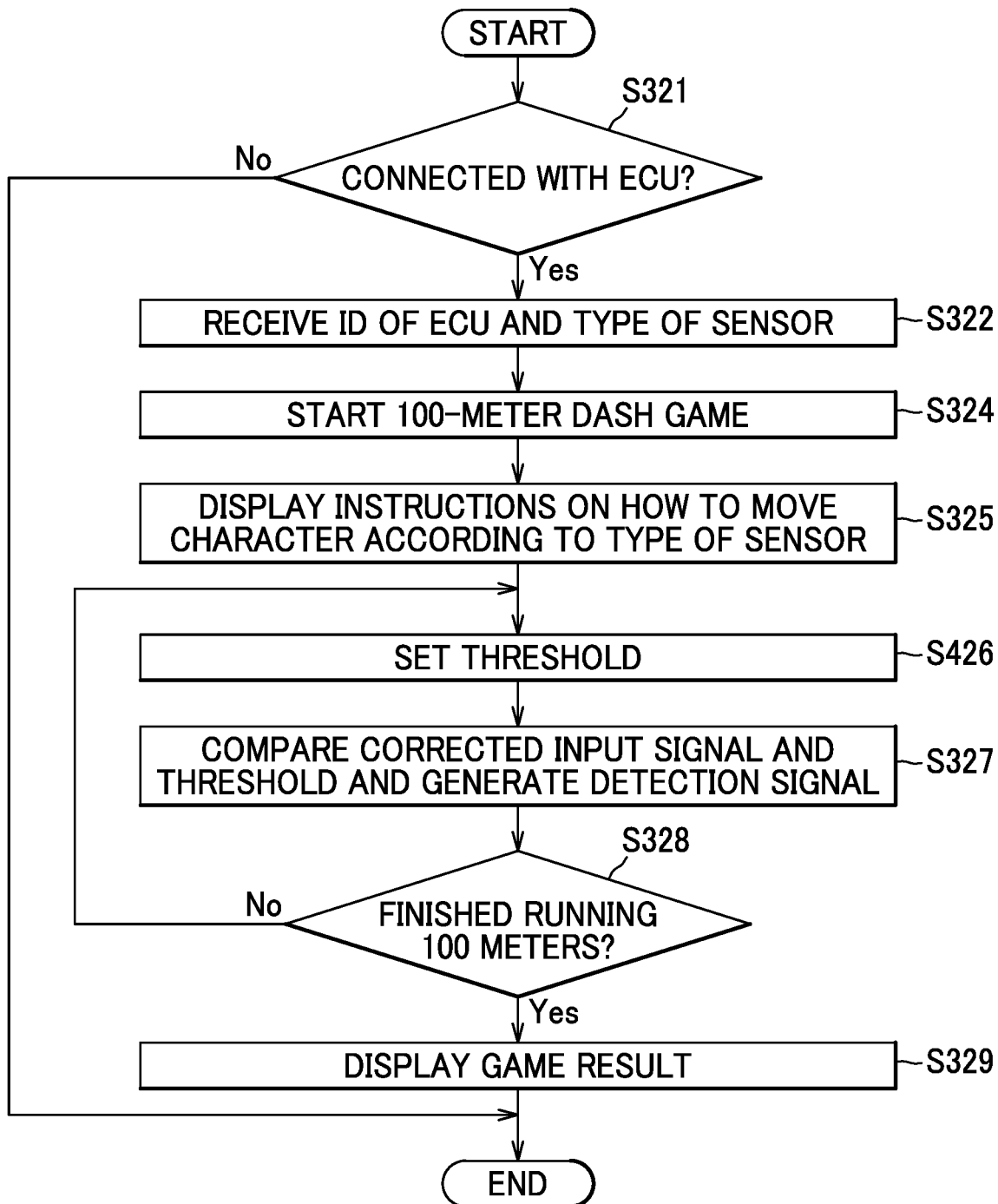
FIG. 36 is a flowchart which shows an example of a process executed in a smartphone of the fourth embodiment.
Figure 38:
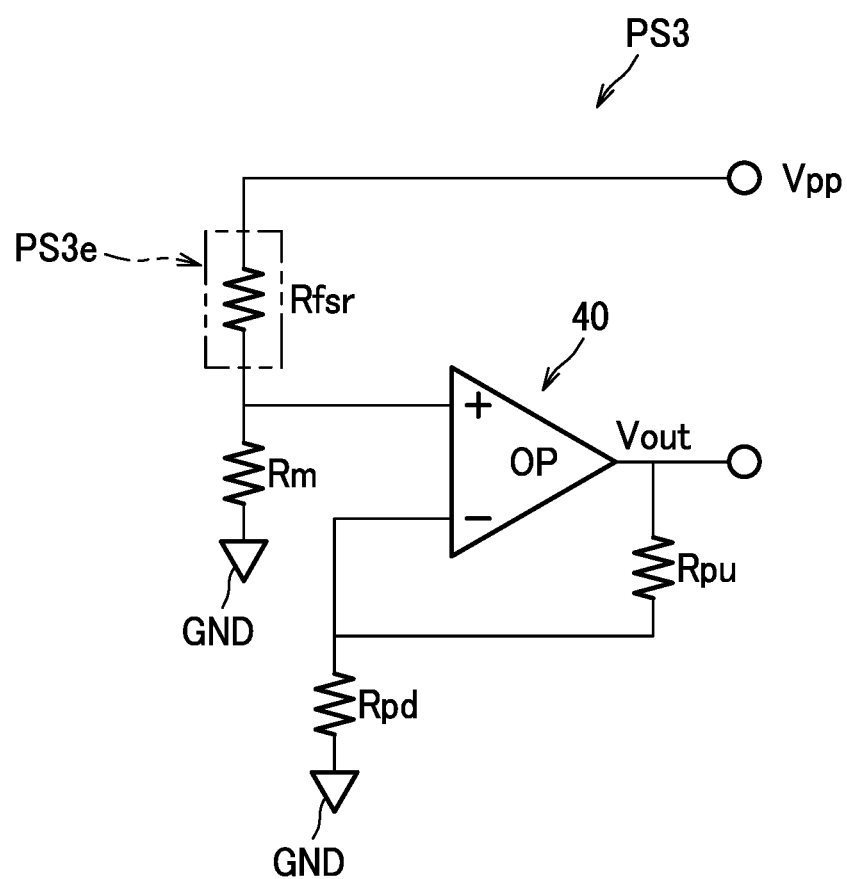
FIG. 38 is a schematic circuit diagram showing an example of a second sensor of a fifth embodiment.

In the fourth embodiment, as shown in FIG. 36, the smartphone SP may not execute step S323 to set a correction coefficient (FIG. 34), but may preferably execute the process of setting the threshold (S426) in place of step S326 (FIG. 34) which corrects an input signal by multiplying the input signal by a correction coefficient.

According to the fourth embodiment described above, when input signals $SI_R$, $SI_L$ as shown in FIG. 37(a) are input, the threshold is set within a range of the input signals $SI_R$, $SI_L$. When the input signals $SI_R$, $SI_L$ change from a base signal value and cross the threshold SIth, detection signals as shown in FIG. 37(b) can be generated.

As described above, according to the fourth embodiment, by adjusting the threshold in accordance with the characteristics of the second sensor, it is possible to make the seat experience device SM operate, when the second sensor is used, in a manner similar to the manner the seat experience device SM operates when first sensor is used. That is, the seat experience device SMA can be operated similarly using a plurality of different types of sensors provided at a first seat body S10.

Fifth Embodiment

Next, a fifth embodiment will be described. In the fifth embodiment, only the parts different from those of the third embodiment will be described, and the parts similar to those of the third embodiment will be given the same reference characters in the drawings and explanation thereof will be omitted.

In the fifth embodiment, the infrared sensors IS1, IS2 and the pressure sensors PS3 explained in the third embodiment are respectively a first sensor and a second sensor. If an amplifier circuit 40 described later is not included, outputs and amplitudes of the pressure sensors PS3 are smaller than those of the infrared sensors IS1, IS2. In the fifth embodiment, a seat provided with the pressure sensors PS3 is a second seat and a seat provided with the infrared sensors IS1, IS2 is a first seat.

Based on the above, the pressure sensors PS3 each include a sensor element PS3e for detecting pressure and the amplifier circuit 40. The amplifier circuit 40 is a circuit which amplifies a signal from the sensor element PS3e in such a manner that amplitudes of second measurement values from each of the pressure sensors PS3 approximate first measurement values of the infrared sensors IS1, IS2.

The amplifier circuit 40 includes a first resistor Rm, an operational amplifier OP, a first resistor Rm, a second resistor Rpu, and a third resistor Rpd. A sensor side resistor Rfsr which is the sensor element PS3e is a resistor in which a resistance value changes in response to changes in pressure as physical quantities to be measured.

The first resistor Rm is connected to the sensor side resistor Rfsr in series between a power supply Vpp and the ground GND. To be more specific, an end of the first resistor Rm opposite to the sensor side resistor Rfsr is connected to the ground GND and an end of the sensor side resistor Rfsr opposite to the first resistor Rm is connected to the power supply Vpp.

The operational amplifier OP is an amplifier including a noninverting input terminal (+) and an inverting input terminal (−), and one output terminal. The noninverting input terminal (+) is connected to wiring between the sensor side resistor Rfsr and the first resistor Rm. The output voltage Vout from the output terminal is fed back to the inverting input terminal (−) via a negative feedback circuit. The second resistor Rpu is located in the negative feedback circuit. The third resistor Rpd is located between the negative feedback circuit and the ground GND.

In this amplifier circuit 40, it is possible to change an amplification rate by changing the resistance values of the first resistor Rm, the second resistor Rpu, and the third resistor Rpd.

On the other hand, although not shown, a smartphone SP of a seat experience device SM does not include the signal correction unit 211 of the third embodiment and the threshold setting portion 214 of the fourth embodiment.

According to such seat system, since the pressure sensors PS3 as an example of a second sensor at the second seat include the amplifier circuit 40, the second measurement values of the pressure sensors PS3 are amplified in such a manner that the amplitudes thereof approximate first output values of the infrared sensors IS1, IS2. Accordingly, it is possible to operate the seat experience device by the second seat using the pressure sensors PS3 in a manner similar to that of the first seat using the infrared sensors IS1, IS2 without correction of signals or setting of thresholds for each type of sensor by the seat experience device. That is, it will become unnecessary to adjust the input signals from the sensor in the seat experience device.

Sixth Embodiment

Next, a sixth embodiment will be described. In the sixth embodiment, only the parts different from those of the third embodiment will be described, and the parts similar to those of the third embodiment will be given the same reference characters in the drawings and explanation thereof will be omitted.

Figure 39:
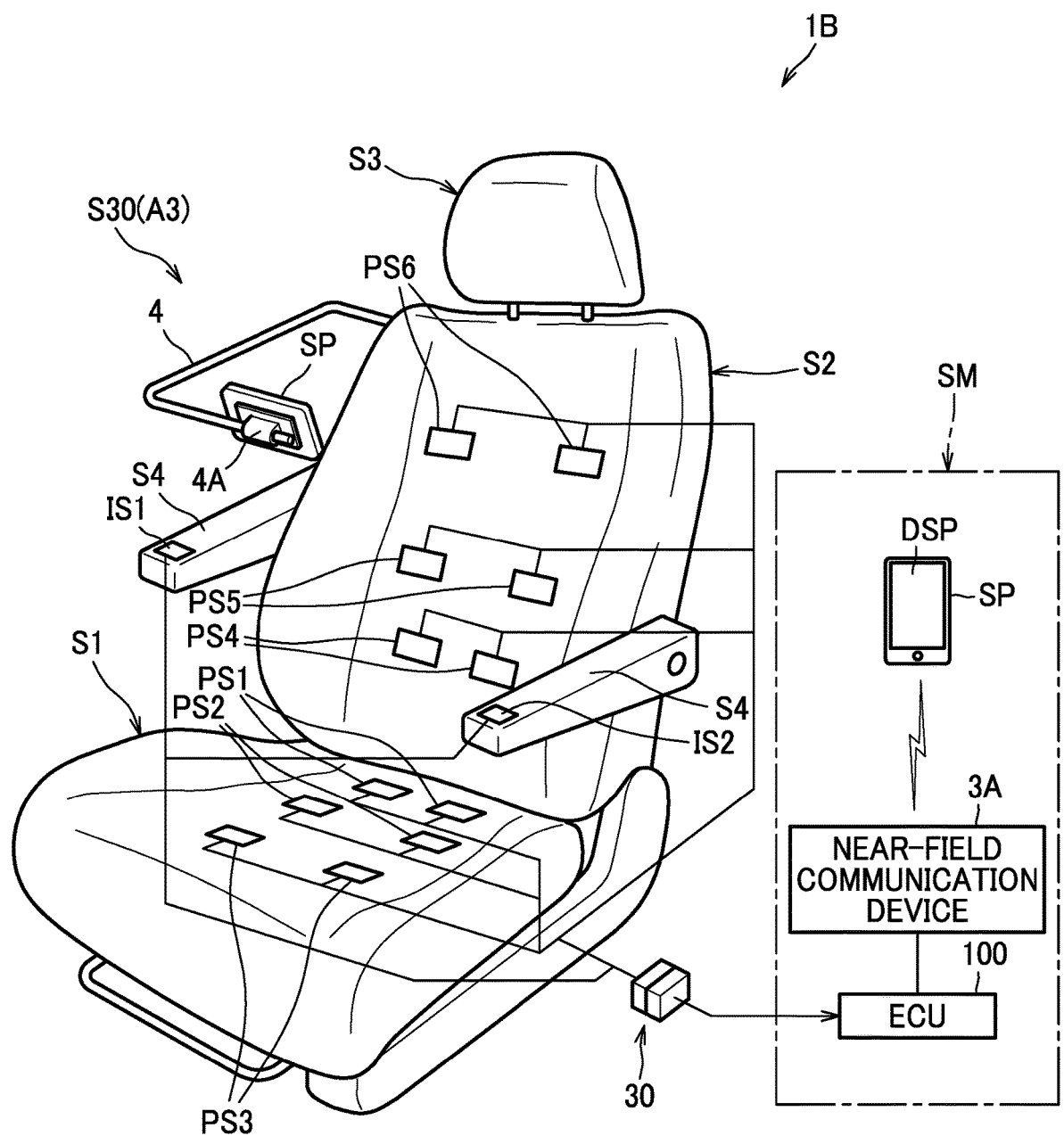
FIG. 39 is a system configuration diagram showing a seat system of a sixth embodiment.

As shown in FIG. 39, in the seat system 1B of the sixth embodiment, the seat A3 includes both of pressure sensors PS1 to PS6 including pressure sensors PS3 as an example of a first sensor, and infrared sensors IS1, IS2 as an example of a second sensor. That is, the first sensor and the second sensor are both provided at the seat body S30. Each of the sensors PS1 to PS6, IS1, IS2 is connected to the seat experience device SM via a connector 30.

Each sensor PS1 to PS6, IS1, IS2 includes a memory which stores identification information (ID) of the sensor and the type of sensor such as an infrared sensor or a pressure sensor so that the ECU 100 can determine the type of sensor connected to each wiring by referring to the memory of each sensor PS1 to PS6, IS1, IS2 via the wiring connected to each sensor PS1 to PS6, IS1, IS2. Therefore, it is not necessary for the connector 30 to include terminals for identification such as in the third embodiment.

A smartphone SP is configured similar to the third embodiment to store correction coefficients corresponding to the types of the sensors in a storage unit 290 and set a correction coefficient depending on the type of sensor acquired from the memory.

According to such configuration, an occupant seated on a first seat A1 can use the seat experience device SM in the same way using either the pressure sensors PS3 or the infrared sensor IS1, IS2. Accordingly, a person who can only make motions which can only be detected by one of the pressure sensors PS3 (first sensor) and the infrared sensors IS1, IS2 (second sensor) can perform activities using the seat. This allows many kinds of people to use the seat to perform activities. For example, even if some people cannot make the same motions as others, they can participate in the same community and enjoy an experience through use of the seat.

Seventh Embodiment

Next, a seventh embodiment will be described. In the seventh embodiment, only the parts different from those of the third embodiment will be described, and the parts similar to those of the third embodiment will be given the same reference characters in the drawings and explanation thereof will be omitted.

Figure 40:
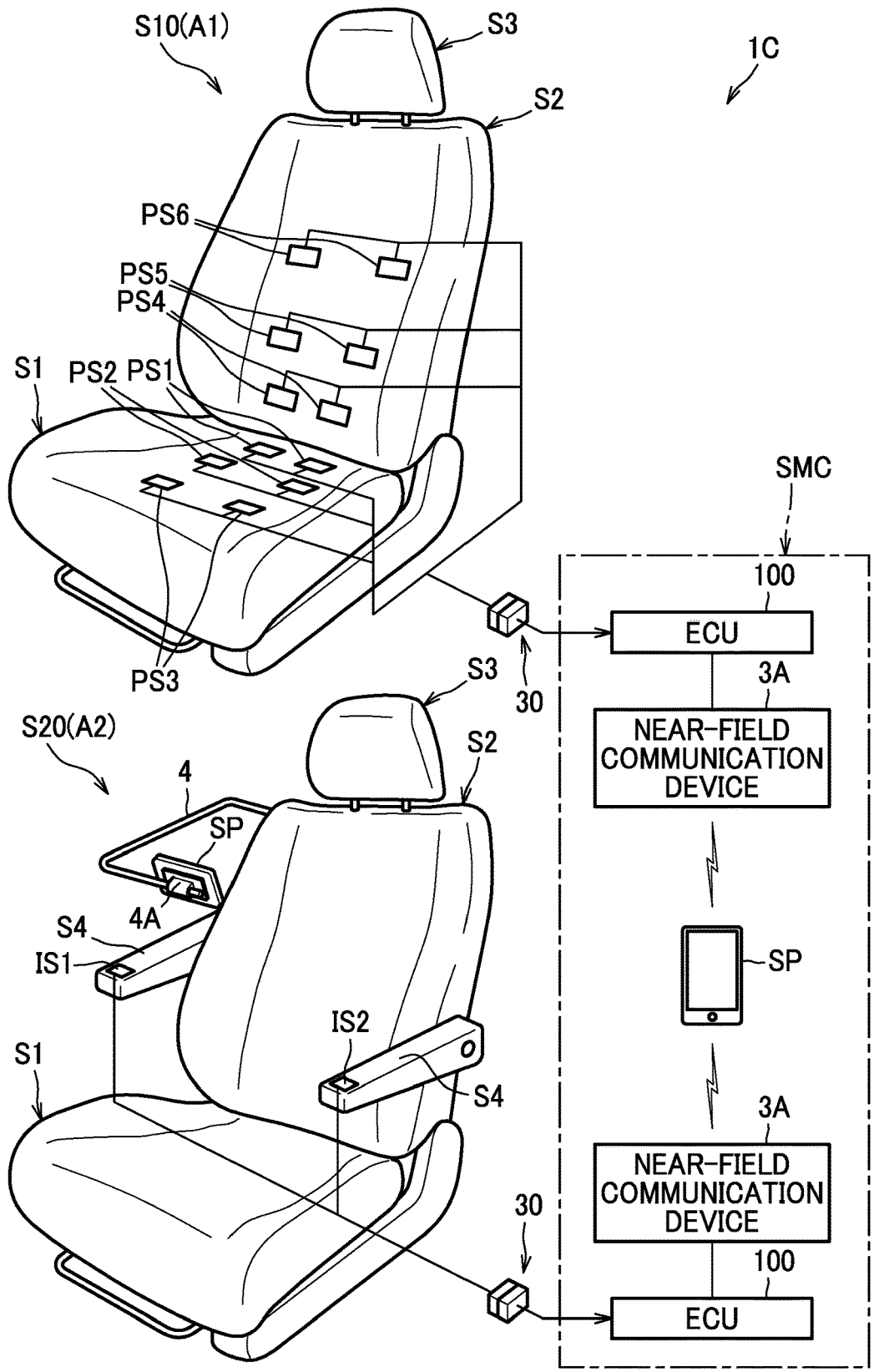
FIG. 40 is a system configuration diagram showing a seat system of a seventh embodiment.

As shown in FIG. 40, in the seat system 1C of the seventh embodiment, pressure sensors PS1 to PS6 of a first seat A1 and infrared sensors IS1, IS2 of a second seat are connected to the seat experience device SMC. That is, the seat experience device SMC is comprised of an ECU 100 connected to the first seat A1, an ECU 100 connected to the second seat A2, and a smartphone SP connected to the two ECUs 100 via near-field communication.

The smartphone SP is capable of acquiring first measurement values of the pressure sensors PS3 from the first seat A1, moving a character participating in the 100-meter race by a motion of an occupant seated on the first seat A1 moving his/her legs, acquiring second measurement values of the infrared sensors IS1, IS2 from the second seat A2, and moving another character participating at the same time in the 100-meter race by a motion of an occupant seated on the second seat A2 waving his/her hands over the infrared sensors IS1, IS2.

According to such configuration, the occupant seated on the first seat A1 and the occupant seated on the second seat A2 can compete in the 100-meter dash game.

The third to seventh embodiments described above may also be modified where appropriate.

For example, although operation of the 100-meter dash game is given as an example of a game in the above-described embodiments, a similar configuration may be adopted in the operation of another game. Hardware for operating the seat experience device, is not limited to the smartphone SP and may be a personal computer, a navigation system, etc. Further, it is not limited to such hardware including a display and may be a telephone, audio equipment, etc.

Although the pressure sensor and the infrared sensor is given as an example of a type of sensor in the above-described embodiment, the type of sensor may be a temperature sensor, a humidity sensor, a push switch, a capacitance sensor, etc.

Although the ECU and the smartphone are connected by near-field wireless communication in the above-described embodiment, they can be connected by wired communication. The ECU and the smartphone may also be connected so as to be capable of communicating by Internet communication.

Although only the motion of moving one's leg up and down and waving one's hand right and left are given as an example of a motion for operating the seat experience device in the above-described embodiment, the motion may be another motion such as twisting one's upper body, swinging one's upper body back and forth, left and right or rotatably, or swinging one's bottom.

Although a seat body installed on a car which is an automobile is given as an example of a seat in the above-described embodiment, the seat body (first seat body, second seat body) may be a seat of a car such as a train or a seat of a vehicle other than a car such as a ship, an aircraft, etc., or a seat other than a vehicle seat such as a seat located in a welfare facility.

Eighth Embodiment

Next, an eighth embodiment will be described with reference to the drawings.

Figure 41:
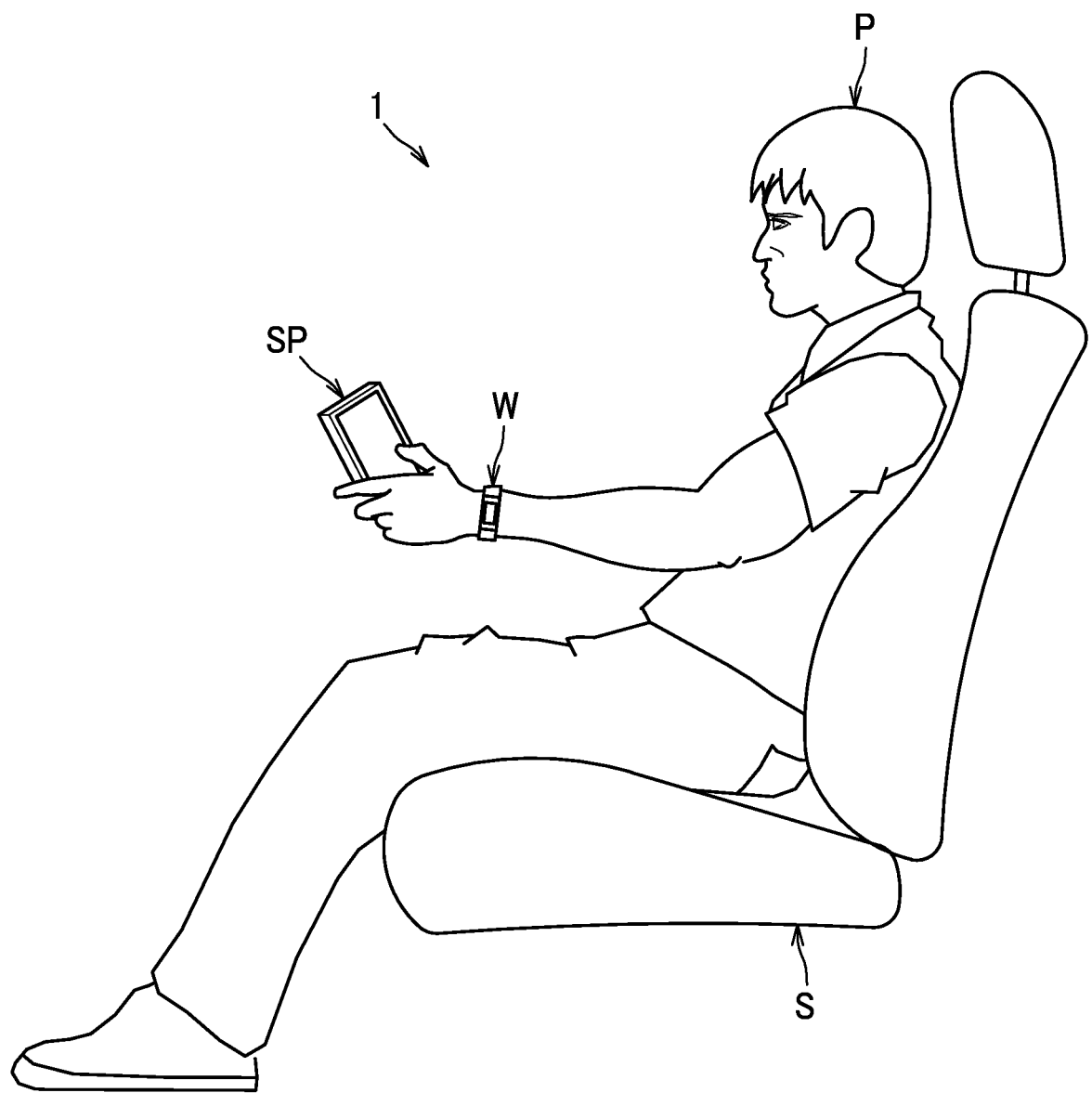
FIG. 41 is a diagram showing a seat system of an eighth embodiment.

As shown in FIG. 41, the seat system 1 comprises a seat S as an example of a seat, a wearable device W, and a smartphone SP as an example of a terminal device.

The seat S, in one example, is a vehicle seat to be installed on a vehicle such as a car. Hereafter, front-rear, left-right, up-down will be defined with respect to an occupant P seated on the seat S.

Figure 42:
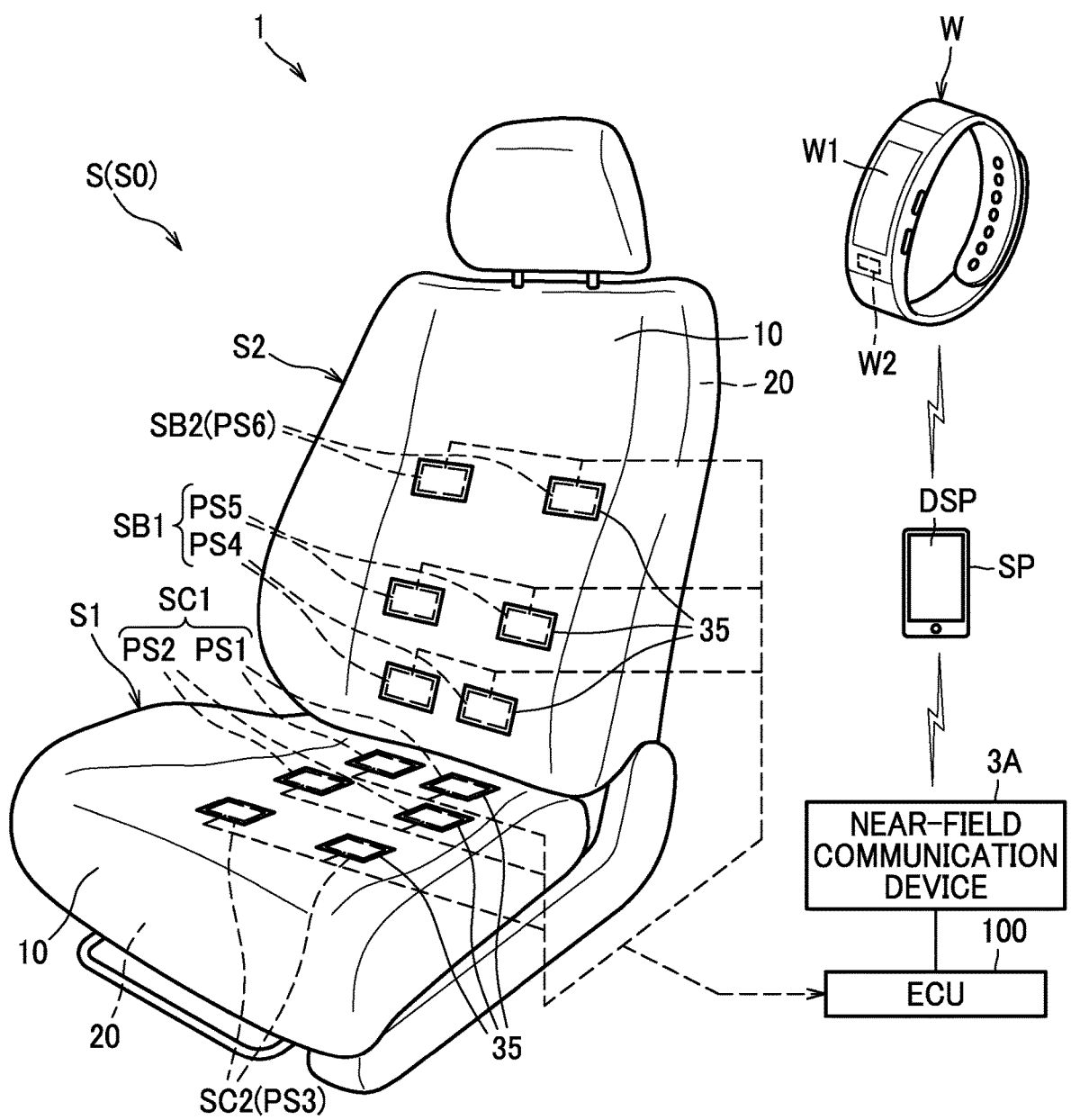
FIG. 42 is a diagram for explaining a structure of a seat system.

As shown in FIG. 42, the seat S comprises a seat body S0 and an ECU (electronic control unit) 100. The seat body S0 includes a seat cushion S1 and a seat back S2. The seat cushion S1 and the seat back S2 each includes a cushion pad 20 and an outer covering 10 that covers the cushion pad 20. The cushion pad 20 is made of urethane foam or the like and is supported by a frame (not shown). The outer covering 10 is made of artificial leather, fabric, etc.

A plurality of pressure sensors PS1 to PS6 are provided under the outer coverings 10 of the seat cushion S1 and the seat back S2. The pressure sensors PS1 to PS6 are an example of a first sensor and acquire measurement values which are first information for detecting a motion of an occupant P seated on the seat body S0. The pressure sensors PS1 to PS6 are located so as to be capable of detecting a state of a seat surface that faces an occupant P seated on the seat body S0, and acquire pressure values from the occupant P seated on the seat body S0.

The respective pressure sensors PS1 to PS6 are provided in pairs, each located left and right, symmetric with respect to a laterally central position of the vehicle seat S.

To be more specific, the pressure sensors PS1 to PS3 are provided at the seat cushion S1. The pressure sensors PS1 and the pressure sensors PS2 are provided in positions of the seat cushion S1 corresponding to the buttocks the occupant P. The pressure sensors PS1 and the pressure sensors PS2 constitute a first cushion sensor SC1 for measuring the pressure from the buttocks of the occupant P. The pressure sensors PS2 are located a little frontward of the pressure sensors PS1. The first cushion sensor SC1 may comprise only either pair of the pressure sensors PS1 and the pressure sensors PS2.

The pressure sensors PS3 are located under the thighs of the occupant P. The pressure sensors PS3 constitute a second cushion sensor SC2 for measuring values of pressure from the thighs of the occupant P. The pressure sensors PS3 are located frontward and largely apart from the pressure sensors PS1 and the pressure sensors PS2.

The pressure sensors PS4 to PS6 are provided at the seat back S1. The pressure sensors PS4 are provided in positions corresponding to the back of the lumbar region of the occupant P. The pressure sensors PS5 are located a little above the pressure sensors PS4. The pressure sensors PS4 and the pressure sensors PS5 both constitute a first back sensor SB1 for measuring the pressure from the lumbar region of the occupant P. The first back sensor SB1 may comprise only either pair of the pressure sensors PS4 and the pressure sensors PS5.

The pressure sensors PS6 are located above and largely apart from the pressure sensors PS4 and the pressure sensors PS5. The pressure sensors PS6 are provided in positions corresponding to upper portion of the back of the occupant P. The pressure sensors PS6 constitute a second back sensor SB2 for measuring values of pressure from the scapula of the occupant P.

The pressure sensors PS1 to PS6 are elements, for example, whose electrical resistance varies with external pressure applied thereto, wherein the larger the pressure value, the higher (or the lower, as the case may be) the voltage of the detection signal becomes.

At a location corresponding to each of the pressure sensors PS1 to PS6, a coating 35 that provides a location marking portion is applied to the outer surface of the outer covering 10. Since the coating 35 is applied on the outer surface of the outer covering 10, the coating 35 is exposed to the outside of the outer covering 10. The color of the coating 35 is different from that of the outer surface of the outer covering. Specifically, for example, if the outer surface of the outer covering 10 is black, the color of the coating 35 may be a color such as yellow which stands out in black.

Such a coating 35 provides marks which make the locations of the respective pressure sensors PS1 to PS6 visually recognizable from outside of the seat body S0 before the occupant P sits on the seat S.

The ECU 100 is connected to the pressure sensors PS1 to PS6 and is capable of acquiring pressure values from the respective pressure sensors PS1 to PS6. The ECU 100 is capable of transmitting the information detected by each of the pressure sensors PS1 to PS6 to the smartphone SP.

To be more specific, the ECU 100 is connected to a near-field communication device 3A which enables near-field wireless communication, such as Bluetooth (registered trademark), Wi-Fi (registered trademark), etc. The ECU 100 is capable of communicating with the smartphone SP via the near-field communication device 3A.

The ECU100, the smartphone SP, and the wearable device W each include a CPU, a ROM, a RAM, a rewritable nonvolatile memory, etc. (not shown) and execute a pre-stored program. The smartphone SP further includes a display DSP.

The wearable device W is a clock type device worn on an arm of the occupant P and further includes a display W1 and an acceleration sensor W2. The wearable device W has a function, for example, of acquiring the number of steps of the occupant based on acceleration acquired by the acceleration sensor W2, and the function of transmitting the number of steps of the occupant P to the smartphone SP.

Here, the second sensor of the present embodiment is constituted by the acceleration sensor W2 and a step conversion unit (control unit constituted by the CPU, etc. as described above). The second sensor of the present embodiment acquires the number of steps of the occupant P as an example of second information for detecting the physical state of the occupant P.

The smartphone SP has a function of acquiring pressure values from the pressure sensors PS1 to PS6 via the ECU 100 and acquiring the number of steps within a past predetermined period, for example, within the past one hour, (from one hour before the present time up to the present time) from the wearable device W. A seat app is installed in the smartphone SP which seat app provides the occupant P a game that is executable based on signals (pressure values) transmitted from the seat S.

The seat app of the present embodiment is capable of providing a 100-meter dash game and a Zazen game to the occupant P. The 100-meter dash game is a game in which characters displayed on the display DSP are made to run based on pressure values transmitted from the seats S. Here, since the contents of the 100-meter dash game is the same as those described in detail in the description of the first embodiment, a detail description thereof will be omitted.

In the present embodiment, the smartphone SP computes the number of steps as an example of an amount of activity of the occupant P during the 100-meter dash game. To be more specific, for example, the number of peak values Pm computed during the 100-meter dash game may provide the number of steps.

After the 100-meter game ends, the smartphone SP displays on the display DSP the computed number of steps. At the end of the 100-meter game, the smartphone SP transmits the number of computed steps to the wearable device W if it is in a state capable of communicating with the wearable device W.

The wearable device W has a function of adding the number of steps transmitted from the smartphone SP to the number of steps measured in the wearable device W. Accordingly, it is to possible to reflect the results of the motion of the occupant P on the seat S on the wearable device W, and thus the amount of exercise of the occupant can be accurately controlled.

The Zazen game is a game which requires the occupant to sit in a cross-legged position as in Zen meditation on the seat S. The Zazen game may be configured as a game in which the occupant P is encouraged to keep a posture in such a manner that the pressures on the left side and the right side of the seat cushion S1 are nearly equal and the pressures on the front side and the back side of the seat cushion S1 are nearly equal.

Specifically, for example, the Zazen game may be configured as a game in which a cursor which moves in response to the shift in the center of gravity of the occupant P is adjusted to match a target displayed on the display DSP. To be more specific, in the XY coordinate system displayed on the display DSP, if the center position of the target is (X0, Y0), the position of the cursor (Xn, Yn) may be set to satisfy the following equations.

$$Xn = X0 - ((P1_R + P2_R + P3_R)/3 - (P1_L + P2_L + P3_L)/3)$$

$$Yn = Y0 - ((P1_R + P1_L + P2_R + P2_L)/4 - (P2_R + P2_L + P3_R + P3_L)/4)$$

$P1_R$: pressure value of the right pressure sensor PS1
$P1_L$: pressure value of the left pressure sensor PS1
$P2_R$: pressure value of the right pressure sensor PS2
$P2_L$: pressure value of the left pressure sensor PS2
$P3_R$: pressure value of the right pressure sensor PS3
$P3_L$: pressure value of the left pressure sensor PS3

The Zazen game is configured to provide an evaluation value (for example, GOOD, NORMAL, BAD) which indicates that the closer the cursor position is to the center (X0, Y0) of the target, the better the performance of the Zazen is. In the Zazen game, the Zazen results are displayed in response to the ratio of evaluation values within a predetermined time period. For example, if a ratio of GOOD evaluation values is over 90% within the predetermined time period, the letters "GOOD" are displayed as a result showing that a Zazen level of a priest has been performed. If the ratio of GOOD evaluation values is lower than 70% within the predetermined time period, the letters "BAD" are displayed as a result showing that Zazen has not been performed at all. In cases other than the above, the letters "NORMAL" are displayed as a result showing that a Zazen level of a normal person has been performed.

The smartphone SP has a function such that, on the condition that the seat app described above is started up, the number of steps for the past one hour is acquired from the wearable device W and an activity plan using the pressure sensors PS1 to PS3 is presented to the occupant P based on the acquired number of steps. Here, as shown in FIG. 43, the present embodiment provides the 100-meter dash game, the Zazen game and a break time (ending the seat app) as examples of an activity plan.

The smartphone SP determines the plan to be presented to the occupant P by comparing the number of steps for the past one hour with specific reference values (3000, 5000) shown in FIG. 43. To be more specific, when the number of steps for the past one hour is lower than 3000 steps, the smartphone SP presents an activity plan which encourages exercise, i.e., the 100-meter dash game since the amount of exercise of the occupant P is insufficient.

When the number of steps for the past one hour is equal to or higher than 3000 steps and lower than 5000 steps, the smartphone SP presents an activity plan which may be enjoyed with a relatively small amount of exercise, i.e., the Zazen game since the amount of exercise of the occupant P is sufficient. Further, when the number of steps for the past one hour is equal to or higher than 5000 steps, the smartphone SP presents the break time, i.e., ending the seat app as the activity plan since the occupant P tends to have too much exercise.

The smartphone is configured to determine whether or not the occupant P is seated on the seat body S0, based on the pressure values obtained from the pressure sensors PS1 to PS3 and to present a plan to the occupant P on the condition that it is determined that the occupant P is seated. When the occupant P carries out a plan, for example, when the occupant P plays the 100-meter dash game, the smartphone SP is configured to compute the number of steps during the 100-meter dash game based on the pressure values, to determine a plan once again based on the number of steps computed during the 100-meter dash game and the number of steps obtained from the wearable device, and to present the determined plan.

Next, the operation of the smartphone SP (more specifically a control unit in the smartphone SP) will be described.

Figure 44:
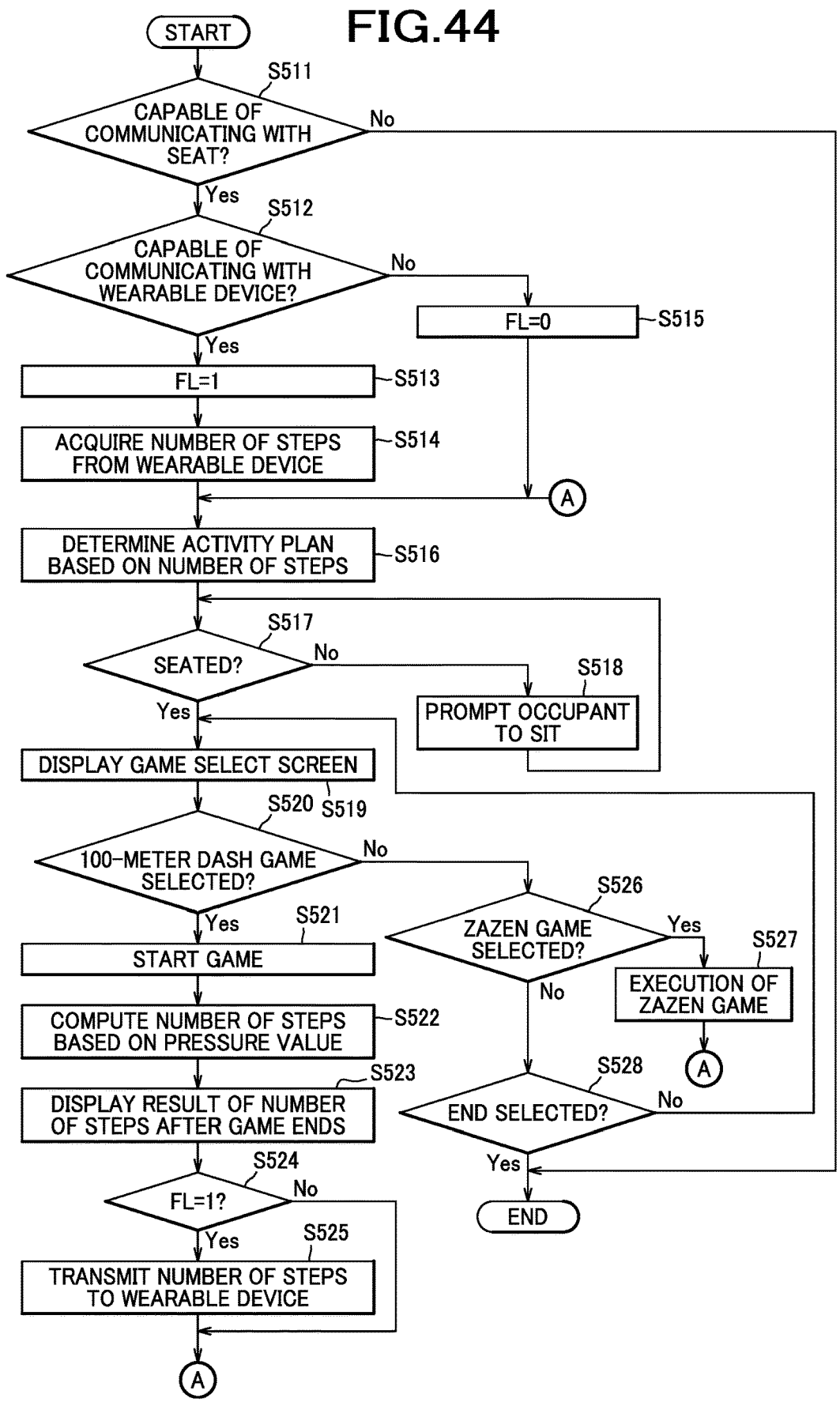
FIG. 44 is a flowchart showing a control process executed in a smartphone.

When the occupant P starts up the seat app, the smartphone SP starts the control process shown in FIG. 44 (START). During this control process, the smartphone SP first determines if it is in a state capable of communicating with the ECU 100 of the seat (S511).

If it is determined in step S511 that it is not in a state capable of communicating (No), the smartphone SP ends the present control process. If it is determined in step S511 that it is in a state capable of communicating (Yes), the smartphone SP determines whether or not it is in a state capable of communicating with the wearable device W (S512).

If it is determined in step S512 that it is in a state capable of communicating (Yes), the smartphone SP sets a flag FL which indicates that it is capable of communicating with the wearable device W at 1 (S513) and acquires the number of steps for the past one hour from the wearable device W and stores the number of steps (S514).

If it is determined in step S512 that it is not in a state capable of communicating (No), the smartphone SP sets the flag FL at 0 (S515). After step S514 or step S515, the smartphone SP determines the activity plan based on the number of steps for the past one hour and the table shown in FIG. 43 (S516).

To be more specific, when step S516 is executed for the first time after starting up the seat app, the smartphone SP determines the activity plan based on the number of steps for the past one hour acquired from the wearable device W. When the smartphone SP executes step S516 after executing the 100-meter dash game or the Zazen game as will be described later, it determines the activity plan once again by re-computing the number of steps for the past one hour based on the stored number of steps and the number of steps obtained in the 100-meter dash game or the execution time period of the Zazen game.

To be more specific, when the smartphone SP executes step S516 after executing the 100-meter dash game, it updates the number of steps for the past one hour by subtracting the number of steps corresponding to the execution time period of the 100-meter dash game from the stored number of steps for the past one hour to obtain a difference and adding the number of steps obtained in the 100-meter dash game to the difference. Further, when the smartphone SP executes step S516 after executing the Zazen game, it updates the number of steps for the past one hour by subtracting the number of steps corresponding to a time equivalent to the execution time period of the Zazen game from the stored number of steps for the past one hour.

After step S516, the smartphone SP determines whether or not the occupant P is seated on the seat S, based on the pressure values transmitted from the seat S (S517). If it is determined in step S517 that the occupant P is not seated (No), the smartphone SP displays a message (see FIG. 45) on the display DSP to prompt the occupant P to sit down on the seat S (S518).

If it is determined in step S517 that the occupant P is seated (Yes), the smartphone SP displays on the display DSP a game selection screen (see FIG. 46) for selecting a game (S519). At this time, the smartphone SP displays the plan determined in step S515 on the game selection screen and displays the button for selecting the determined plan larger than the other buttons.

After step S519, the smartphone SP determines whether or not the 100-meter dash game is selected (S520). If it is determined in step S520 that the 100-meter dash game is selected (Yes), the smartphone SP starts the 100-meter dash game (S521).

After step S521, specifically, during the 100-meter dash game, the smartphone SP computes the number of steps based on the pressure values (S522). After step S522, specifically, after the 100-meter game ends, the smartphone SP displays on the display DSP the result of the number of steps (S523).

After step S523, the smartphone SP determines if the flag FL which shows that the smartphone SP is capable of communicating with the wearable device W is 1 or not (S524). If it is determined FL=1 in step S524 (Yes), the smartphone SP transmits the number of steps obtained in the 100-meter dash game to the wearable device (S525) and returns to the process of step S516. If it is determined FL=1 is not true in step S524 (No), the smartphone SP skips step 525 and returns to the process of step S516.

If it is determined in step 520 that the 100-meter dash game is not selected (No), the smartphone SP determines whether or not the Zazen game has been selected (S526). If it is determined in step 526 that the Zazen game is selected (Yes), the smartphone SP executes the Zazen game (S527) and returns to the process of step S516.

If it is determined in step S526 that the Zazen game is not selected (No), the smartphone SP determines whether or not the end of the seat app is selected (S528). If it is determined in step 528 that the end of the seat app is not selected (No), the smartphone SP returns to the process of step S519. If it is determined in step S528 that the end of the seat app is selected (Yes), the smartphone SP ends the present control process.

Next, one example of a specific operation of the smartphone SP will be described. As shown in FIG. 41, in a state in which respective hardware (S, W, SP) constituting the seat system 1 is capable of communicating, when the occupant P who has hardly performed any exercise in the past one hour operates the smartphone SP and starts up the seat app, in the control process shown in FIG. 44, the process of step S511: Yes—>step S512:Yes—>steps S513, S514 is sequentially executed.

In step S514, since the occupant P has hardly performed any exercise in the past one hour, the smartphone SP acquires the number of steps lower than 3000. Thereafter, the smartphone SP determines the "100-meter dash game" as the activity plan based on the number of steps lower than 3000 and the table of FIG. 43 (S516). After step S516, the smartphone SP determines whether or not the occupant P is seated on the seat S based on the pressure values transmitted from the seat S (S517).

Figure 45:
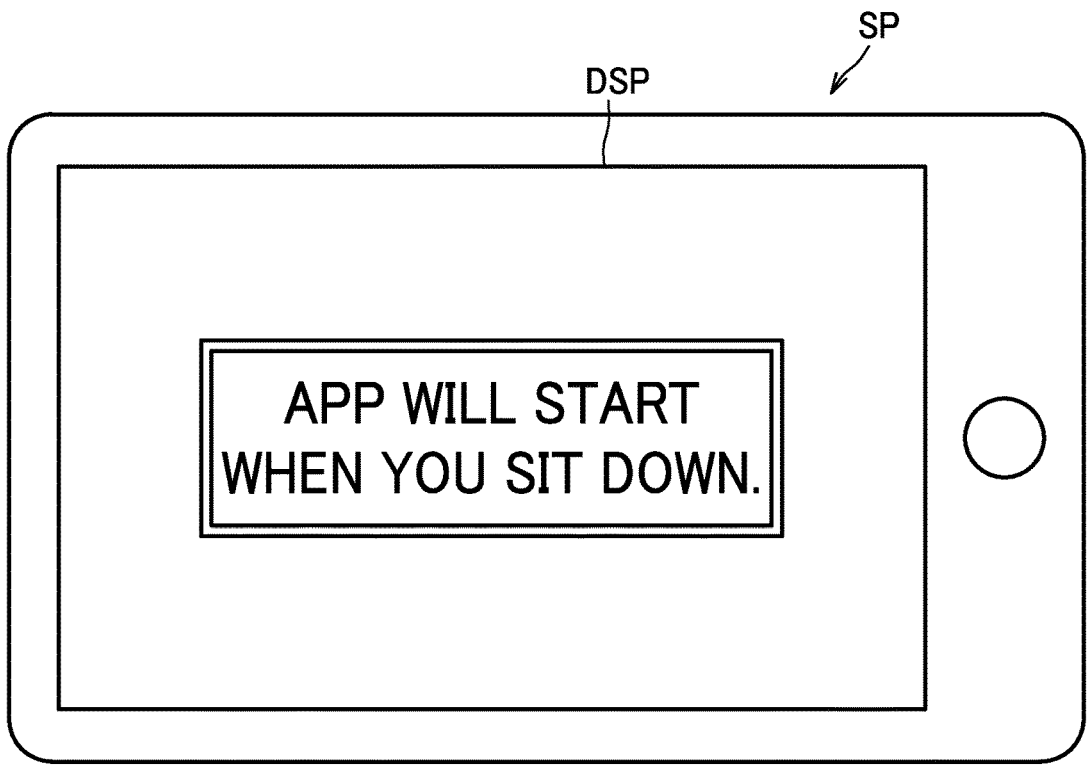
FIG. 45 is a diagram showing a screen for prompting an occupant to sit down on a seat.
Figure 46:
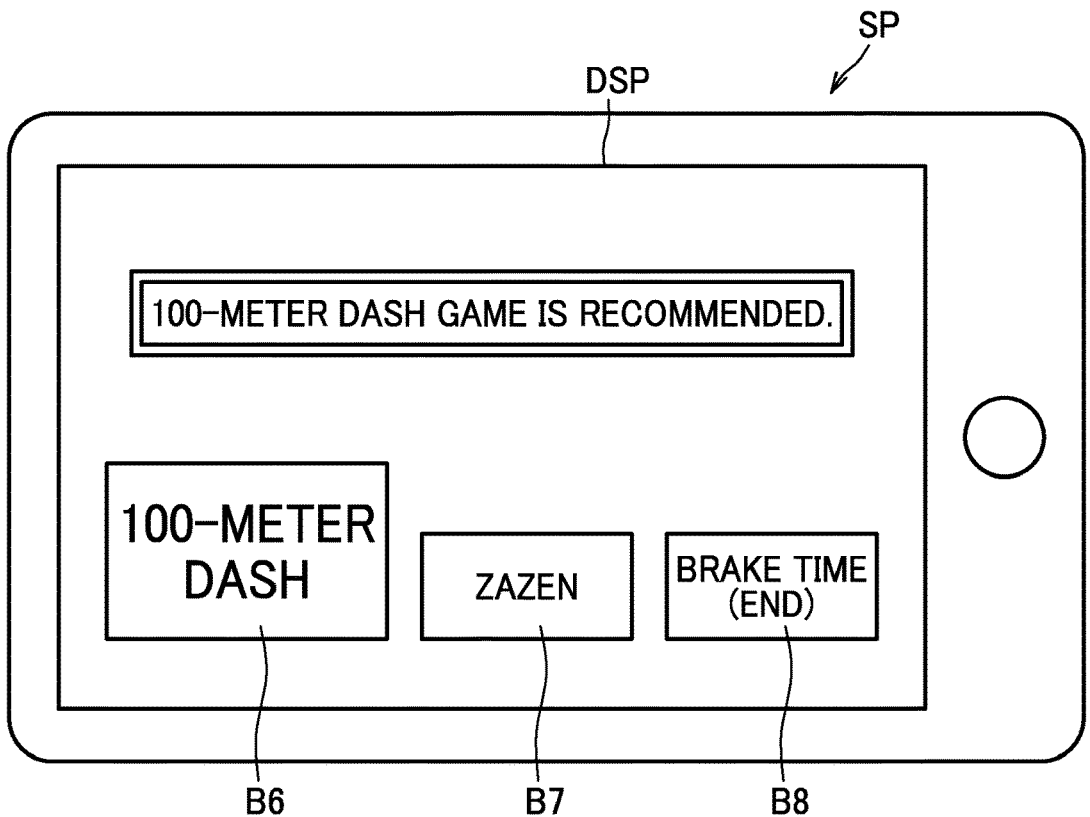
FIG. 46 is a diagram showing a screen for recommending a 100-meter dash game.

If the occupant P is not seated on the seat S in step S517, as shown in FIG. 45, a message such as "App will start when you sit down." is displayed on the display DSP of the smartphone SP to prompt the occupant P to sit down (518). When the occupant P sits down according to the message, it is determined Yes in step S517 and the game selection screen shown in FIG. 46 is displayed (S519).

On this game selection screen, since the activity plan determined in step S516 is the "100-meter dash game", a message such as "100-meter dash game is recommended." is displayed to encourage the occupant P to perform an exercise and the button B6 for starting the 100-meter dash game is displayed larger than the other buttons B7, B8. When the occupant P selects the button B6, it is determined Yes in step S520 and the 100-meter dash game is executed (S521 to S523).

After the 100-meter dash game ends, the smartphone SP transmits the number of steps determined during the 100-meter dash game to the wearable device W (S525) and returns to the process of step S516. If the occupant P plays the 100-meter dash game a few times and the number of steps for the past one hour increases and becomes equal to or larger than 3000 steps, the smartphone SP determines the "Zazen game" as the activity plan in step S516.

Figure 47:
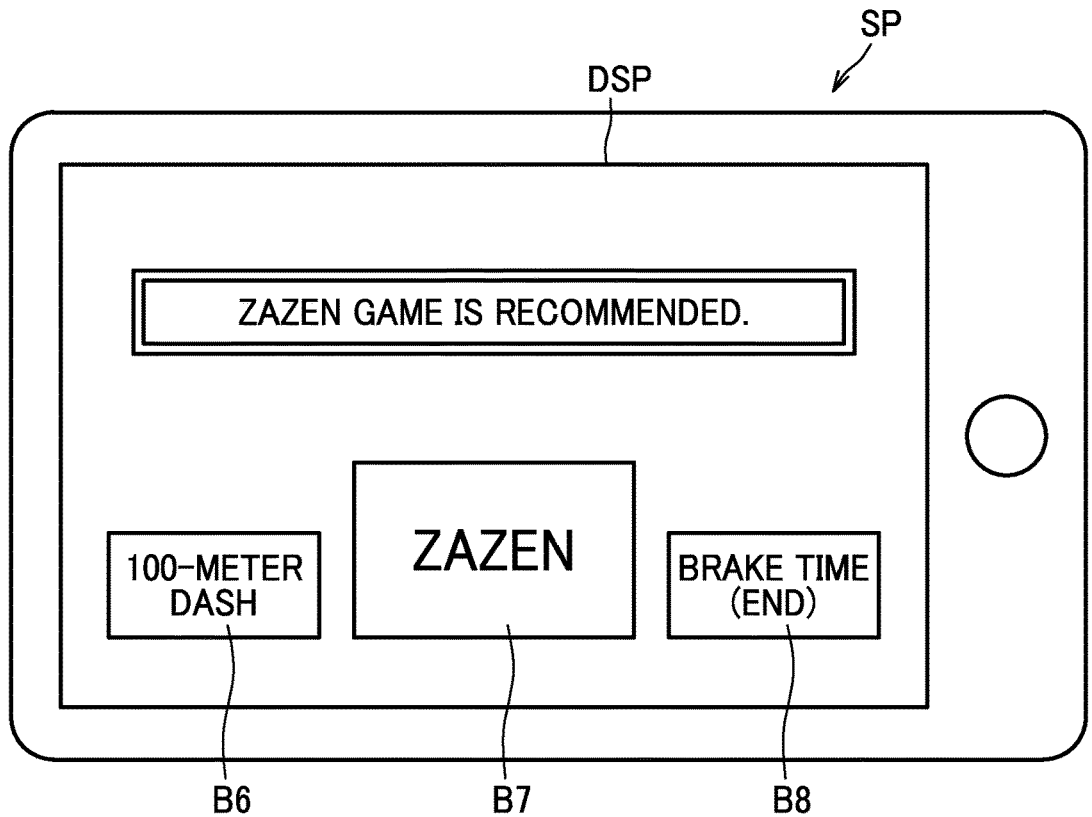
FIG. 47 is a diagram showing a screen for recommending a Zazen game.

When the Zazen game is determined as the activity plan, the smartphone SP displays on the display DSP a game selection screen such as shown in FIG. 47. On this game selection screen, a message "Zazen game is recommended." is displayed and the button B7 for starting the Zazen game is displayed larger than the other buttons B6, B8. When the occupant selects button B7, it is determined Yes in step S526 and the Zazen game is executed (S527).

If the occupant P plays the Zazen game a few times and the number of steps for the past one hour decreases and becomes less than 3000 steps, the smartphone SP determines the "100-meter dash game" as the activity plan once again in step S516. In the game selection screen shown in FIG. 47, when the occupant P ignores the recommended plan and, for example, plays the 100-meter game a few times causing the number of steps for the past one hour to increase and become equal to or larger than 5000 steps, the smartphone SP determines "break time" as the activity plan in step S516.

Figure 48:
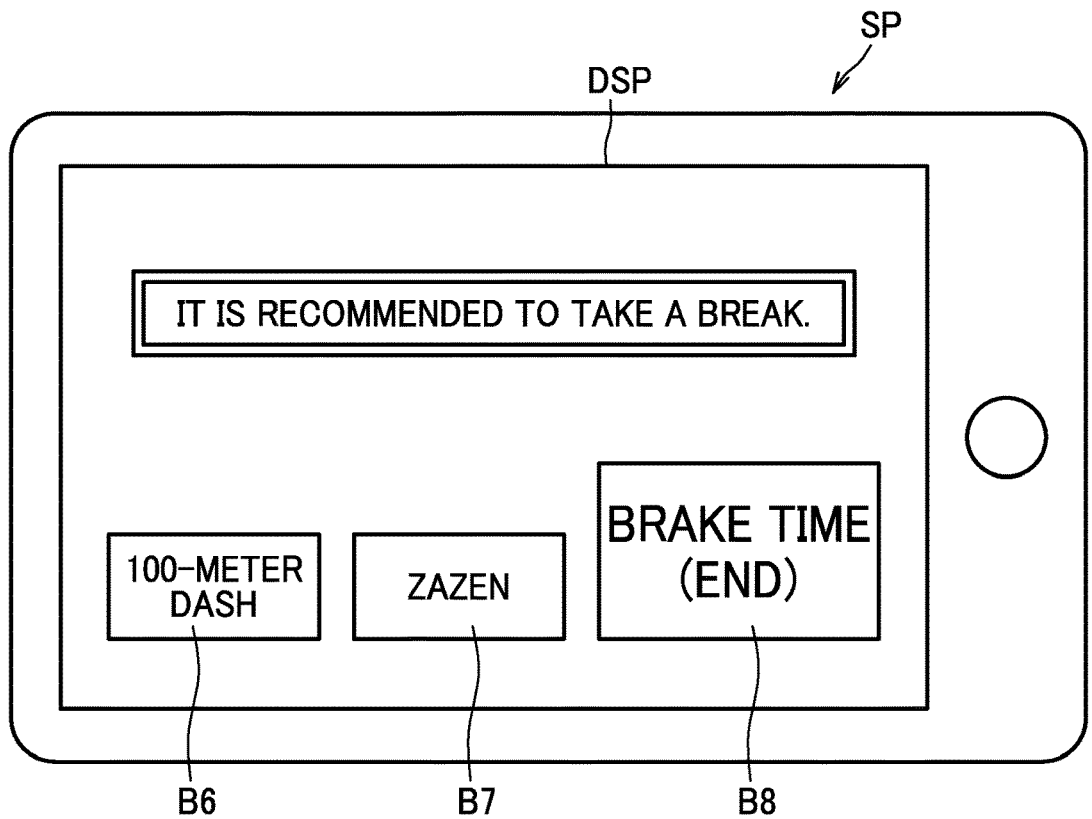
FIG. 48 is a diagram for recommending a break time.

When the break time is determined as the activity plan, the smartphone SP displays on the display DSP a game selection screen such as shown in FIG. 48. At this time, a message "It is recommended to take a break." is displayed on the game selection screen and the button B8 for the break time, i.e., for ending the seat app is displayed larger than the other buttons B6, B7. When the occupant P selects button B8, it is determined Yes in step S528 and the seat app is ended.

As has been described above, with the seat system 1 according to the present embodiment, the following advantageous effects can be achieved.

Since the smartphone presents the occupant P the activity plan using the pressure sensors PS1 to PS3 based on the number of steps acquired from the wearable device W worn by the occupant P, it is possible to present the occupant P the activity plan which is suitable for the physical state, biological information, activity information, etc. of the occupant.

By adopting the pressure sensors PS1 to PS3 as the first sensors, it is possible to present the occupant P the activity plan which uses the pressure sensors PS1 to PS3, specifically, the plan which encourages the occupant P to exercise.

By presenting the occupant the plan on the condition that the occupant P is seated on the seat body S0, the plan is presented when the occupant P is capable of using the seat S, and thereby the occupant P can select and play the presented plan without delay.

Since the number of steps of the occupant P is computed and displayed to the occupant P when the occupant P plays the 100-meter dash game, it can be easily known how much exercise has been performed by the occupant P.

Since the activity plan is determined and presented to the occupant P once again based on the number of steps reflecting the execution results of a plan and the number of steps acquired from a wearable device W, the most suitable plan for the physical state of the occupant P at that time can be presented to the occupant P.

Since the number of steps computed during the 100-meter game is transmitted from the smartphone SP to the wearable device W, the amount of activity (number of steps) can be used in the wearable device W, and thus an accurate number of steps can be stored in the wearable device W.

Since the smartphone SP compares the number of steps to a specific reference value to determine the plan to present the occupant P, a suitable plan can be determined.

The eighth embodiment described above may be implemented in various other forms as described below.

Although the number of steps of the occupant P computed during the 100-meter dash game is informed to the occupant P by displaying it on the display DSP, for example, the amount of activity computed based on the first information may be informed to the occupant by a voice or the like.

Although the number of steps is given as an example of the second information in the above-described embodiment, for example, the second information may be blood pressure. In this case, the second sensor may be a sensor capable of acquiring blood pressure. Further, in this case, for example, the table described above may be configured in such a manner that the 100-meter dash game is determined as the activity plan if blood pressure is lower than a first threshold, the Zazen game is determined as the activity plan if blood pressure is equal to or higher than the first threshold and lower than a second threshold, and the break time is determined as the activity plan if blood pressure is equal to or higher than the second threshold.

Although the pressure sensors PS1 to PS3 are given as an example of a first sensor in the above-described embodiment, for example, the first sensor may be an optical sensor. In this case, information regarding whether or not light is detected by the optical sensor may be used as the first information and the number of steps may be computed based on this first information.

Although a car seat to be used in a car is given as an example of a seat S in the above-described embodiment, the seat may be a seat used in another vehicle such as a ship, an aircraft, etc. The seat is not limited to a vehicle seat, for example, the seat may be a chair with a backrest (as used in a Japanese-style room).

Although a clock type device is given as an example of a wearable device W in the above-described embodiment, for example, the wearable device may be an eyeglass type device or a clip type device.

Although a smartphone SP was given as an example of a terminal device in the above-described embodiment, for example, the terminal device may be a mobile terminal device other than the smartphone SP such as a tablet, etc. The terminal device may also be a stationary terminal device located on the seat S which may be provided integrally with the seat.

Any of the elements explained in relation to the exemplified embodiments and illustrative modified examples disclosed in this description may be implemented in combination as desired.

The invention claimed is:

1. A seat system comprising:
 a seat including a seat body, and a sensor provided at the seat body and configured to acquire information for detection of a motion of an occupant seated on the seat body;
 a terminal device configured to acquire the information from the sensor; and
 a server capable of communicating with the terminal device,
 wherein the terminal device is configured to:
  execute a game program using the sensor, based on the information, and
  acquire an execution result corresponding to the occupant for a game provided by execution of the game program and played by the occupant,
 wherein the server is configured to:
  generate integrated data by integrating execution results of the game acquired from another terminal device, and
  compute a reference value for the execution results of the game based on the integrated data,
 wherein the terminal device or the server is configured to:
  assign a difficulty level of the game for the terminal device based on the execution result corresponding to the occupant and the reference value, and
 wherein the terminal device is configured to reflect the difficulty level on the game during execution of the game program.

2. The seat system according to claim 1, wherein the terminal device or the server is configured to assign the difficulty level of the game by setting a control amount for a control target which is controlled in the game based on the execution result corresponding to the occupant and the reference value.

3. The seat system according to claim 1, wherein the terminal device or the server is configured to:
 accumulate execution results corresponding to the occupant as an individual overall result associated with identification information of the occupant,
 compute an individual reference value for the execution results of the game for the occupant corresponding to the identification information based on the individual overall result, and
 assign the difficulty level based on the individual reference value and the reference value.

4. The seat system according to claim 1, wherein the reference value is an average value of the execution results of the game accumulated as the integrated data.

5. The seat system according to claim 1, wherein the terminal device or the server is configured to lower the difficulty level when the execution result corresponding to the occupant is worse than the reference value.

6. The seat system according to claim 1, wherein the terminal device or the server is configured to raise the difficulty level when the execution result corresponding to the occupant is better than the reference value.

7. A seat experience device comprising:
a seat including a seat body, and a sensor provided at the seat body and configured to acquire information for detection of a motion of an occupant seated on the seat body; and
a terminal device configured to acquire the information from the sensor and capable of communicating with a server;
wherein the terminal device is configured to:
   execute a game program using the sensor, based on the information, and
   acquire an execution result corresponding to the occupant for a game provided by execution of the game program and played by the occupant,
wherein the server is configured to:
   generate integrated data by integrating execution results of the game acquired from another terminal device, and
   compute a reference value for the execution results of the game based on the integrated data, and
wherein the terminal device is configured to reflect a difficulty level for the terminal device on the game during execution of the game program, the difficulty level of the game being assigned based on the execution result corresponding to the occupant and the reference value.

* * * * *